United States Patent
Hosaka et al.

(10) Patent No.: US 6,731,774 B1
(45) Date of Patent: May 4, 2004

(54) ASSOCIATED INFORMATION ADDING APPARATUS AND METHOD, AND ASSOCIATED INFORMATION DETECTING APPARATUS AND METHOD

(75) Inventors: Kazuhisa Hosaka, Tokyo (JP); Nobuyoshi Miyahara, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/450,613

(22) Filed: Nov. 30, 1999

Related U.S. Application Data

(63) Continuation-in-part of application No. 09/375,584, filed on Aug. 17, 1999, now abandoned.

(30) Foreign Application Priority Data

Nov. 30, 1998 (JP) ............................................ 10-339103

(51) Int. Cl.⁷ ................................................ G06K 9/00
(52) U.S. Cl. ...................... 382/100; 713/176; 713/179; 705/57; 705/58; 380/201
(58) Field of Search ................................ 382/100, 232; 380/51, 54, 201, 210, 252, 287; 370/522, 523, 524, 525, 526, 527, 528, 529; 348/460, 461, 463; 713/176, 179; 388/94; 283/74, 75, 76, 77, 78, 79, 80, 81, 85, 93, 130, 901, 902; 704/201.1, 273; 705/57, 58

(56) References Cited

U.S. PATENT DOCUMENTS

| | | | | |
|---|---|---|---|---|
| 5,892,900 A | * | 4/1999 | Ginter et al. ................ | 713/200 |
| 5,915,027 A | * | 6/1999 | Cox et al. ...................... | 380/54 |
| 5,943,422 A | * | 8/1999 | Van Wie et al. ............... | 705/54 |
| 5,946,414 A | * | 8/1999 | Cass et al. .................. | 382/183 |
| 5,974,548 A | * | 10/1999 | Adams ........................ | 713/200 |
| 6,122,403 A | * | 9/2000 | Rhoads ........................ | 382/233 |
| 6,209,094 B1 | * | 3/2001 | Levine et al. ................ | 713/176 |
| 6,259,801 B1 | * | 7/2001 | Wakasu ....................... | 382/100 |
| 6,385,329 B1 | * | 5/2002 | Sharma et al. .............. | 382/100 |
| 6,415,041 B1 | * | 7/2002 | Oami et al. ................. | 382/100 |

* cited by examiner

Primary Examiner—Jayanti K. Patel
Assistant Examiner—Abolfazl Tabatabai
(74) Attorney, Agent, or Firm—Frommer Lawrence & Haug LLP; William S. Frommer; Gordon Kessler

(57) ABSTRACT

The present invention relates to an information adding apparatus and method for adding information as a watermark to an image. Particularly, the invention is characterized in that a unit watermark pattern having a size corresponding to a small region made of vertical×horizontal=M×N (M and N are respectively a positive integer) pixels of a part of an image is generated, a repetitive watermark in which the unit watermark pattern from a unit watermark pattern generator is repeated vertically and horizontally is generated, checking is performed against the repetitive watermark, a watermark is added to the image, and in the unit watermark pattern generator, the size of the unit watermark pattern is determined such that at all resolutions expected that resolution conversion for the image is performed, each of the vertical and horizontal sizes of the unit watermark is integer times as large as a size of an encoded block at image encoding. By this, the size of the unit watermark pattern is integer times as large as the size of the encoded block at the image encoding at all resolutions expected that the resolution conversion is performed. Thus, at the time of detection of the associated information, if the resolution of image information is known, it is possible to know, at the resolution, what times as large as the encoded block the unit watermark is, and folding accumulation becomes possible in a unit of the unit watermark of an integer number of encoded blocks

19 Claims, 36 Drawing Sheets

WATERMARK OF INPUT IMAGE

WATERMARK OF INPUT IMAGE AFTER FOLDING ACCUMULATION

WATERMARK OF INPUT IMAGE

WATERMARK OF INPUT IMAGE AFTER FOLDING ACCUMULATION

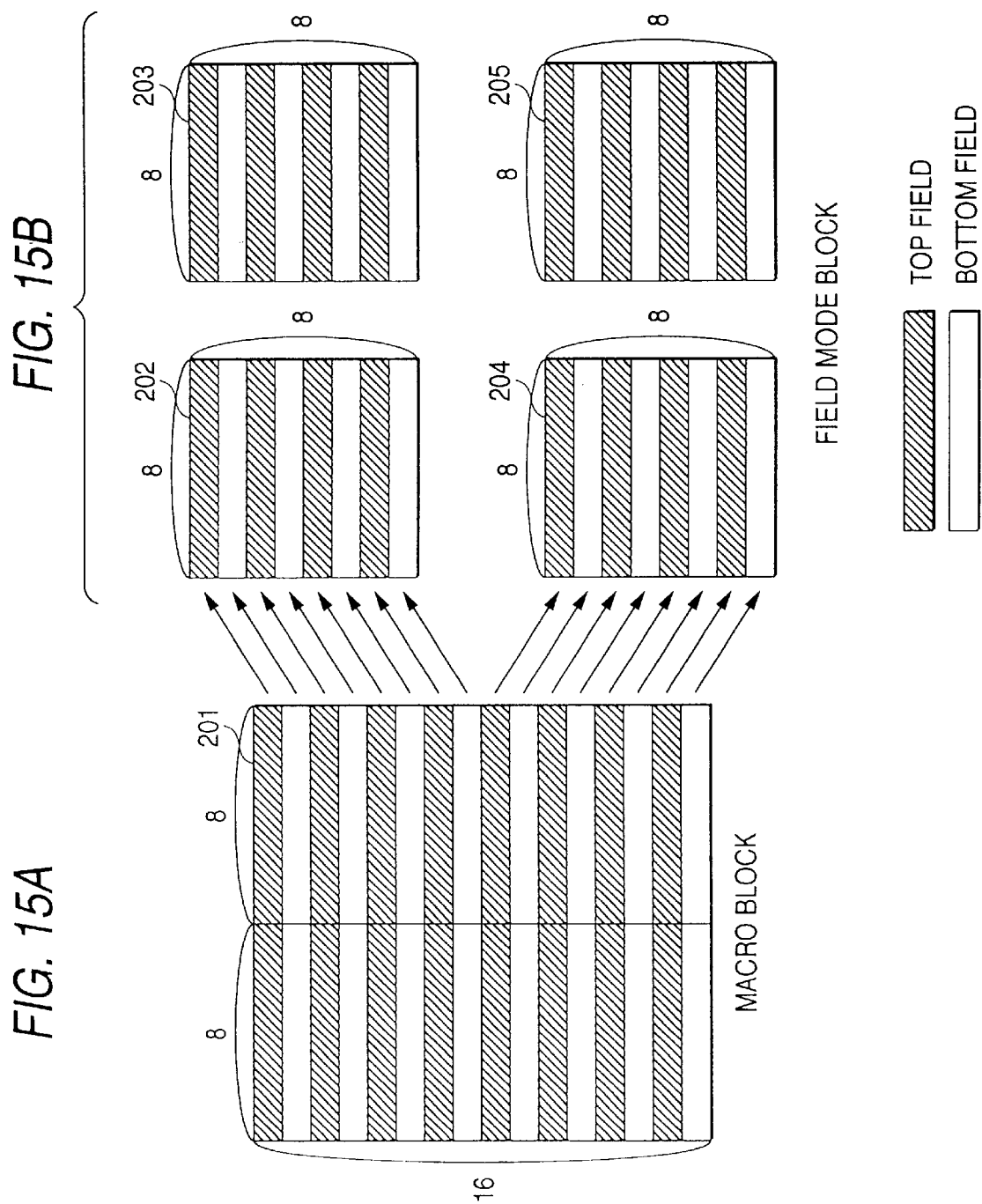

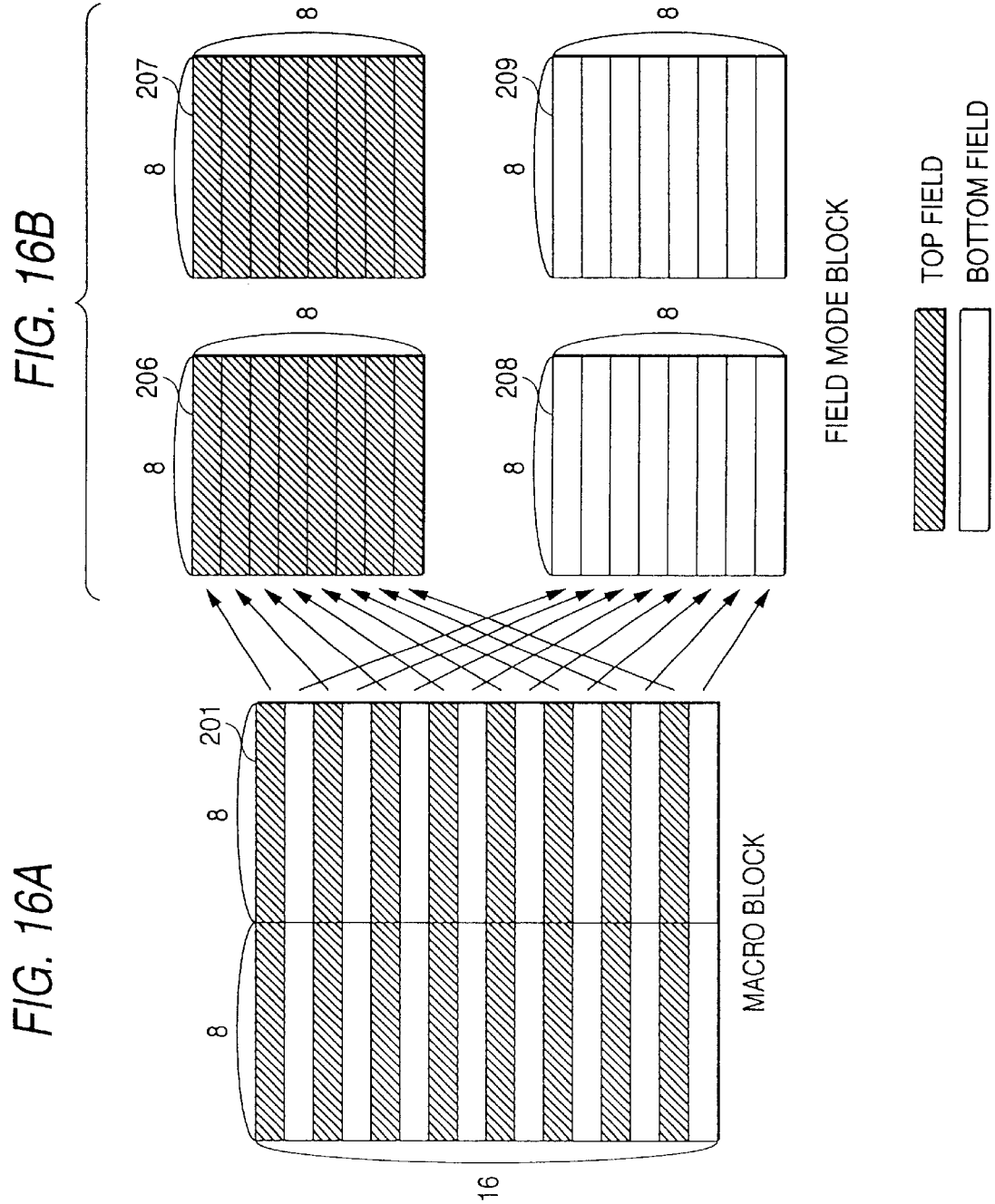

WATERMARK OF INPUT IMAGE
AFTER FOLDING ACCUMULATION
OF FRAME DCT COEFFICIENT

WATERMARK OF INPUT IMAGE
AFTER FOLDING ACCUMULATION
OF FIELD DCT COEFFICIENT

FIG. 18

| HIGH DEFINITION | | | STANDARD DEFINITION | | | |
|---|---|---|---|---|---|---|
| VERTICAL | x | HORIZONTAL | VERTICAL | x | HORIZONTAL | |
| 1080 | x | 1920 | 480 | x | 720 | *1 |
| 1080 | x | 1440 | 480 | x | 640 | |
| 1080 | x | 1280 | 480 | x | 544 | |
| 720 | x | 1280 | 480 | x | 480 | |
| 1080 | x | 1440  *3 | 480 | x | 360 | |
| 1080 | x | 1080  *3 | 360 | x | 720 | *2 |
| 1080 | x | 960  *3 | 576 | x | 720 | *4 |
| 720 | x | 960  *3 | 432 | x | 720 | *2 *4 |

NOTE: A UNIT OF VERTICAL AND HORIZONTAL DEFINITION IS THE NUMBER OF PIXELS.

*1: (IN NTSC), MOST GENERAL DEFINITION.

*2: THE NUMBER OF EFECTIVE PIXELS WHEN *1 HAS BEEN SUBJECTED TO LETTER BOX CONVERSION.
AMONG INDIVIDUAL DEFINITIONS OF SD OTHER THAN *1 AND *2, THERE IS SOME DEFINITION IN WHICH VERTICAL DEFINITION BECOMES 360 PIXELS AFTER LETTER BOX CONVERSION.

*3: DEFINITION WHEN LEFT AND RIGHT PORTIONS OF A PICTURE FRAME OF 16:9 ARE CUT AWAY SO THAT A REGION OF 4:3 IS EXTRACTED (PAN SCAN).

*4: IT IS PAL.

PICTURE FRAME OF VIDEO MATERIAL

PICTURE FRAME OF MOVIE MATERIAL

MOVIE MATERIAL

SQUEEZE IMAGE

3/4 TIMES IN HORIZNTAL

REDUCTION AS IT IS

LETTER BOX IMAGE

3/4 TIMES IN VERTICAL
LETTER BOX CONVERSION

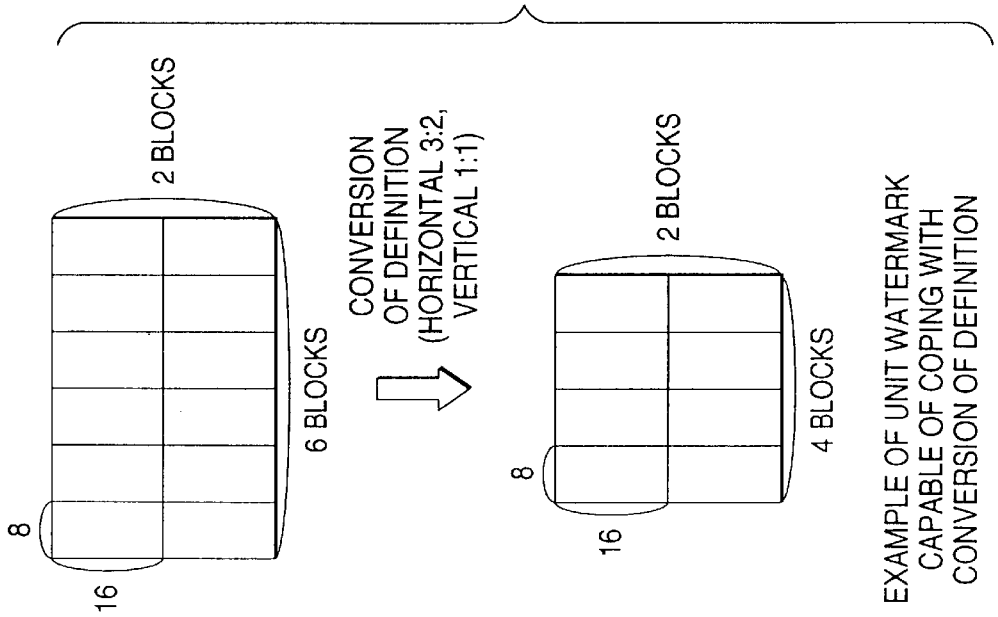
FIG. 22A
UNIT WATERMARK AT NORMAL DEFINITION (HORIZONTAL 720, VERTICAL 480)
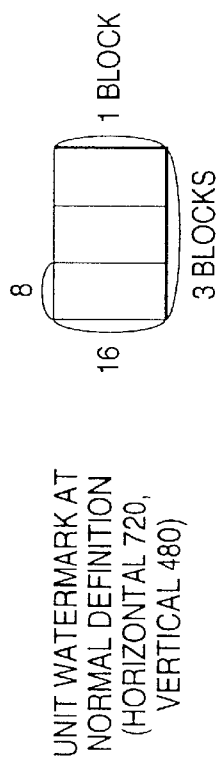
UNIT WATERMARK AFTER CONVERSION OF DEFINITION (HORIZONTAL 480, VERTICAL 480)
IN THE CASE OF MINIMUM UNIT WATERMARK CAPABLE OF COPING WITH CONVERSION OF DEFINITION
FIG. 22B
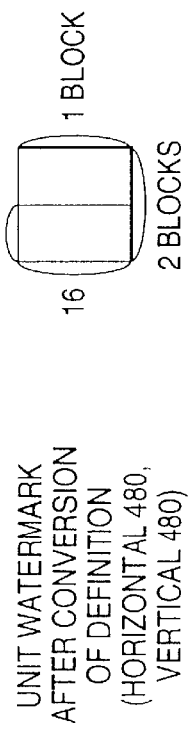
EXAMPLE OF UNIT WATERMARK CAPABLE OF COPING WITH CONVERSION OF DEFINITION

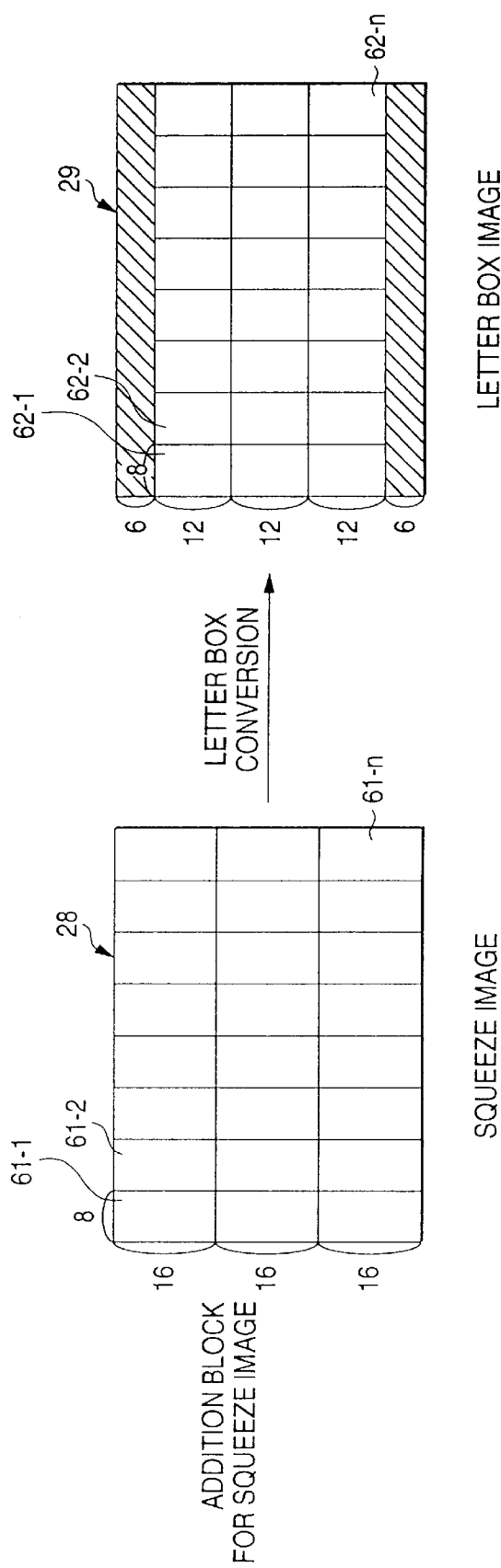

SQUEEZE IMAGE

LETTER BOX IMAGE

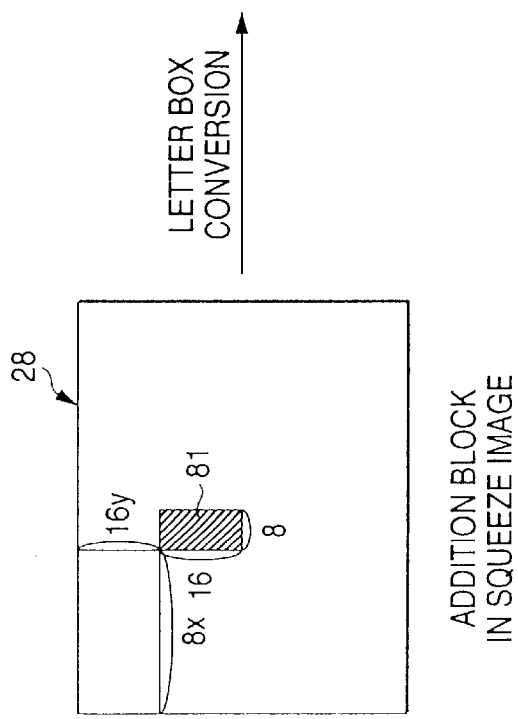

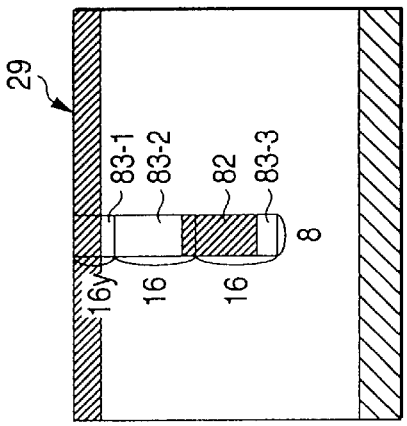
FIG. 32C ENCODED BLOCK IN LETTER BOX IMAGE
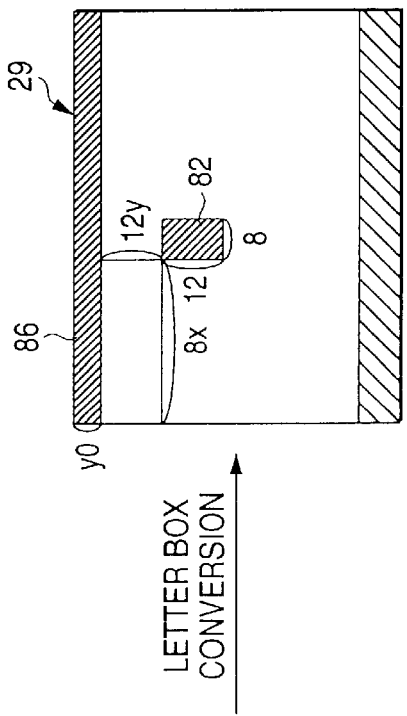
FIG. 32B ADDITION BLOCK IN LETTER BOX IMAGE
LETTER BOX CONVERSION
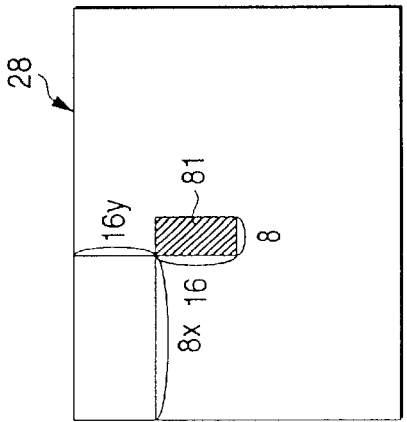
FIG. 32A ADDITION BLOCK IN SQUEEZE IMAGE

ADDITION BLOCK IN SQUEEZE IMAGE

ADDITION BLOCK IN LETTER BOX IMAGE

ENCODED BLOCK IN LETTER BOX IMAGE

COMPONENT OF WATERMARK TO BE CALCULATED

I[x,0] x W[x,0]
I[x,0] x W[x,1]
I[x,1] x W[x,1]
I[x,1] x W[x,2]
I[x,2] x W[x,2]
I[x,2] x W[x,3]

FIG. 34A
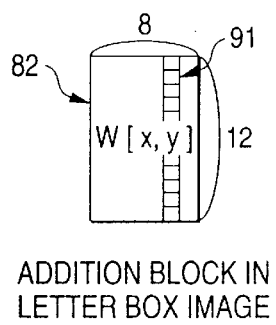
ADDITION BLOCK IN
LETTER BOX IMAGE
FIG. 34B
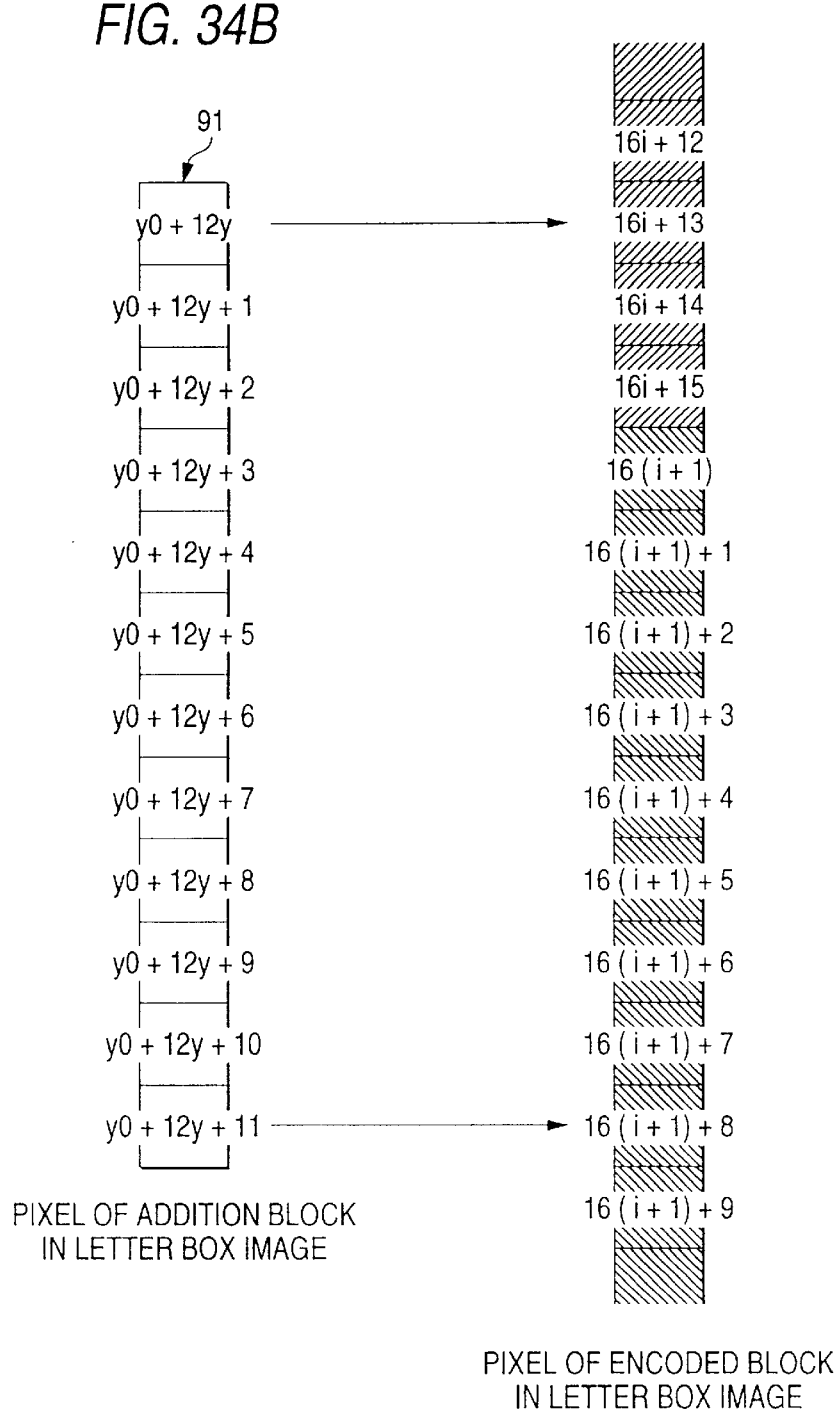
PIXEL OF ADDITION BLOCK
IN LETTER BOX IMAGE
FIG. 34C
PIXEL OF ENCODED BLOCK
IN LETTER BOX IMAGE

FIG. 38A
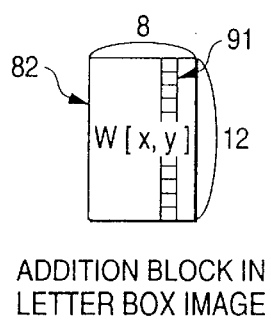
ADDITION BLOCK IN
LETTER BOX IMAGE
FIG. 38B
FIG. 38C
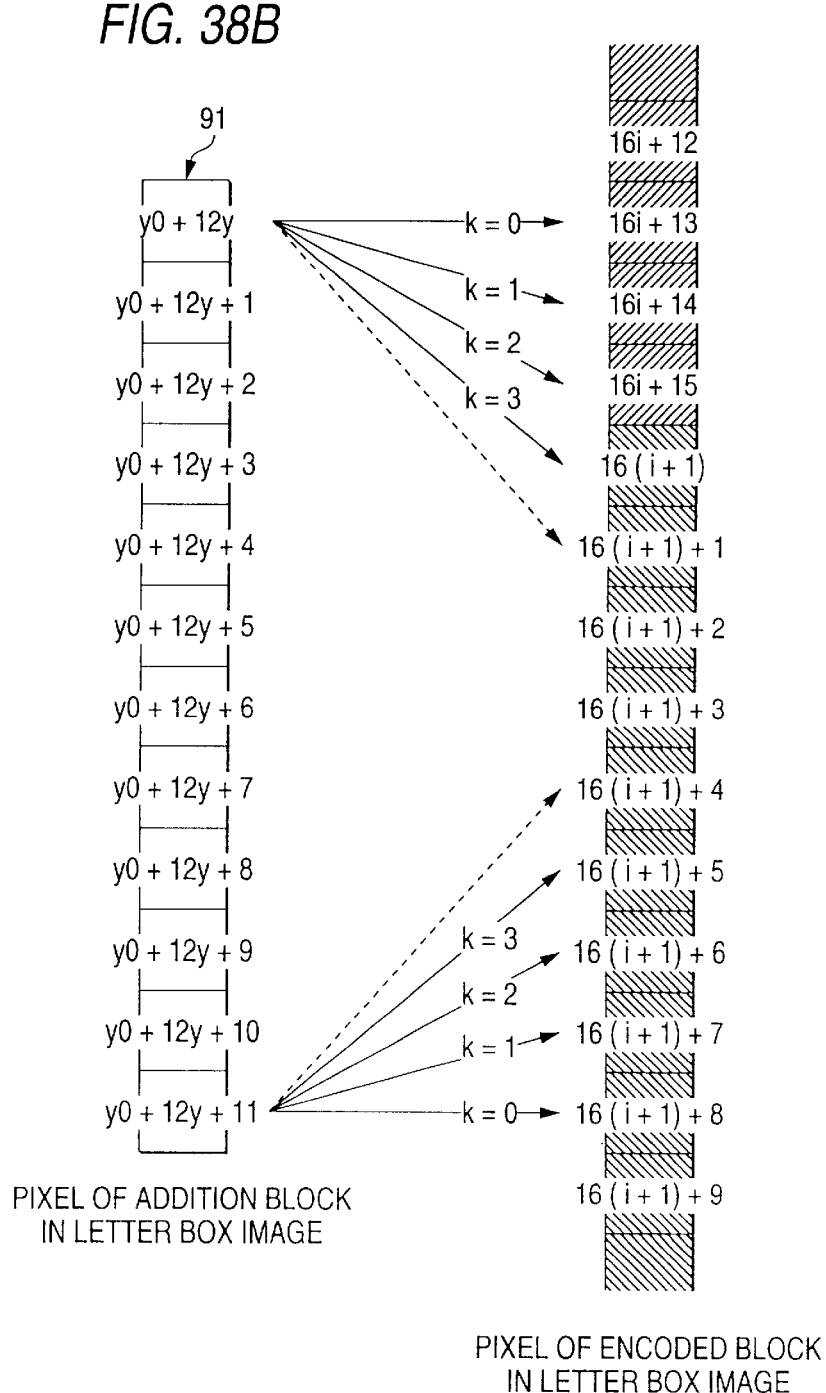
PIXEL OF ADDITION BLOCK
IN LETTER BOX IMAGE
PIXEL OF ENCODED BLOCK
IN LETTER BOX IMAGE

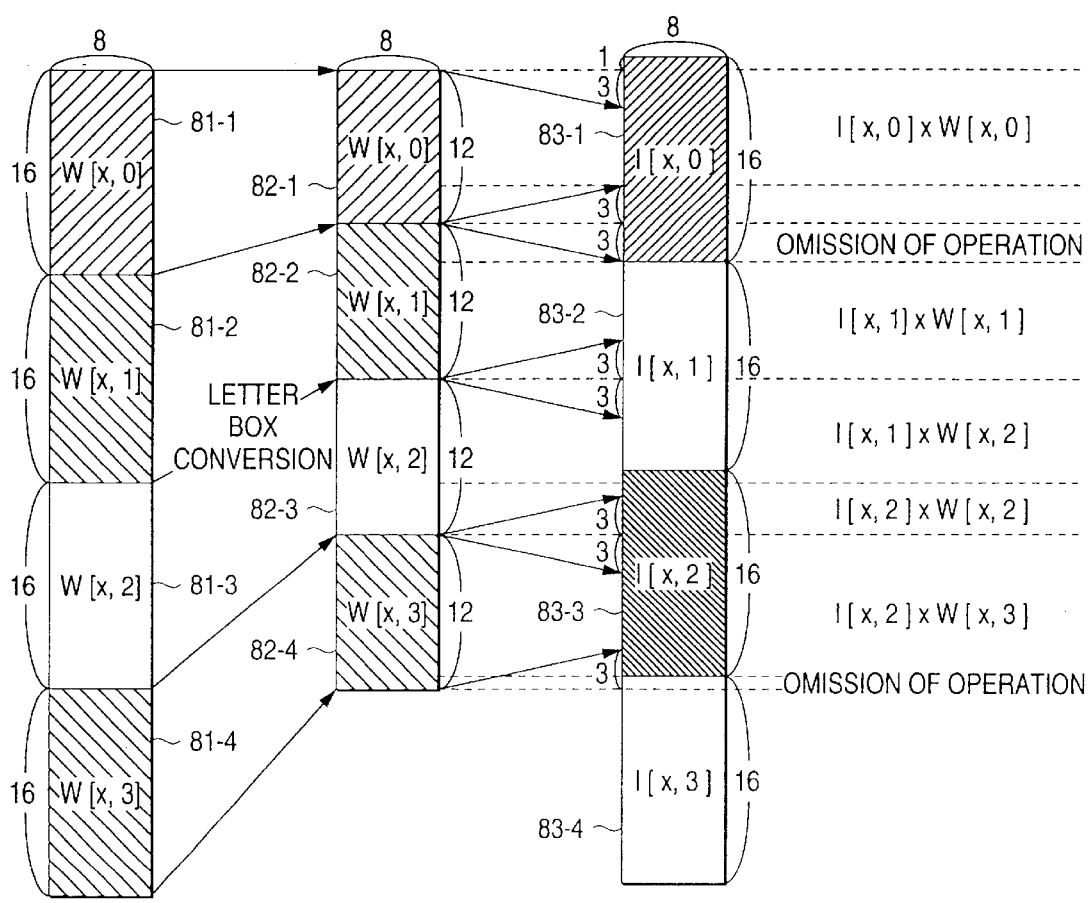

ASSOCIATED INFORMATION ADDING APPARATUS AND METHOD, AND ASSOCIATED INFORMATION DETECTING APPARATUS AND METHOD

This is a continuation-in-part of application Ser. No. 09/375,584, filed Aug. 17, 1999.

BACKGROUND OF THE INVENTION

1. Field of the Invention

The present invention relates to an associated information adding apparatus and method for adding information associated with image data, such as a still image or a moving image sequence, as an electronic watermark (watermark) into the image data, and an associated information detecting apparatus and method for detecting the associated information.

2. Description of the Related Art

There is a technique in which information associated with arbitrary image data (still image or moving image sequence) is added to the image data, and the associated information is detected at the time of reproduction and is used. As a typical usage example of this technique, it is possible to make mention of addition of copyright information.

In the case where any unspecified user can use specific image data, it is conceivable that a person having copyright on the image adds copyright information previously into the image data in order to assert the right. By adding the copyright information, in the case where the copyright information to instruct a user that the image data are unable to be displayed is detected in the processing procedure of a reproducing apparatus or reproducing method of the image, it becomes possible to take such a countermeasure that the image data are not displayed.

At present, the foregoing addition or detection of copyright information is used in the illegal copying preventing function of a videotape of analog recording (a video signal is recorded in a state of an analog signal) and the like. This function makes it impossible to illegally copy a videotape obtained through a method such as borrowing from a rental agent, and the right of a person having the copyright of the videotape is protected.

In the case of a videotape of analog recording, since image data are recorded in an analog manner, the picture quality is deteriorated when copying is performed. On the contrary, in an apparatus for recording and reproducing image data in a digital manner, which has recently come into wide use, the picture quality is not deteriorated by copying in principle, and even a number of repetitions of copying can be made without deterioration of the picture quality. Thus, the damage by illegal copying with an apparatus for performing the processing in a digital manner becomes more serious than the case of an analog apparatus, and prevention of illegal copying in the apparatus for performing the processing in a digital manner becomes very important.

As methods of adding information associated with image data, such as the foregoing copyright information, into the image data, there are mainly two methods.

The first method is a method of adding information into an auxiliary portion of image data. The auxiliary portion of image data indicates a portion other than the image data in an effective screen region. For example, it is a vertical blanking period of an analog video signal, a header portion or an additional data portion of a digital video signal, or the like. Actually, in an analog videotape, auxiliary associated information of image data is added to a part of a vertical blanking period.

The second method is a method of adding information into a main portion of image data, that is, the image data in an effective screen region. In this method, some specific pattern is added to all or a part of an image to such a degree that it can not be visually sensed. This is called an electronic watermark processing. As a specific example of this, there is a spectrum diffusion in which addition and detection of information are performed by employing a key pattern produced by using random numbers, M-sequence, etc.

In the first method, since information is added into an auxiliary portion of image data, that is, into a place different from the contents themselves of the image, there is a problem that if the auxiliary portion is once separated, the added information is lost.

On the contrary, the electronic watermark processing is a processing for embedding information as noise into part of image data unimportant for the perception of a human being. The information embedded in the image data by such electronic watermark processing (hereinafter, the information embedded by means of electronic watermark is referred to as a "watermark") is added to the same frequency region and time region as the image data, so that it is hard to remove the information from the image data. On the other hand, there is a feature that even after filtering processing or data compression processing is performed for the image data, the watermark embedded in those can be detected from the image data.

A method using a watermark as a method of adding associated information into a main portion of image data, which is the second method having the foregoing features, will be described below.

First, the outline of an adding and detecting system of a watermark will be described with reference to FIGS. 1 to 4.

FIG. 1 shows an example of a watermark pattern WM. The watermark pattern WM of this example has a size of vertical×horizontal=4n pixels×4n pixels (n is a natural number), and such a pattern that either one of two symbols +1 and −1 is taken for each pixel is designed to be used as shown in the drawing. In actual usage, it is preferable that the watermark pattern takes either one of the two symbols at random. The shape and size of a region of the watermark pattern are arbitrary.

When associated information is added to an image, a region having the same size as a region of a watermark pattern to be added is set on the image as an object to which the addition is performed. The set region and the watermark pattern WM are overlapped with each other to be checked, a value "a" is added for a pixel corresponding to the symbol of +1 in the watermark pattern WM, and a value "b" is subtracted for a pixel corresponding to the symbol of −1. Here, the value "a" and the value "b" can take arbitrary values.

FIG. 2 shows an example of addition of the watermark pattern WM into an image. In this example, for simplification, it is assumed that every pixel value in a region of an image Pi as an object to which the addition is performed is 100, and the foregoing values "a" and "b" are set to a=1 and b=1. In an image Po obtained as a result that an embedding operation of this watermark pattern WM has been performed, the pixel values are divided into 101 and 99 as shown in the drawing.

When associated information is detected, a region having the same size as the region of the watermark pattern WM is set on the image as the object to which detection is performed. An evaluation value as to correlation between the set image region and the watermark pattern WM is found. In this case, the sum for all pixels of the set image region is used as the evaluation value.

Specifically, when all pixels are summed to find the evaluation value, the set image region and the watermark pattern WM are overlapped with each other to be checked, addition is applied to the pixels of the symbol of +1 of the watermark pattern WM, and subtraction is applied to the pixels of the symbol of −1. At this time, detection is made by using the same pattern as the watermark pattern used when the associated information is added.

FIG. 3 is a view for explaining calculation of the evaluation value in the case where the watermark is detected from the image Po to which the watermark pattern WM was added in the manner as shown in FIG. 2. In this example of FIG. 3, the evaluation value becomes $(4n)^2$ (equal to the number of pixels contained in the region).

On the contrary, the image Po of FIG. 4 shows a case where the watermark pattern WM is not added, and the evaluation value of correlation to the watermark pattern with respect to this image Po becomes 0.

Actually, although there hardly occurs a case where all pixels of the image Pi as an object to which the watermark pattern is added have the same value, in the case where the region of the watermark pattern is sufficiently large and the watermark pattern is sufficiently random, from the horizontal and vertical correlation of an image, the evaluation value as to the image Po in the case where the watermark is not added becomes almost zero at all times. From this, in the case where the evaluation value exceeds a certain threshold value, it is permissible to judge that the associated information by the watermark is added to the image.

By the foregoing procedure, it becomes possible to add, as associated information, binary information (1 bit) indicating whether the watermark is added or not. In the case where it is desired to add more information (plural bits), it is possible to add 2k pieces (K bits) of information to the image by such a processing method that the whole image is divided into K pieces of regions in space, in time, or in space and time, and the above operation is performed for each region.

As the watermark pattern, for example, what is produced by using the M-sequence (longest code sequence) can be used. The M-sequence is a series composed of binary symbols, a statistical distribution of the respective symbols is constant, and code correlation is 1 at the origin and −1/code length at other portions. Of course, the watermark pattern may be produced by a method other than using the M-sequence.

In the case where image data are recorded and reproduced in a digital manner, since the image data without any change have a very large amount of information, the image data are generally compressed. As a method of compressing the image data, a high efficiency encoding system such as JPEG (Joint Photographic Experts Group) or MPEG (Moving Picture Experts Group) is internationally standardized and has been put to practical use. Data compressed by these high efficiency encoding systems are called bit stream data or simply a bit stream. As a paired expression, an image prior to compression and an image after decoding are respectively called a baseband image or simply a baseband.

It is convenient if a watermark can be easily detected by only adding the watermark to a baseband image, even if the image is distributed as the baseband image without any compression or as the bit stream after high efficiency encoding such as JPEG or MPEG has been performed. That is, it is preferable that the watermark added before compression with the high efficiency encoding or the like can be used for detection commonly in both the baseband and the bit stream.

FIG. 5 is a conceptual view for explaining the entire flow of addition and detection of a watermark to image information in this case.

That is, in FIG. 5, baseband image information is supplied to a watermark adding apparatus 10 through an input terminal 1, and information of a unit watermark wm to be added is supplied to the watermark adding apparatus 10 through a unit watermark input terminal 2. The unit watermark wm has a size corresponding to a small region of a part of an image as described later in detail.

In the watermark adding apparatus 10 of this example, a repetitive watermark WMR in a state where the unit watermark wm supplied from the input terminal 2 is repeated vertically and horizontally on the image is added to the baseband image from the input terminal 1. The baseband image information added with the repetitive watermark WMR is outputted through an output terminal 3.

The baseband image added with the repetitive watermark WMR is supplied to an MPEG encoder 20, and is encoded in high efficiency through the MPEG system, so that it is made a bit stream and is outputted through an output terminal 4. The size of an encoded block in the MPEG encoding of this case is designed to be equal to the unit watermark wm, or is designed such that the unit watermark wm becomes equal to an integral number of encoded blocks. In other words, the size of the unit watermark wm is selected to be a size an integral number of times as large as the size of the encoded block.

The image information of the baseband image added with the watermark WMR and outputted from the output terminal 3 is supplied to a watermark baseband detecting apparatus 30 through an input terminal 5. In the watermark baseband detecting apparatus 30, on the basis of the unit watermark wm (equal to the unit watermark wm from the input terminal 2) from an input terminal 6, the watermark is detected from the baseband image information as described later, and the detection result is led out through an output terminal 7.

The image information of the bit stream added with the watermark WMR and outputted from the output terminal 4 is supplied to a watermark bit stream detecting apparatus 40 through an input terminal 8. In the watermark bit stream detecting apparatus 40, on the basis of the unit watermark wm from the input terminal 6, the watermark is detected from the bit stream image information as described later, and the detection result is led out through an output terminal 9.

The watermark adding apparatus 10 of FIG. 5 is constructed as shown in FIG. 6. This watermark adding apparatus is such an apparatus that the watermark WMR in which the unit watermark wm is repeated vertically and horizontally on the image is added to the image, and the image added with the watermark is outputted.

In this case, moving image data inputted through the image input terminal 1 can be expressed by I(x, y, t) ($0 \leq x <$ width (I), $0 \leq y <$ height (I)), and the unit watermark wm inputted through the unit watermark input terminal 2 is expressed by W(x, y) ($0 \leq x < L$, $0 \leq y < L$).

Where, x and y designate coordinates of each of pixels constituting the image in the horizontal direction and the vertical direction on the image, and t designates a time in an image unit. As shown also in FIGS. 8B and 8C, the width (I) and the height (I) designate the width and the height of the image, respectively. As shown in FIG. 8A, L (a natural number) designates the width and height of the unit watermark wm. Like this, the width and the height of the unit watermark wm were selected to be equal to each other.

The unit watermark wm inputted through the unit watermark input terminal 2 is inputted to a watermark repeating unit 103. The internal structure of this watermark repeating unit 103 is as shown in FIG. 7.

That is, as shown in FIG. 7, the watermark repeating unit 103 is provided with a memory 1031 having such a capacity that all elements of the repetitive watermark WMR corresponding to one image can be stored.

At the time of writing the unit watermark wm into the memory 1031, coordinate elements x and y of a coordinate (x, y) as to the unit watermark wm are inputted through an x-coordinate input terminal 11 and a y-coordinate input terminal 12. Then, memory addresses x and y corresponding to the input coordinate are set by address setting portions 1032 and 1033, and the unit watermark wm from the input terminal 2 is written in the memory 1031.

In this case, the address setting portion 1032 supplies, to the memory 1031, addresses to specify not only one memory position corresponding to the input coordinate (x, y) but also positions separate from the memory position in the vertical direction and the horizontal direction by a distance an integral number of times, like once, twice, three times, . . . , as large as L. Thus, as shown in FIGS. 8B and 8C, the watermark WMR in which the unit watermark wm repeats in the vertical direction and the horizontal direction of the image is written into the memory 1031.

That is, at every time when each value W(x, y) of the unit watermark is inputted, for all pairs of i and j (i and j are respectively a positive integer) satisfying $i\%L=x$, and $j\%L=y(0 \leq i <$width $(I), 0 \leq j <$height $(I))$, repeatW(i, j)=W(x, y) is written into the memory repeatW holding the watermark after repetition. In this specification, "%" is an operator for finding a surplus.

This will be described with reference to FIGS. 8A to 8C. When the unit watermark W(x, y) of FIG. 8A is inputted, the watermark repeating unit 103 repeats the unit watermark W(x, y) to form the watermark WMR of FIG. 8B which has the width(I) and the height(I).

FIG. 8B shows the case where the width(I) of the image and the height(I) of the image can be respectively divided by the width and the height L of the unit watermark wm. In the case where they can not be divided, the repetitive watermark becomes as shown in FIG. 8C.

The coordinate (x, y) corresponding to each pixel position of the image information inputted from the image input terminal 4 is sequentially supplied through the x-coordinate input terminal 11 and the y-coordinate input terminal 12 into the memory 1031, so that the watermark WMR written in the memory 1031 of the watermark repeating unit 103 in the manner as described above is read out. The read out repetitive watermark WMR is transferred to a watermark embedding unit 101.

On the other hand, the baseband image information inputted through the image input terminal 4 is sent to not only the watermark embedding unit 101 but also an embedding amount judging unit 102. The embedding amount judging unit 102 investigates the feature of the inputted image, judges, at each place of the image, the embedding amount of the watermark in which addition scarcely has an influence on picture quality, and transmits the amount to the watermark embedding unit 101.

In the watermark embedding unit 101, in accordance with the repetitive watermark WMR inputted from the watermark repeating unit 103, the watermark is embedded in the image sent from the image input terminal 4. At that time, the embedding amount is adjusted in accordance with the information of the embedding amount inputted from the embedding amount judging unit 102.

Here, the embedding amount judging unit 102 is necessary for improving the picture quality of the image added with the watermark, and is not indispensable for addition and detection of the repetitive watermark WMR. For example, even if addition with the same embedding amount is performed to all portions where addition is indicated by the watermark pattern without using the embedding amount judging unit 102, there does not occur a problem in detection of the watermark.

The image information added with the repetitive watermark WMR made by the watermark embedding unit 101 is outputted from the baseband image output terminal 3.

Here, the operation of the watermark embedding unit 101 will be digested.

When the embedding amount found by the embedding amount judging unit 102 with respect to the input image I(x, y, t) is made D(x, y, t), in the case where embedding is performed by a specified amount in the embedding unit 101, the image wmI(x, y, t) after addition of the watermark becomes $wmI(x, y, t)=I(x, y, t)+repeatW(x, y) \times D(x, y, t)$.

When the watermark is added to all pixels by a constant embedding amount, the image wmI(x, y, t) after addition of the watermark is expressed using a constant D by $wmI(x, y, t)=I(x, y, t)+repeatW(x, y) \times D$.

Next, a structural example of the watermark baseband detecting apparatus 30 will be described with reference to FIG. 9.

The watermark baseband detecting apparatus 30 of FIG. 9 reads the image information of the baseband and the pattern of the unit watermark wm, and outputs the information of the watermark contained in the baseband image information. The information of the watermark is such that when the watermark exists in the image, it is the shift amount of position where the unit watermark is detected, and when the watermark does not exist in the image, it is information indicating nonexistence of the watermark. The shift amount of the position where the unit watermark is detected is equal to the shift amount between the pattern of the unit watermark wm to be compared and the unit watermark pattern in the watermark on the detected image.

As shown in FIG. 9, the image I(x, y, t) (see FIG. 10A) inputted from the baseband image input terminal 4 is inputted into a folding accumulator 301, and as shown in FIG. 10B, it is folded and accumulated with the size of the unit watermark. When an equation is used, a folding accumulation result foldI (x, y) is expressed as follows:

$foldI(x, y)=\Sigma I(i\%L, j\%L, t)$ $i\%L=x, j\%L=y$

Since L is the horizontal and vertical size of the unit watermark wm, the folding accumulation result foldI(x, y) is space information having the same size as the unit watermark wm.

FIG. 11 shows a structural example of the folding accumulator 301. This folding accumulator 301 includes a memory 3012 having a capacity for at least the unit watermark wm of L×L elements, an accumulative adder 3011, and address setting portions 3013 and 3014 for the memory 3012.

To the accumulative adder 3011, the image information from the image input terminal 5 is inputted, and image elements of the unit watermark wm read out from the memory 3012 are supplied, so that accumulative addition is made. The output of the accumulative adder 3011 is written in the memory 3012 at an address indicated by the address setting portions 3013 and 3014, and is read out. By this, a folding accumulation image output is obtained from the memory 3012, and is led out through an output terminal 33.

In this case, coordinate elements x and y of a coordinate (x, y) of a pixel as to an image, which are inputted from the input terminals 31 and 32, are supplied to the address setting portions 3013 and 3014, respectively. In the address setting portion 3013, the operation x%L for finding a surplus is performed, and the found surplus is supplied to the memory 3012 as the address x. In the address setting portion 3014, the operation y%L for finding a surplus is performed, and the found surplus is supplied to the memory 3012 as the address y. Through this addressing, folding accumulation is executed by the accumulative adder 3011 and the memory 3012.

In the case of carrying out the folding accumulation in which folding in a unit of the size of the unit watermark and accumulation are performed like this, and in the case where, as shown in FIG. 12A, a folding region AR has no shift in regard to the watermark on the image, the watermark of the input image after folding accumulation comes to have quite the same pattern as the unit watermark wm as shown in FIG. 12B.

In the case where the folding region AR is shifted in regard to the watermark on the image as shown in FIG. 13A, the watermark of the input image after folding accumulation comes to have such a pattern that patterns obtained by dividing the unit watermark wm are gathered as shown in FIG. 13B.

However, when folding accumulation is performed as described above, naturally in the case where there is no image shift between the time of addition of the watermark and the time of detection of the watermark as shown in FIG. 12A, even in the case where there is a shift between the time of addition of the watermark and the time of detection of the watermark as shown in FIG. 13A, since the accumulated watermark components are always placed at the same position, they are emphasized, and when the number of times of accumulation becomes sufficiently large, the accumulated image components are cancelled out.

If the watermark is contained in the input image I(x, y, t), the folding accumulation result foldI(x, y) and what is obtained by shifting the unit watermark W(x, y) have correlation at all times. This correlation is investigated by using FFT (Fast Fourier Transform) as described below.

That is, the output of the folding accumulator 301 is inputted to a FFT unit 302, and after the FFT for L×L elements is carried out, the output is sent to a convolution arithmetic unit 303. The unit watermark wm (=W(x, y)) inputted from the unit watermark input terminal 6 is also subjected to the FFT for L×L elements by a FFT unit 304, and then, it is sent to the convolution arithmetic unit 303.

The convolution arithmetic unit 303 performs convolution of coefficients of the foregoing two FFT spaces, and sends the result to a reverse FFT unit 305. The convolution at the convolution arithmetic unit 303 is equivalent to taking correlation of combinations of all shifts between both the unit watermark wm and the image after folding in the space region.

In the reverse FFT unit 305, reverse FFT is performed to the result obtained by the convolution arithmetic unit 303 so that it is returned to the space region. The output of all coefficients obtained by the reverse FFT at the reverse FFT unit 305 is supplied to a maximum value detector 306 and a variance calculator 307.

The maximum value detector 306 searches a maximum coefficient among coefficients obtained by the reverse FFT at the reverse FFT unit 305, and outputs the maximum coefficient and its coordinate.

All coefficients from the reverse FFT unit 305 and the coordinate value of the maximum coefficient from the maximum value detector 306 are inputted to the variance calculator 307, and variance of values other than the maximum value of the coefficient is calculated.

The variance calculated by the variance calculator 307 and the maximum coefficient found by the maximum value detector 306 are inputted to a normalizing unit 308. The output of the normalizing unit 308 is a value normalized by dividing the maximum coefficient by the variance. This value is inputted to a threshold value comparator 309 and is compared with a predetermined threshold value.

In the threshold value comparator 309, when the value obtained by dividing the maximum value inputted to this by the variance is smaller than the threshold value, it is judged that there is no watermark, and an output controller 310 is controlled so that the information indicating that there is no watermark is outputted through the watermark information output terminal 7.

In the threshold value comparator 309, if the value obtained by dividing the maximum value inputted to this by the variance is larger than the threshold value, it is judged that the watermark is contained, and the output controller 310 is controlled, so that the coordinate of the maximum coefficient detected by the maximum value detector 306, that is, the shift amount of the position where the watermark is contained is outputted through the watermark information output terminal 7.

As described above, in the watermark baseband detecting apparatus of FIG. 9, correlation as to all possible shift amounts is obtained using convolution in the FFT region, and it is judged whether the watermark is added to the image on the basis of whether or not the maximum value of the correlation is larger than a predetermined standard.

In the case where the watermark is added to the image, although the shift amount is outputted as information, since it is the shift amount between the time of addition of the watermark and the time of detection of the watermark, it is impossible to make the amount have an absolute meaning. However, it is possible to make the amount have a relative meaning as described below.

Two watermarks of a certain watermark and a watermark obtained by multiplying each element of the certain watermark by −1 (that is, inverted pattern) are added to different phases of one image. The maximum value judgement unit 306 of FIG. 9 is replaced by a maximum/minimum value judgement unit for extracting both the maximum value and the minimum value, and the maximum value or minimum value and its coordinate among coefficients from the reverse FFT unit 305 are found. After the found maximum coefficient or minimum coefficient is normalized with variance, it is judged by the threshold value comparator 309 whether the absolute value of the maximum coefficient or minimum coefficient is larger than a threshold value, and in the case where it is larger, the difference in shift amounts of the two watermarks of the watermark where the maximum coefficient was detected and the watermark where the minimum coefficient was detected is made information. Since this information is relative, it does not change even if a shift occurs in the image.

Next, a structural example of the watermark bit stream detecting apparatus 40 will be described with reference to FIG. 14.

In FIG. 14, a bit stream of image data encoded by the MPEG encoder 20 is inputted to a bit stream image input terminal 8. The watermark bit stream detecting apparatus 40 receives input of the bit stream image and the pattern of a unit watermark wm, and outputs information of the watermark added to the image. Similarly to the foregoing, the information of the watermark is a shift amount of a position where the watermark is detected if the watermark exists on the bit stream image, and is information indicating that there is no watermark if the watermark does not exist on the bit stream image.

The watermark bit stream detecting apparatus 40 of FIG. 14 has almost the same structure as the watermark baseband detecting apparatus 30 of FIG. 9 except a portion. That is, the folding accumulator 301, the FFT unit 302, the convolution arithmetic unit 303, the FFT unit 304, the reverse FFT unit 305, the maximum detector 306, the variance calculator 307, the normalizing unit 308, the threshold value comparator 309, and the output controller 310 of FIG. 9 correspond to a folding accumulator 401, an FFT unit 402, a convolution arithmetic unit 403, an FFT unit 404, a reverse FFT unit 405, a maximum detector 406, a variance calculator 407, a normalizing unit 408, a threshold value comparator 409, and an output controller 410 of FIG. 14, respectively.

The difference from the watermark baseband detecting apparatus 30 of FIG. 9 is that the input is changed from baseband image data to bit stream image data, and a DCT (Discrete Cosine Transform) coefficient extractor 411 and a reverse DCT unit 412 are newly provided before and after the folding accumulator 301. In the following, a description will be made mainly on different points from the watermark baseband detecting apparatus 30 of FIG. 9.

Bit stream image data inputted through the bit stream input terminal 8 is partially decoded by the DCT coefficient extractor 411, and a DCT coefficient of I picture is extracted.

Here, if reverse DCT is applied to the DCT coefficient to convert it into a pixel value in a space region, it is possible to subsequently make detection by the same apparatus as the watermark baseband detecting apparatus 30 of FIG. 9. However, in order to decrease a calculation amount, in the watermark bit stream detecting apparatus 40 of FIG. 14, the output of the DCT coefficient extractor 411 is supplied to the folding accumulator 401, and after folding accumulation is performed, it is supplied to the reverse DCT unit 412 and reverse DCT is performed.

In the case of an encoding system like MPEG2, DCT of two modes of a frame and a field is adaptively used. FIGS. 15A and 15B show a block in the case of DCT of the frame mode, and FIGS. 16A and 16B show a block in the case of DCT of the field mode.

That is, in the frame mode, a macro block 201 of FIG. 15A is divided into four DCT blocks 202, 203, 204 and 205 shown in FIG. 15B. In the field mode, a macro block 201 of FIG. 16A is divided into four DCT blocks 206, 207, 208 and 209 shown in FIG. 16B.

As shown in FIGS. 15A and 15B and FIGS. 16A and 16B, the ranges of pixels occupied by the block where the frame DCT is performed and the block where the field DCT is performed are different from each other.

However, it is common that a region where two DCT blocks are vertically combined is a region of horizontal× vertical =8×16 pixels. In this example, in order to make it possible to deal with any case where DCT is performed in any mode of the frame mode and the field mode, a region of 8×16 pixels in which two DCT blocks are vertically combined is treated as one unit encoded block.

When an image is divided into the encoded blocks (DCT blocks), a set of coefficients of a block at a x-th position in the horizontal direction and at a y-th position in the vertical direction, that is, a set of coefficients of two DCT blocks starting from a pixel with a coordinate of horizontal 8x and vertical 16y is divided into a portion where the frame DCT is used and a portion where the field DCT is used, and they are made FrDCT(x, y, t) and FiDCT(x, y, t), respectively. Here, counting of a number begins from zero.

The folding accumulator 401 receives these DCT coefficients from the DCT coefficient extractor 411, performs folding accumulation, and transfers them to the reverse DCT unit 412. When what was subjected to the folding accumulation are made foldFrDCT(x, y) and foldFiDCT(x, y), they are expressed by the following equations.

$$foldFrDCT(x, y) = \Sigma FrDCT(i, j, t)$$

$$i\%(L/8)=x, j\%(L/16)=y$$

$$foldFiDCT(x, y) = \Sigma FiDCT(i, j, t)$$

$$i\%(L/8)=x, j\%(L/16)=y$$

However, in order that folding accumulation can be made without any change to this DCT region, it is assumed that L/8 and L/16 can be divided and is an integer.

For example, in the case of FIG. 17A, the size of the unit watermark is L=32. In this case, in the range of the unit watermark, as shown in FIG. 17A, there are encoded blocks of 8×16 pixels, the number thereof being 4 (=L/8) in the horizontal direction and 2 (=L/16) in the vertical direction. In this case, since the size can be divided so that L/8=4 and L/16=2 are established, folding accumulation can be made without any change to the DCT region. That is, with respect to eight blocks of 8×16 pixels in the range of the region of L×L of the unit watermark, as shown in FIGS. 17B and 17C, accumulation is performed after division is made into the frame DCT and the field DCT.

In the reverse DCT unit 412, the DCT coefficient of accumulated output of the folding accumulator 401 is subjected to reverse DCT to return it into the space region, and it is sent to the FFT unit 402. The value sent to the FFT unit 402 is such that the number of elements is L×L, each is the sum of pixel values, and is the same as the output of the folding accumulator 301 of FIG. 9. The subsequent steps are the same as the case of the baseband.

In the adding apparatus and the detecting apparatus of the watermark as described above, by a method in which mapping is performed into the FFT space and a search in the space is performed through convolution in the FFT space, detection of a shift of the watermark over the whole image is made possible. Besides, FFT is applied after the image is subjected to folding accumulation, so that the calculation amount of the FFT is decreased.

In the format of moving pictures, there are a plurality of resolutions such as a normal resolution SD (Standard Definition) and a high resolution HD (High Definition). The resolution is further divided in the SD and HD, and resolutions as shown in the table of FIG. 18 are generally used.

Here, a letter box conversion and a pan scan set forth in the table of FIG. 18 will be described in brief.

As shown in FIGS. 19A and 19B, an aspect ratio of an image of video material and that of movie material are 4:3 and 16:9, respectively. As a method of converting a movie material into a video material and recording, the following two methods are mainly used.

The first method is such a method as to convert the movie material of a picture frame of FIG. 20A into the video material as shown in FIG. 20C, in which upper and lower portions of a video image are made surplus, and the image is displayed in a region of 16:9 of the center portion. The surplus upper and lower portions are generally filled with black. This display method is called letter box display, and its image is called a letter box image.

The second method is such a method that the movie material of the picture frame of FIG. 20A is scaled down by a factor of ¾ time in the horizontal direction as shown at left and lower side in FIG. 20B and is displayed in the whole region (4:3 region) of the video image. The image is contracted in the horizontal direction. This display method is called squeeze display, and its image is called a squeeze image.

Conversion of the squeeze image into the letter box image is called letter box conversion. As shown in the two drawings of FIGS. 20B and 20C, the letter box conversion is such conversion that the squeeze image of FIG. 20B is scaled down by a factor of ¾ time in the vertical direction. As described before, the squeeze image is scaled down by a factor of ¾ time in the horizontal direction, so that an object is displayed to be thinner than the actual state. Thus, when the image is displayed for appreciation, it is necessary to perform the letter box conversion.

The letter box image has an advantage that the appreciation can be made when the movie image is displayed as it is. On the other hand, the squeeze image has an advantage that the picture quality is excellent since the resolution of the video picture frame in the vertical direction is effectively used. In the letter box image, the picture quality is inferior since there are pixels in the upper and lower portions, which are not effectively used.

The pan scan corresponds to FIG. 19A. In the pan scan, right and left image portions are cut away from the picture frame of the movie image of 16:9 of FIG. 19B and the region of 4:3 is extracted. Since the right and left image portions are cut away, the information is lost. However, all pixels of the 4:3 picture frame are effectively used, and can be watched when the image is displayed as it is. Thus, there are many opportunities where this pan scan is used.

When the foregoing resolution conversion is performed, if such a state occurs that a watermark embedded in the image can not be detected and the associated information such as copyright information can not be extracted, this is a problem. The following two methods are conceivable as methods of solving the problem.

The first solution is a method in which separate watermarks are added for the respective resolutions before and after the resolution conversion. The second solution is such a method as to enable a watermark added at one resolution to be detected at another resolution.

In the first solution, it is possible to consider a method in which the separate watermarks before and after the resolution conversion are added to separate places of the image in space or in time, and a method in which the watermarks are added to the same place of the image in space and in time. In the case where the watermarks are added to the separate places in space or in time, an amount of addition per unit time is decreased for the respective watermarks. Thus, there is a defect that detection accuracy is lowered when detection is made in the same time, while a detection time is prolonged in order to keep the same detection accuracy.

On the other hand, in the case where the watermarks are added to the same place in space and in time, signals of the two watermarks are added to the image to overlap with each other. Thus, there is a problem that the patterns of the watermarks become easy to be seen as noises added to the original image so that the picture quality is deteriorated.

In the case where the first solution is used, it becomes necessary to add separate watermarks for all resolutions regarded as having a possibility that resolution conversion is performed. Thus, there is a problem that as the resolutions to be made corresponding increase, sacrifice of detection accuracy, detection time, and picture quality becomes large.

Thus, the second solution, that is, the method in which a watermark added at one resolution can be detected at another resolution, is important.

With respect to detection in the baseband, such a method has been considered that an input image (image after resolution conversion) to a detecting device is returned to an image of the original resolution (image before the resolution conversion) through a filter in advance, and the image is inputted to a normal watermark detecting apparatus.

For example, let us consider detection of a watermark in the case where resolution conversion is made from a format of 720 horizontal pixels by 480 vertical pixels (or lines, and the same applies to the following) as the most general resolution of SD to a format of 480 horizontal pixels of ⅔ thereof by 480 vertical pixels.

The watermark is added in the format of 720 horizontal pixels by 480 vertical pixels before the resolution conversion, and in order to detect the watermark after the resolution conversion to the format of 480 horizontal pixels by 480 vertical pixels, in the baseband, an input image to a detecting apparatus is previously enlarged by using an enlarging filter in the horizontal direction by a factor of 3/2 times, and the image is inputted to a normal watermark detecting apparatus and is detect.

However, in this method, for the purpose of detecting the watermark of the image which has been subjected to the resolution conversion, processing equivalent to returning the image to the original resolution becomes necessary, so that the structure becomes complicated. Since it is difficult to apply filtering of resolution conversion to a DCT coefficient in a DCT region, there is a problem that watermark detection in the bit stream is actually impossible in this method. Although there is a method of decoding the image of the baseband from the bit stream, since the processing amount of decoding is large in this method, it is not preferable.

OBJECT AND SUMMARY OF THE INVENTION

In view of the problem of the first solution and the problem of the second solution, the present invention has an object to provide a method and an apparatus in which in both a baseband and a bit stream, it is possible to detect the same watermark in both cases before and after resolution conversion is performed, and it is possible to suppress a lowering of detection accuracy, an increase of detection time, a deterioration of picture quality, and an increase of detection processing amount.

The invention is an information adding apparatus and method for adding information as a watermark to an image, which generates a unit watermark having a size corresponding to a small region made of vertical×horizontal=M×N (M and N are respectively a positive integer) pixels of a part of the image, generates a repetitive watermark in which the unit watermark pattern from a unit watermark pattern generator is repeated vertically and horizontally, checks the repetitive watermark, and adds the watermark to the image, and is characterized in that in the unit watermark pattern generator, at all resolutions expected that resolution conversion is performed on the image, a size of the unit watermark pattern is determined such that each of a vertical size and a horizontal size of the unit watermark is integer times as larger as a size of an encoded block at image encoding.

By this, the size of the unit watermark pattern is integer times as large as the size of the encoded block at the image encoding at all resolutions expected that the resolution conversion is performed. Thus, at the time of detection of associated information, if the resolution of the image information is known, it is possible to know, at the resolution, what times as large as the encoded block the unit watermark is, and folding accumulation becomes possible in a unit of an integer number of encoded blocks, which is equal to the size of the unit watermark pattern.

Also in the bit stream, folding accumulation is performed as to the unit watermark pattern integer times as large as the encoded block, and detection of the watermark can be made.

Moreover, the invention is an information detecting apparatus and method in which a watermark pattern and an image are checked with each other for every small region made of vertical×horizontal=M×N (M and N are respectively a positive integer) pixels of a part of the image, information is embedded as a watermark in the image on the basis of the watermark pattern, and the information is detected from an image constructed by applying resolution conversion or picture frame conversion to the image embedded with the information, and which is characterized in that the watermark pattern is converted correspondingly to the resolution conversion or picture frame conversion, checking is performed against the watermark pattern made correspondent to at least a part of an encoded block in the image subjected to the resolution conversion or picture frame conversion, an evaluation value as to the image is calculated, and the evaluation value is compared with a predetermined threshold value to judge whether the watermark is added or not.

BRIEF DESCRIPTION OF THE DRAWINGS

FIGS. 15A and 15B are views for explaining an encoded block (DCT block) at the time of a frame mode of MPEG compression encoding.

FIGS. 16A and 16B are views for explaining an encoded block (DCT block) at the time of a field mode of MPEG compression encoding.

FIG. 18 is a view showing all resolutions conceivable as image information.

FIGS. 22A and 22B are views used for explaining the main portion of the embodiment of FIG. 21.

FIGS. 29A and 29B are views for explaining an addition block of a watermark pattern.

FIGS. 31A to 31C are views for explaining an image of letter box conversion.

FIGS. 32A to 32C are views for explaining an image of letter box conversion.

FIGS. 34A to 34C are views for explaining relation of pixels between an addition block and an encoded block.

FIGS. 38A to 38C are views for explaining relation of pixels between an addition block and an encoded block.

FIGS. 39A to 39D are views for explaining relation of pixels between an addition block and an encoded block.

DETAILED DESCRIPTION OF THE INVENTION

Figure 1:
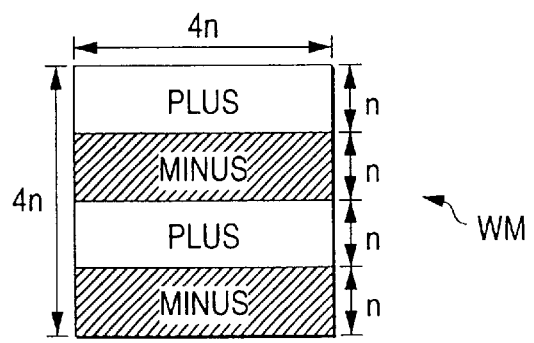
FIG. 1 is a view for explaining a watermark embedded in an image.
Figure 2:
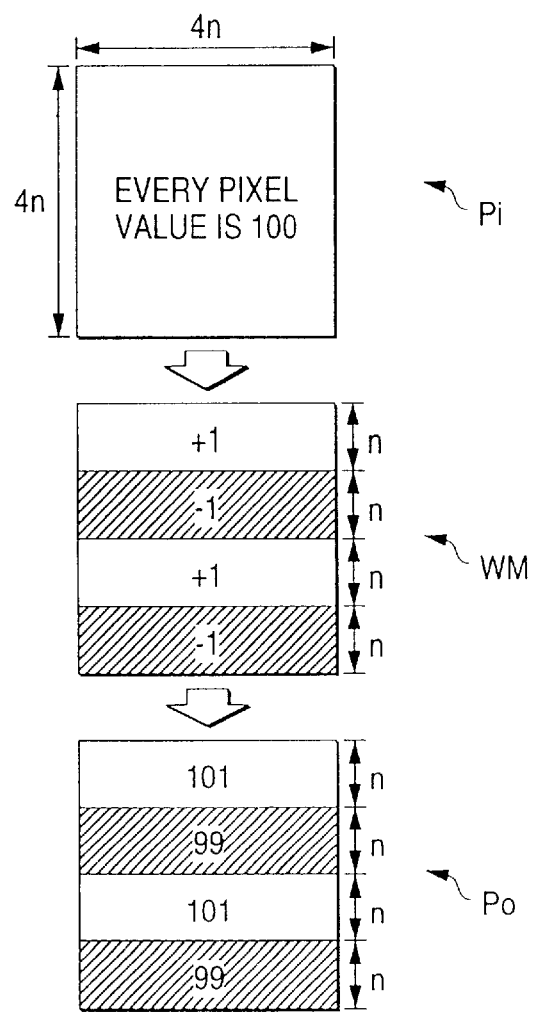
FIG. 2 is a view for explaining a watermark embedded in an image.
Figure 3:
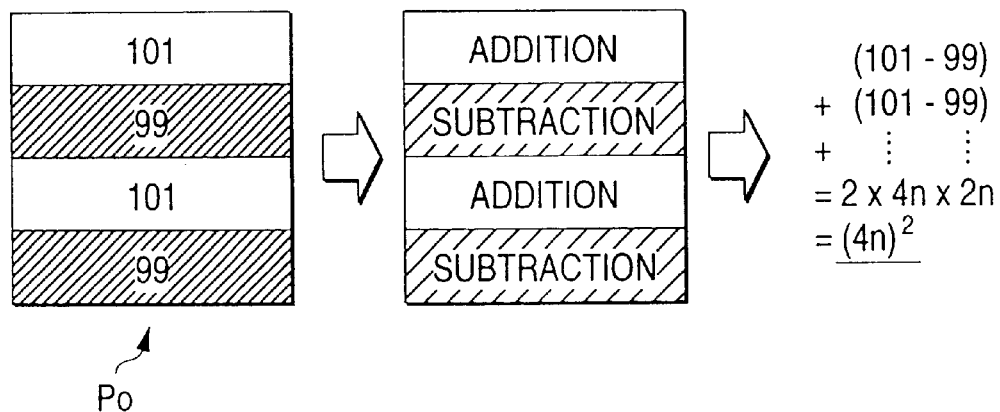
FIG. 3 is a view for explaining a watermark embedded in an image.
Figure 4:
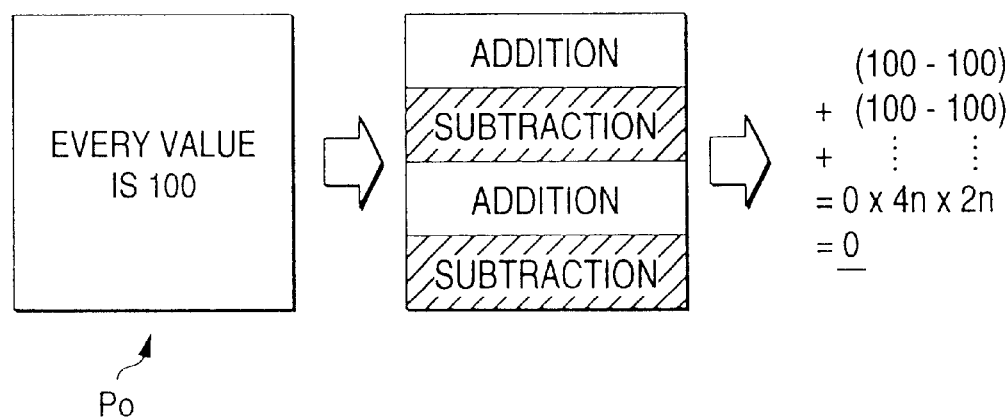
FIG. 4 is a view for explaining a watermark embedded in an image.
Figure 5:
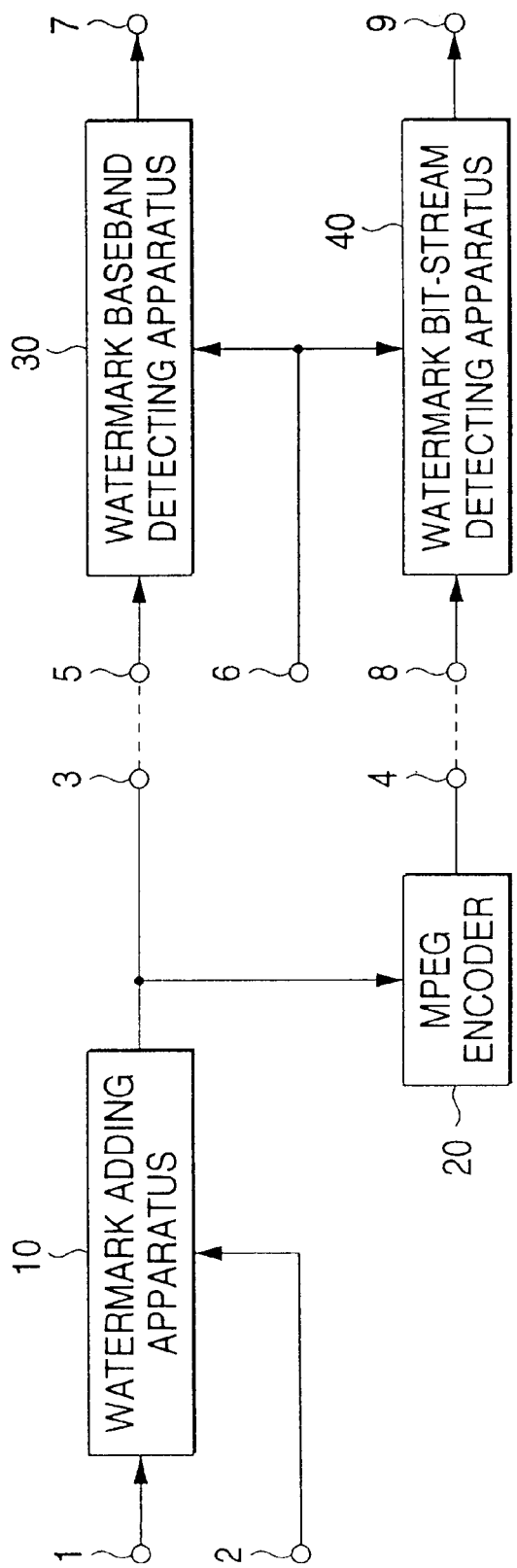
FIG. 5 is a view for explaining the flow of a system structure including an associated information adding apparatus and an associated information detecting apparatus.

Embodiments of the present invention will be described below with reference to the drawings. Also in the embodiments described below, the flow of information in relation to addition and detection of a watermark is the same as that shown in FIG. 5 except portions in relation to resolution conversion. Then, portions corresponding to the foregoing set forth in the Related Art section are designated by the same reference numerals and signs for facilitation of understanding of the embodiments.

In the following description of the embodiments, MPEG2 adaptively using a frame DCT and field DCT is assumed, and the description will be made on the case where a block having a size of horizontal×vertical=8 pixels×16 pixels is used as an encoded block for image encoding. Incidentally, in order to prevent the description from becoming redundant, the encoded block is simply referred to as a block.

First Embodiment

A first embodiment relates to a watermark adding apparatus for adding a watermark in which, in the case where an image added with a watermark is mutually converted into a plurality of resolutions, the watermark can be easily detected on the encoded bit stream.

In this first embodiment, as specific examples, all of conceivable resolutions are two kinds of resolutions of 720 horizontal pixels by 480 vertical pixels and 480 horizontal pixels by 480 vertical pixels, and a description will be made on addition of a watermark corresponding to the case where mutual resolution conversion is made between them.

Figure 6:
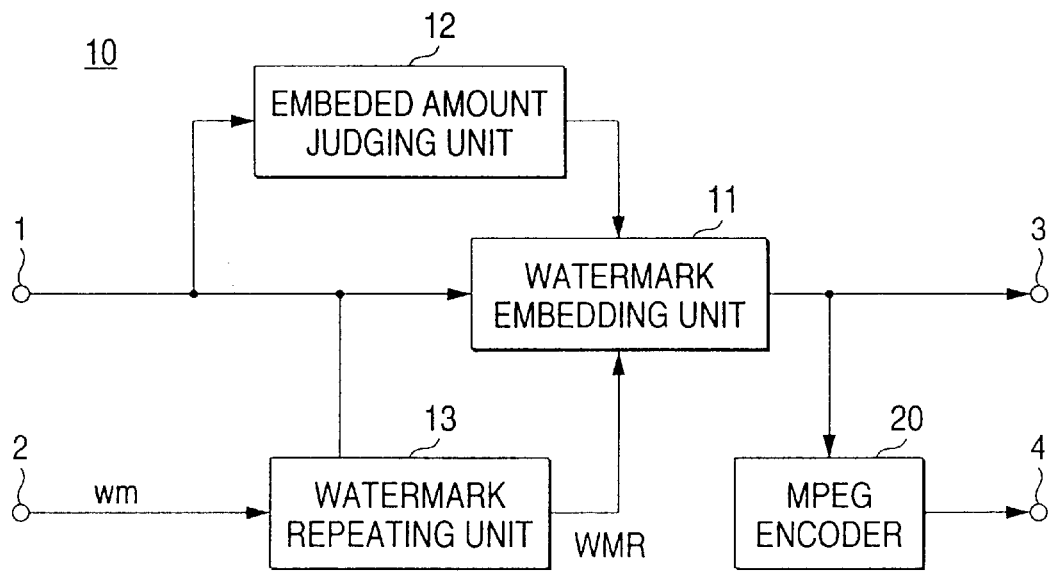
FIG. 6 is a block diagram of an associated information adding apparatus.
Figure 7:
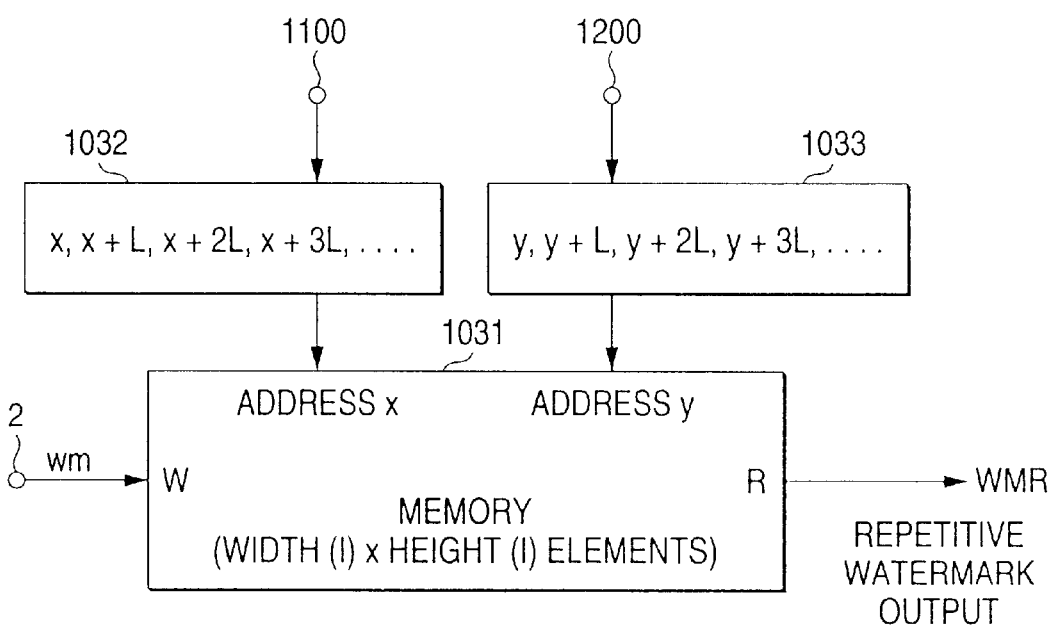
FIG. 7 is a block diagram of a watermark repeating unit.
Figure 8A:
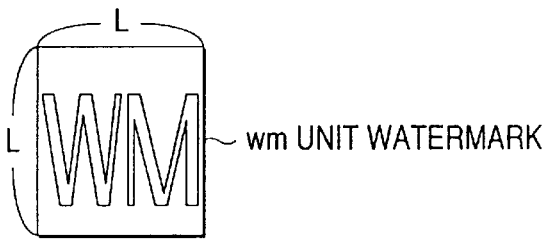
FIGS. 8A to 8C are views for explaining generation of a repetitive watermark.
Figure 8B:
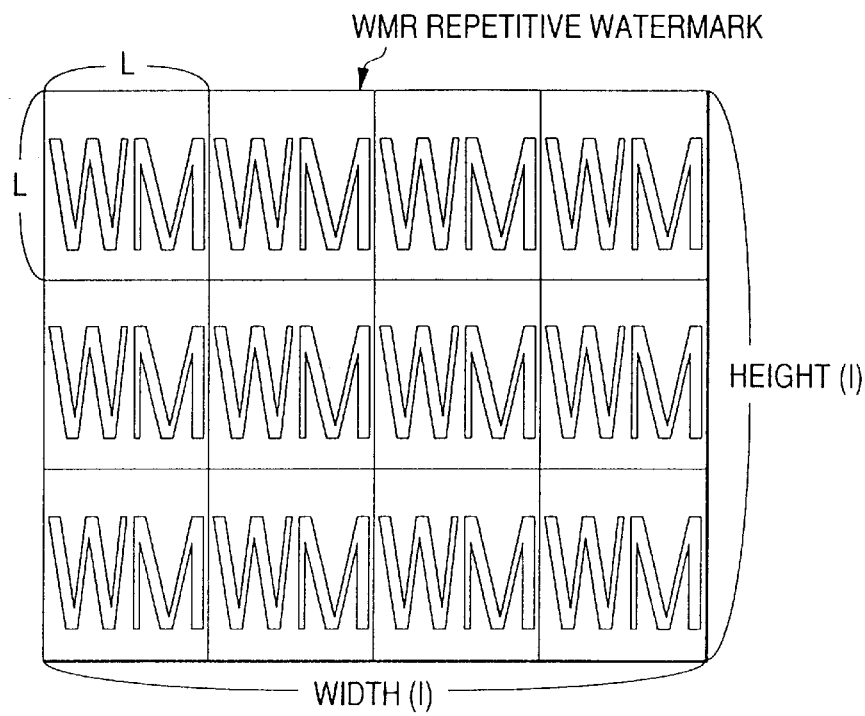
Figure 8C:
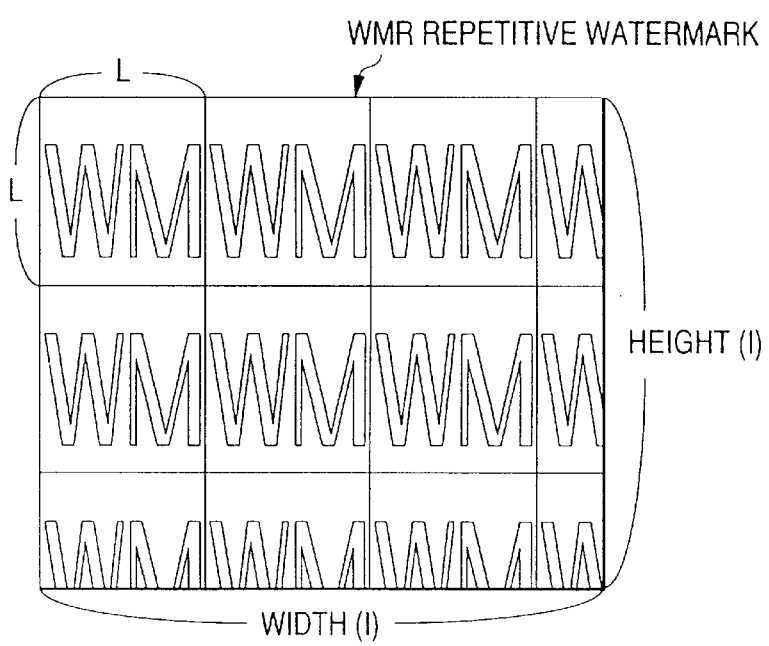
Figure 9:
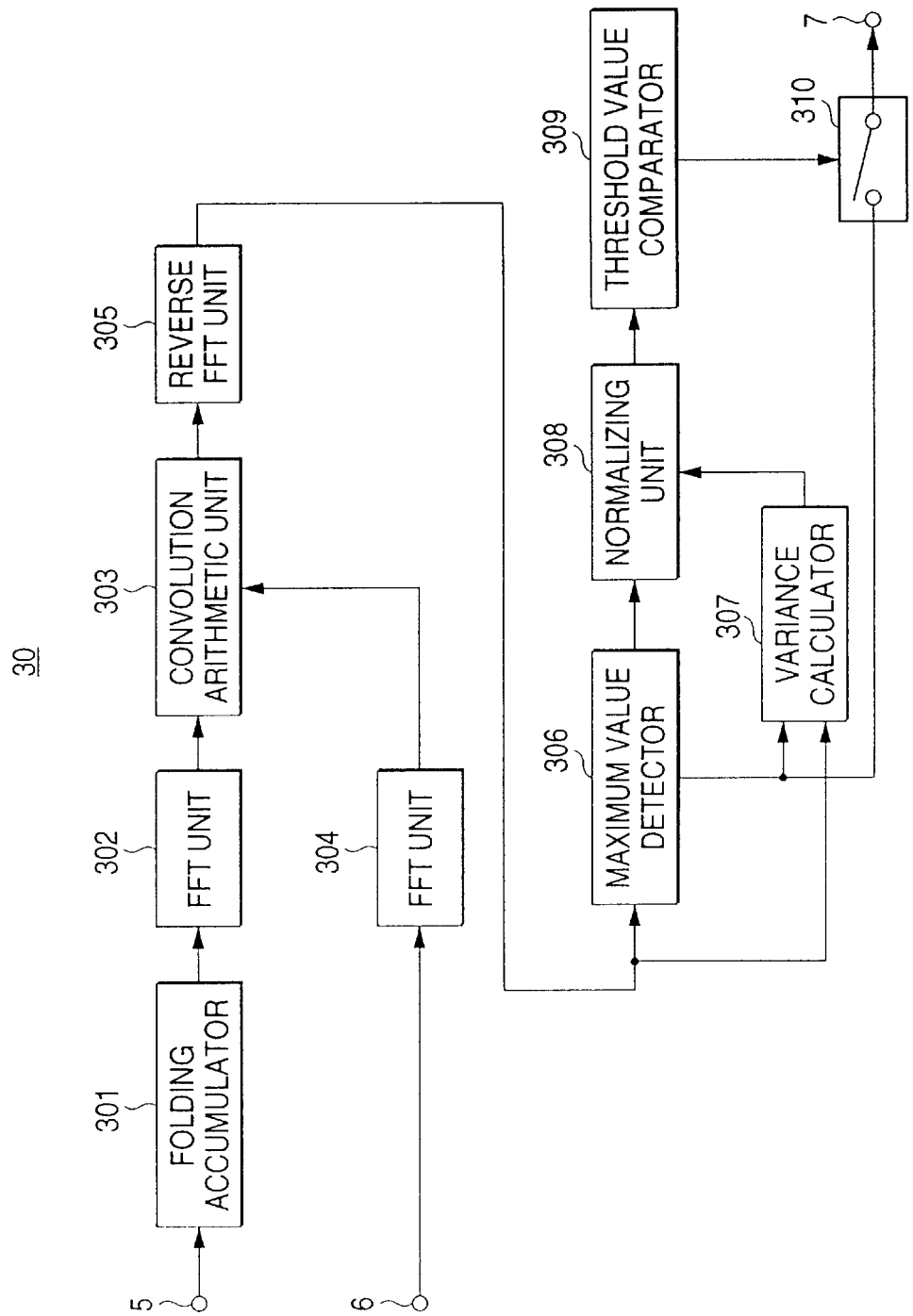
FIG. 9 is a block diagram of a watermark baseband detecting apparatus.
Figure 10B:
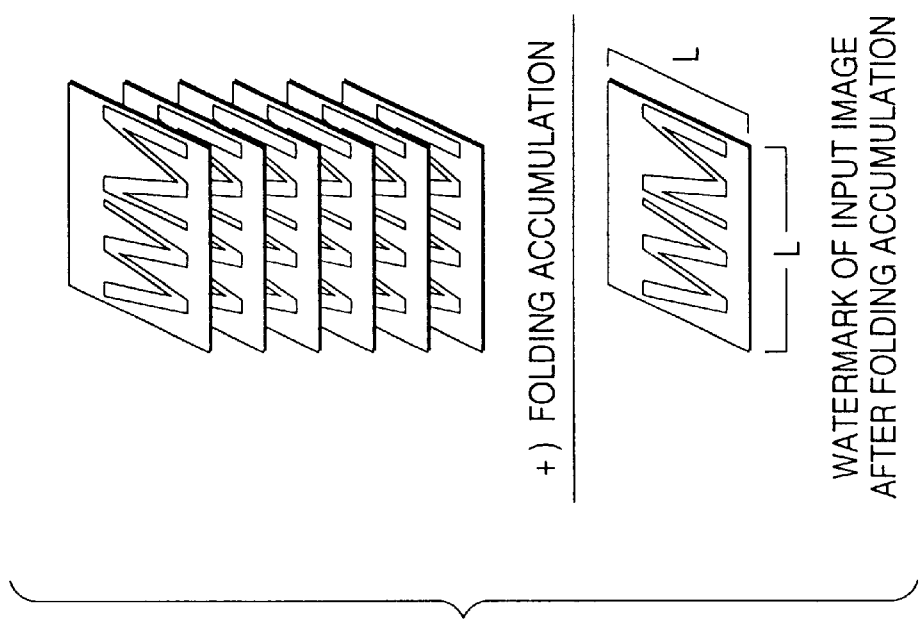
FIGS. 10A and 10B are views for explaining a folding accumulation process for detecting a watermark.
Figure 10A:
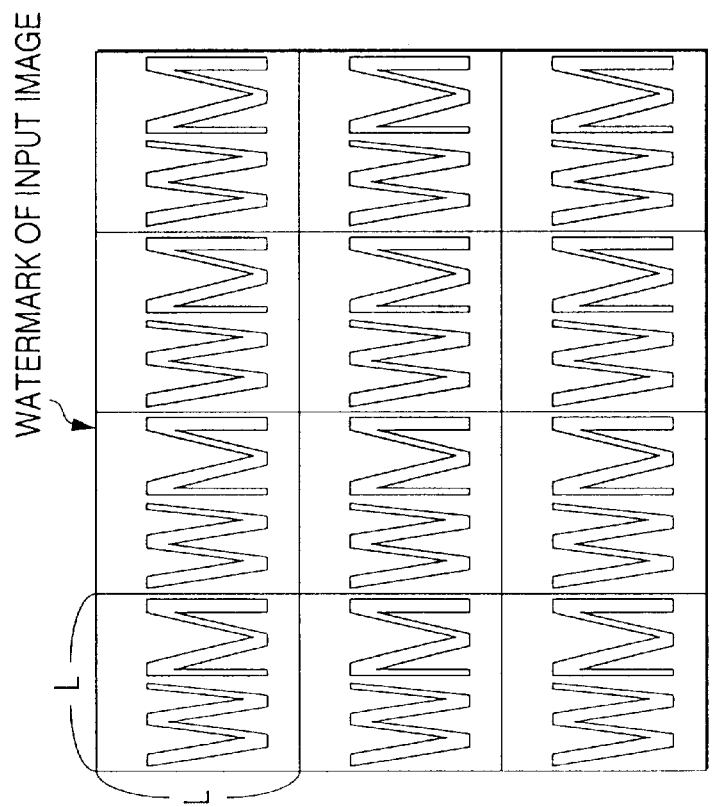
Figure 11:
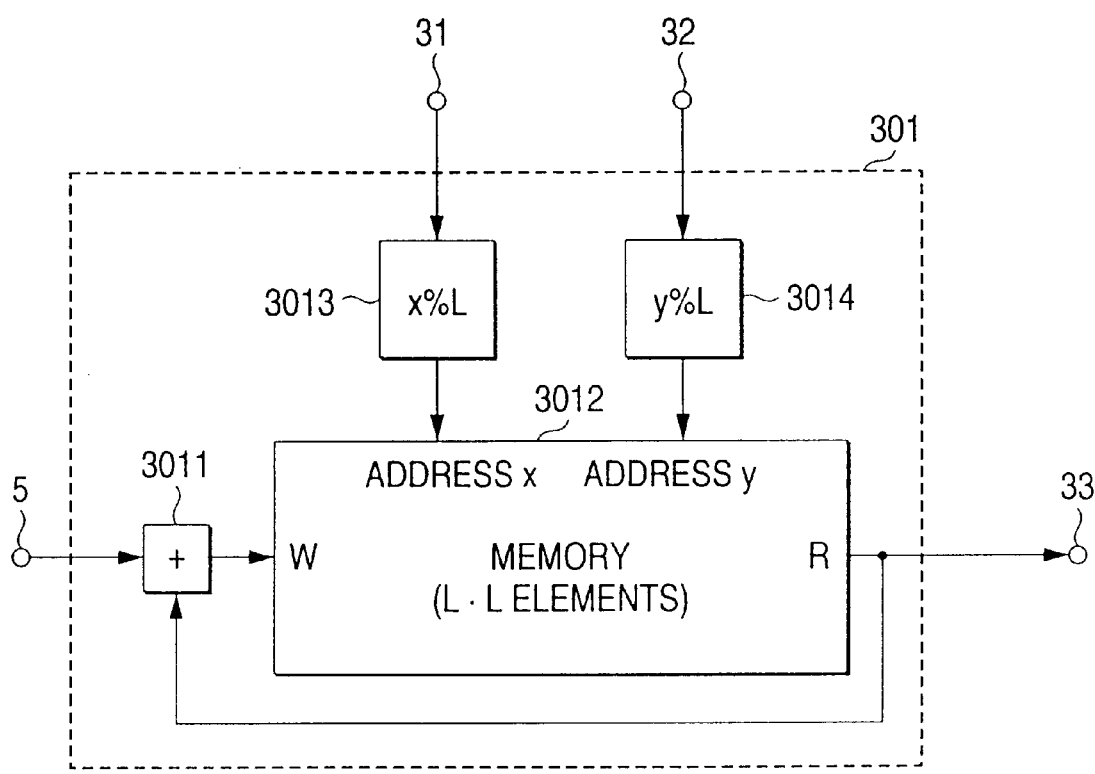
FIG. 11 is a block diagram of an example of a folding accumulator.
Figure 12A:
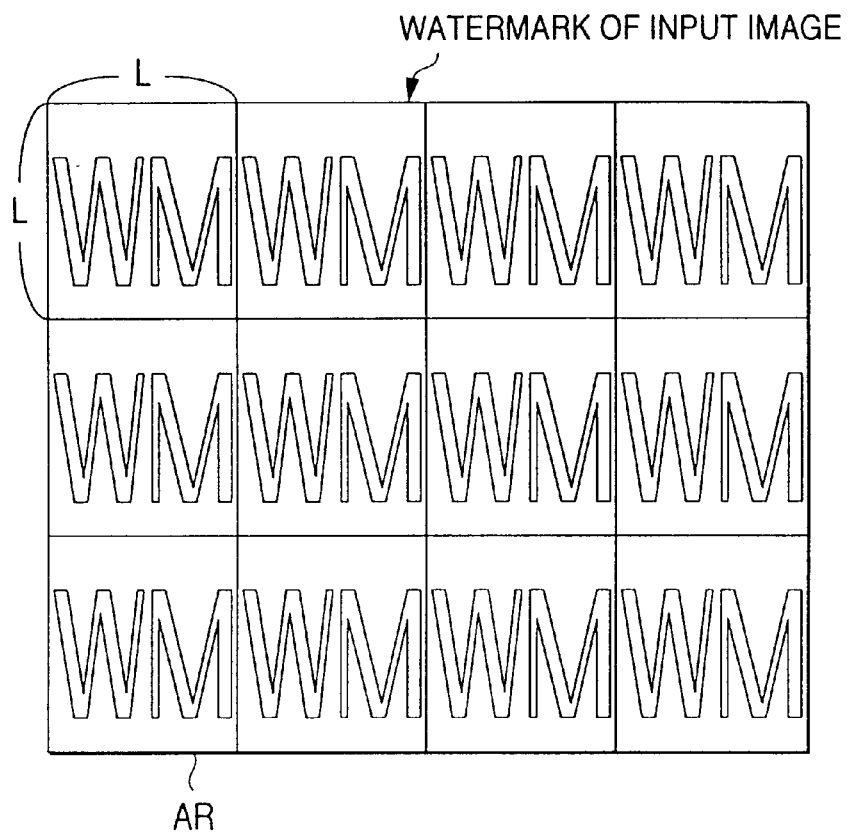
FIGS. 12A and 12B are views for explaining an accumulated result of folding accumulation.
Figure 12B:
Figure 13A:
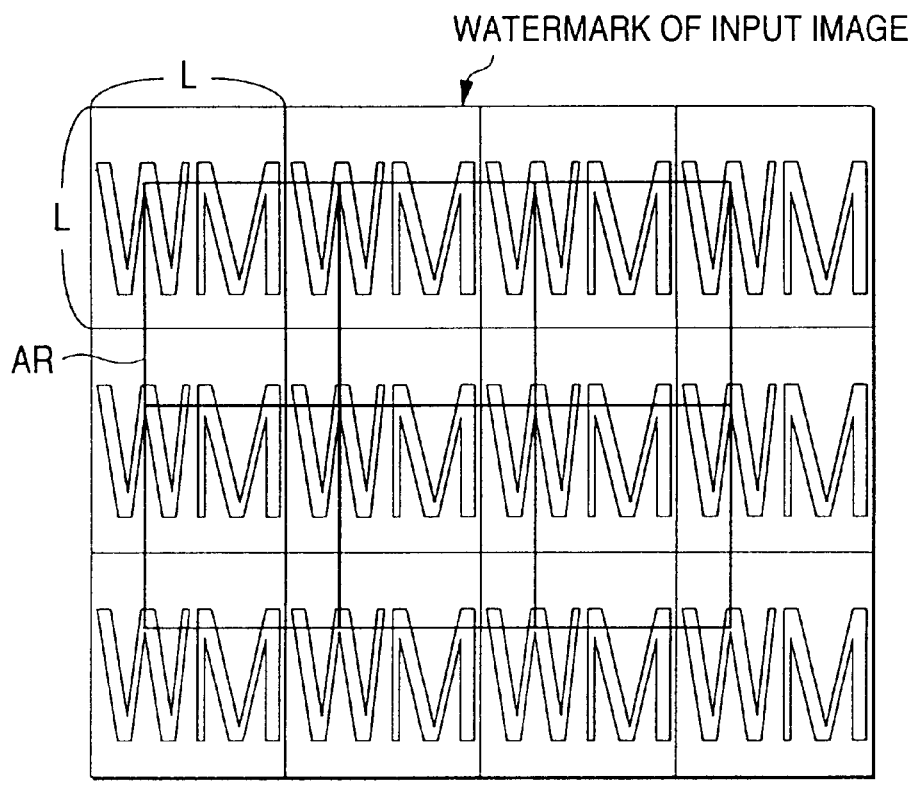
FIGS. 13A and 13B are views for explaining an accumulated result of folding accumulation.
Figure 13B:
Figure 21:
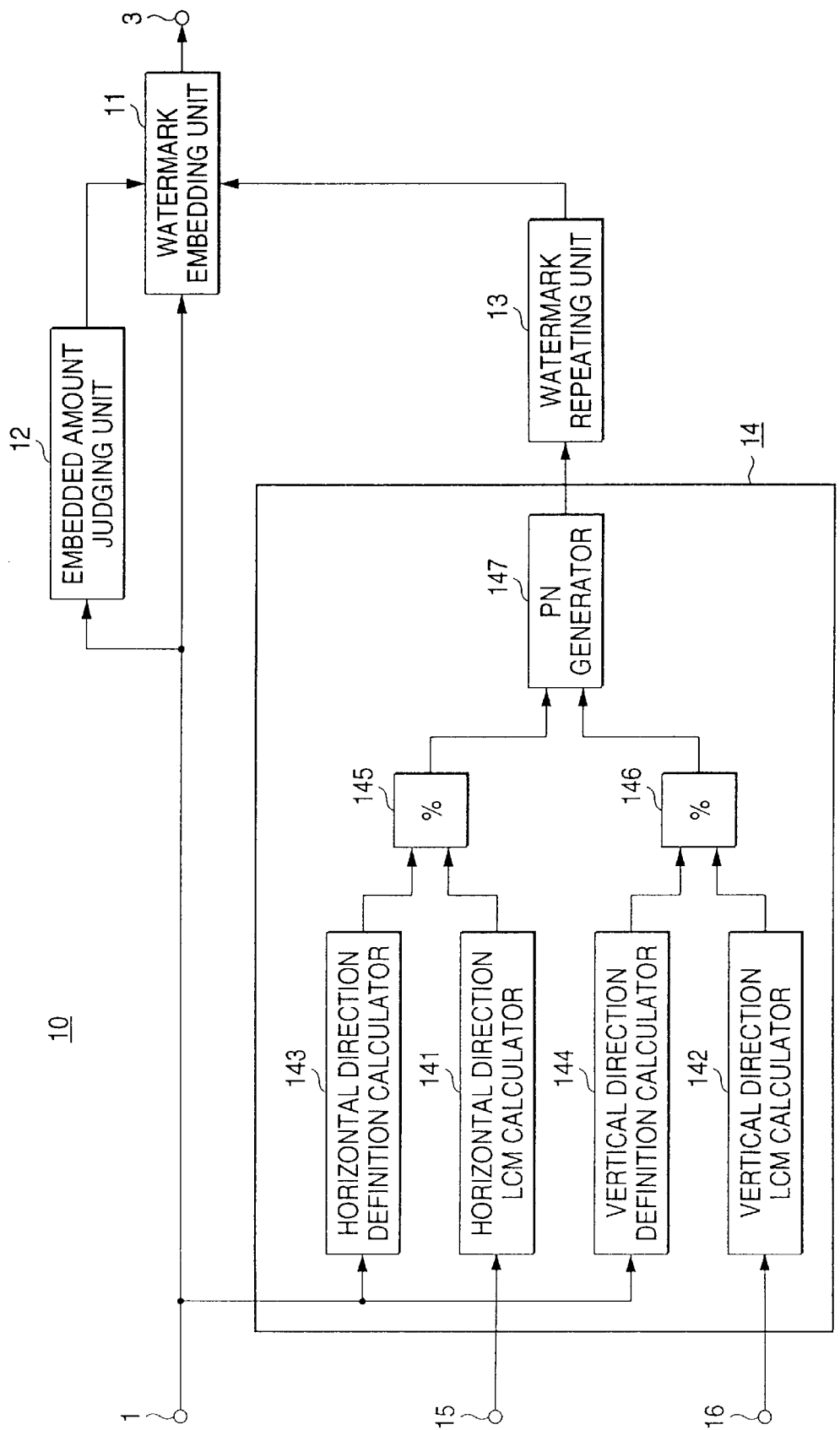
FIG. 21 is a block diagram of an embodiment of an associated information adding apparatus according to the present invention.

FIG. 21 is a block diagram of a watermark adding apparatus as an example of an associated information adding apparatus of the first embodiment. In FIG. 21, portions corresponding to the foregoing watermark adding apparatus shown in FIG. 6 and described in the Related Art section are designated by the same reference numerals.

In FIG. 21, the difference from the Related Art is that a unit watermark generator 14 is provided, and a unit watermark from the unit watermark generator 14 is supplied to a watermark repeating unit 13. Hereinafter, a description will be made mainly on the unit watermark generator 14 which is the different point from the Related Art.

All horizontal direction resolutions (pixel number) of resolutions to be handled, which have possibility that resolution conversion is performed as to an image, are inputted to the unit watermark generator 14 through a horizontal direction resolution input terminal 15, and all vertical direction resolutions (pixel number or line number) of resolutions to be handled, which have possibility that resolution conversion is performed as to the image, are inputted through a vertical direction resolution input terminal 16.

These horizontal direction and vertical direction resolutions are respectively inputted to a horizontal direction LCM (Least Common Multiple) calculator 141 and a vertical direction LCM calculator 142 in the unit watermark generator 14.

The horizontal direction LCM calculator 141 generates terms at a normal horizontal direction resolution side of ratios of a plurality of resolutions inputted to this to a normal horizontal direction resolution (720 pixels), and calculates the least common multiple.

The vertical direction LCM calculator 142 generates terms at a normal vertical direction resolution side of ratios of a plurality of resolutions inputted to this to a normal vertical direction resolution (480 pixels), and calculates the least common multiple.

In the case of the foregoing example, the horizontal direction resolutions are 720 pixels and 480 pixels, and the normal resolution is 720 pixels, so that the horizontal direction LCM calculator 141 calculates the least common multiple of 1 (720:720=1:1) and 3 (720:480=3:2) and outputs 3. Since the vertical direction resolutions are 480 pixels and 480 pixels, the vertical direction LCM calculator 142 calculates the least common multiple of 1 (480:480=1:1) and 1 (480:480=1:1) and outputs 1.

An input image to be added with a watermark is inputted to the unit watermark generator 14 through an image input terminal 1. The input image is inputted to a horizontal direction resolution calculator 143 and a vertical direction resolution calculator 144 of the unit watermark generator 14, and horizontal and vertical direction resolutions are calculated.

An arithmetic unit 145 obtains a value by multiplying the least common multiple of the output of the horizontal direction LCM calculator 141 by a ratio of the normal horizontal direction resolution to the resolution calculated by the horizontal direction resolution calculator 143, and the calculation output is inputted as a size of a unit watermark in the horizontal direction to a PN generator 147. An arithmetic unit 146 obtains a value by multiplying the least common multiple of the output of the vertical direction LCM calculator 142 by a ratio of the normal vertical direction resolution to the resolution calculated by the vertical direction resolution calculator 144, and the calculation output is inputted as a size of the unit watermark in the vertical direction to the PN generator 147.

As a specific example, in the case of the foregoing example, the size of the unit watermark in the horizontal direction is 3 (=3×720/720) blocks, and the size of the unit watermark in the vertical direction is 1 (=1×480/480) block.

The PN generator 147 generates a watermark with a PN series correspondingly to the size of the inputted unit watermark. The PN generator 147 supplies the generated unit watermark made of the PN series to a watermark repeating unit 13. The subsequent processing is the same as the case where in FIG. 6, a unit watermark is an input from the unit watermark input terminal 2.

Specific examples of the size of the unit watermark in the case of the foregoing example are shown in FIGS. 22A and 22B. That is, as shown in an example of FIG. 22A, the size of the unit watermark is 3 horizontal blocks by 1 vertical block when the resolution is 720 horizontal pixels by 480 vertical pixels. Besides, the size is 2 horizontal blocks by 1 vertical block when the resolution is 480 horizontal pixels by 480 vertical pixels. In both resolutions, the size of the unit watermark is integer times as large as an encoded block having a size of 16 pixels×8 pixels.

Actually, in the two LCM calculators 141 and 142, the least common multiple is not strictly calculated, but a common multiple may be calculated. For example, it is assumed that 6 is used as a horizontal direction common multiple and 2 is used as a vertical direction common multiple. In this case, as shown in FIG. 22B, the size of the unit watermark is 6 horizontal blocks by 2 vertical blocks when the resolution is 720 horizontal pixels by 480 vertical pixels, and the size is 4 horizontal blocks by 2 vertical blocks when the resolution is 480 horizontal pixels by 480 vertical pixels. In both resolutions, the size of the unit watermark is integer times as large as the size of the encoded block.

If the number of elements of the unit watermark is the same, an actual series may be generated by a method other than the PN generation. Further, it is needless to say that the size of the encoded block may be a size other than 8 horizontal pixels by 16 vertical pixels.

Although the foregoing examples are those as to two resolutions, three or more resolutions may be inputted through the horizontal direction resolution input terminal 15 and the vertical direction resolution input terminal 16. The operation of the unit watermark generator 14 in that case is the same as the case where two resolutions are inputted, and the calculation of the least common multiple of two numbers is merely changed such that the two LCM calculators 141 and 142 calculate the least common multiple of three or more numbers.

Besides, in the foregoing examples, the values of all possible resolutions in the horizontal direction and the vertical direction are inputted through the horizontal direction resolution input terminal 15 and the vertical direction resolution input terminal 16. However, since possible resolutions are generally fixed to some set in one use object, if the least common multiple is calculated in advance and is embedded in the unit watermark generator 14, the two LCM calculators 141 and 142 are unnecessary.

Incidentally, the size of a unit watermark pattern necessary to correspond to all resolutions of the table of FIG. 18 becomes as follows:

First, in the horizontal direction, the ratios to the normal resolution (720 pixels) become as follows:

| |
|---|
| 720:1920 = 3:8 |
| 720:1440 = 1:2 |
| 720:1280 = 9:16 |
| 720:1080 = 2:3 |
| 720:960 = 3:4 |
| 720:720 = 1:1 |
| 720:640 = 8:7 |
| 720:544 = 4:3 |
| 720:480 = 3:2 |
| 720:360 = 2:1 |

Thus, in this case, the least common multiple obtained in the horizontal direction LCM calculator 141 is 72 of the least common multiple of 3, 1, 9, 2, 3, 1, 8, 4, 3 and 2.

In the vertical direction, ratios to the normal resolution (480 pixels) become as follows:

| |
|---|
| 480:1080 = 4:9 |
| 480:720 = 2:3 |
| 480:576 = 5:6 |
| 480:480 = 1:1 |
| 480:432 = 10:9 |
| 480:360 = 4:3 |

Thus, in this case, the least common multiple obtained by the vertical direction LCM calculator 142 is 20 of the least common multiple of 4, 2, 5, 1, 10 and 4. Thus, the size of the unit watermark pattern is 72 horizontal blocks by 20 vertical blocks, that is, 576 horizontal pixels by 360 vertical pixels.

Second Embodiment

A second embodiment is a watermark detecting apparatus as an associated information detecting apparatus capable of detecting a watermark in a bit stream in the case where the watermark added by the watermark adding apparatus of the first embodiment is converted into a corresponding resolution.

Figure 23:
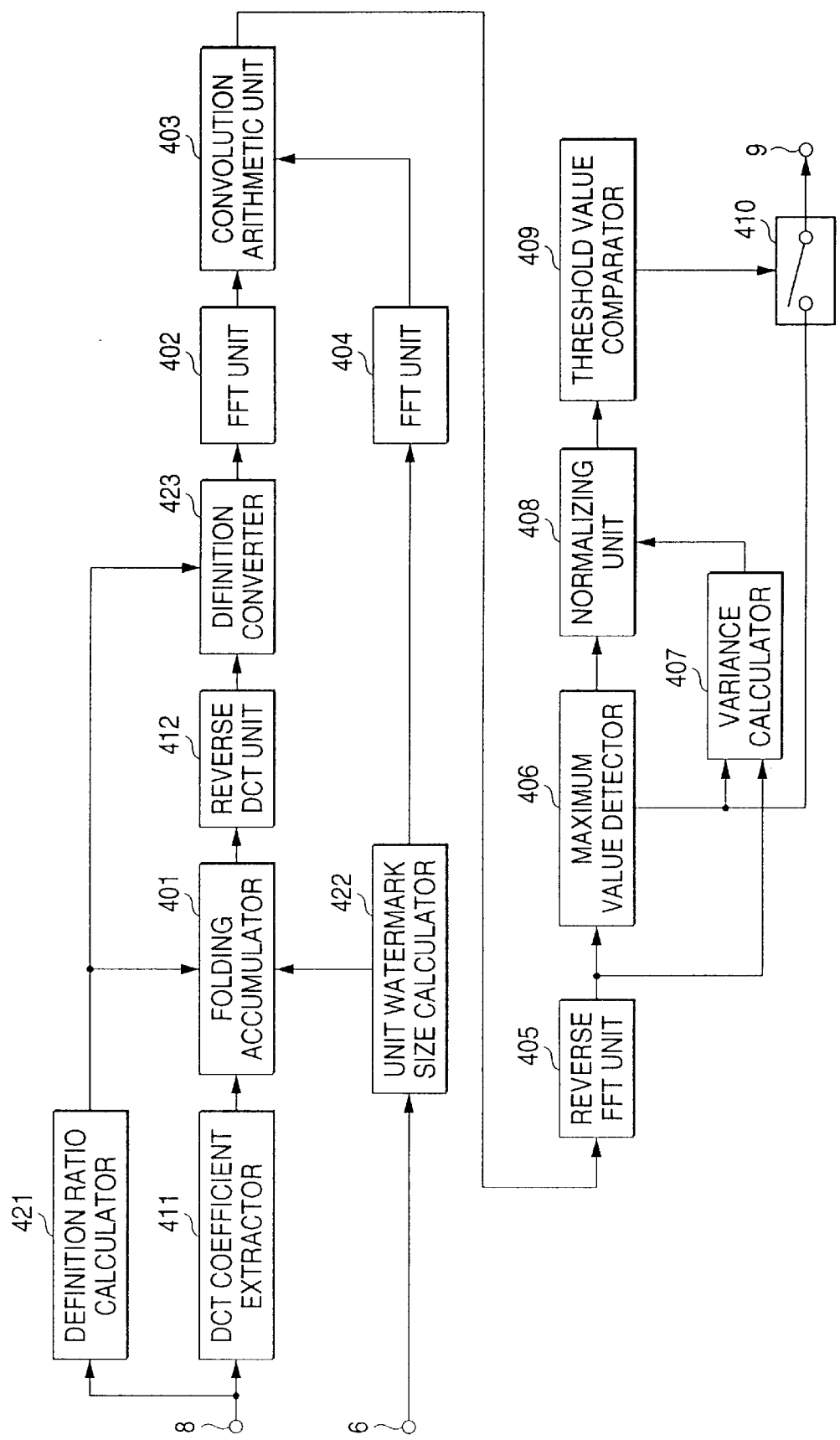
FIG. 23 is a block diagram of an embodiment of an associated information adding apparatus according to the present invention.

FIG. 23 is a block diagram of a watermark bit stream detecting apparatus as the embodiment of the associated information detecting apparatus.

Figure 14:
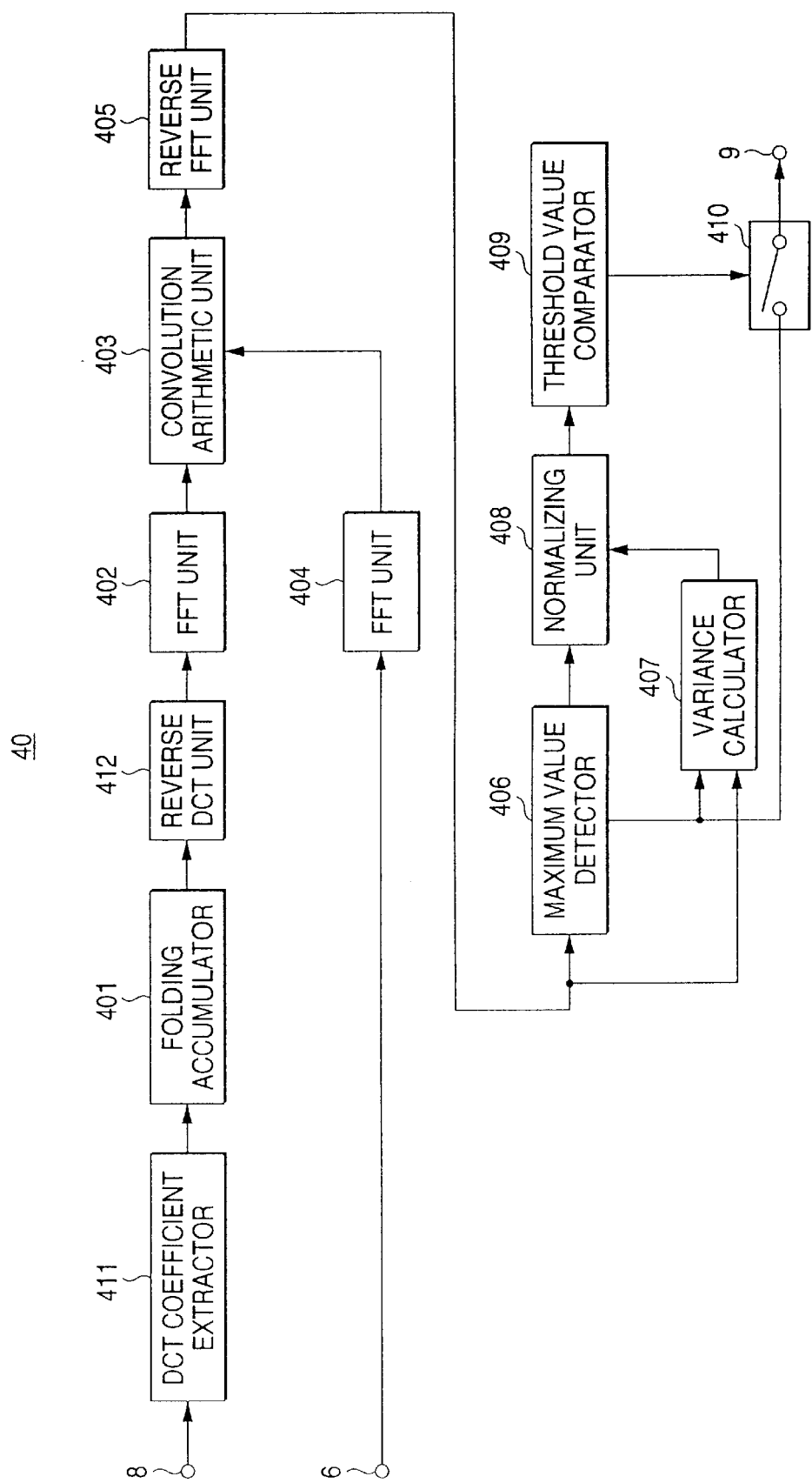
FIG. 14 is a block diagram of a watermark bit stream detecting apparatus.
Figure 17A:
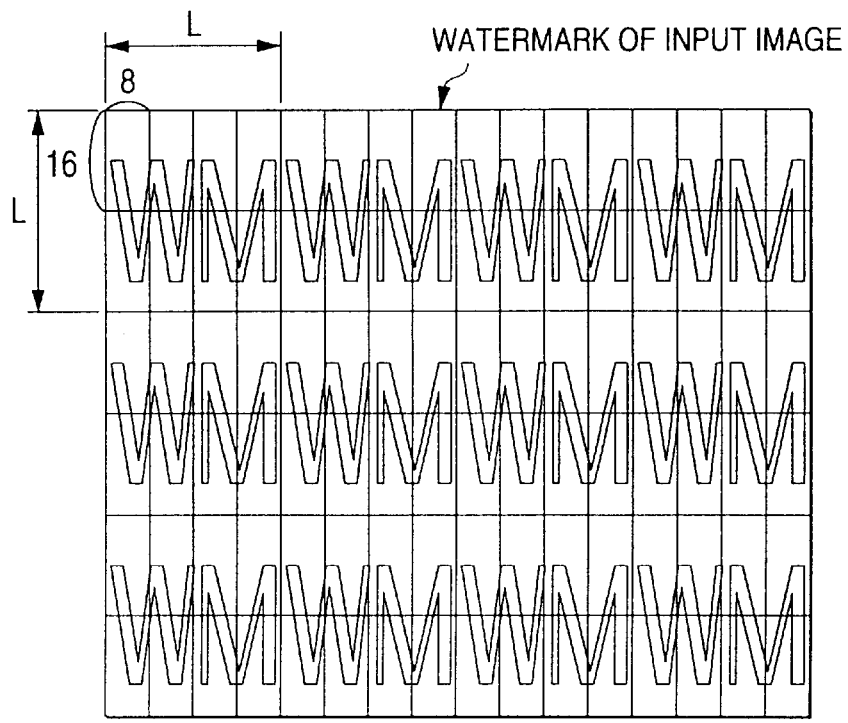
FIGS. 17A to 17C are views for explaining the relation between a size of a unit watermark and an encoded block.
Figure 17B:
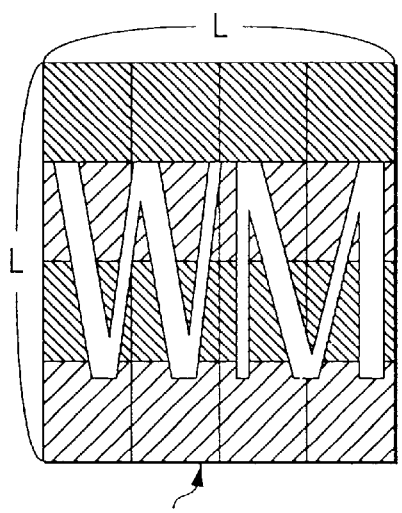
Figure 17C:
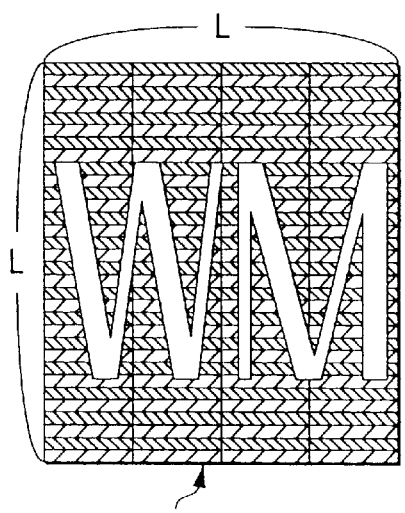
Figure 19A:
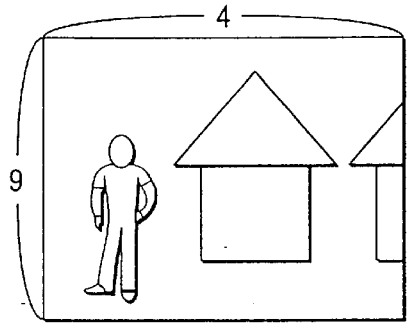
FIGS. 19A and 19B are views for explaining a difference between video material and movie material.
Figure 19B:
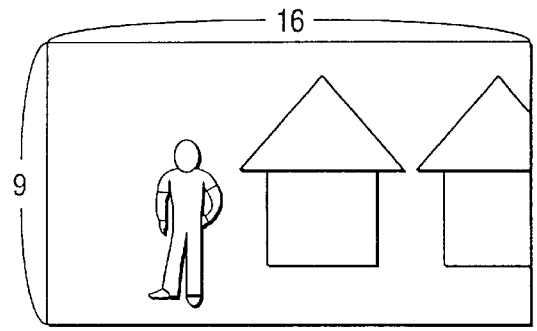
Figure 20A:
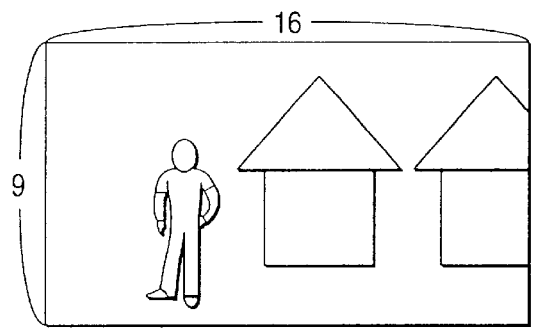
FIGS. 20A to 20C are views for explaining an example of a method of converting movie material to video material.
Figure 20B:
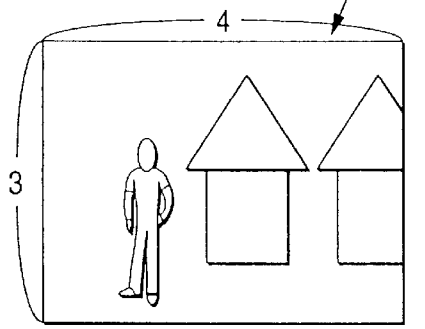
Figure 20C:
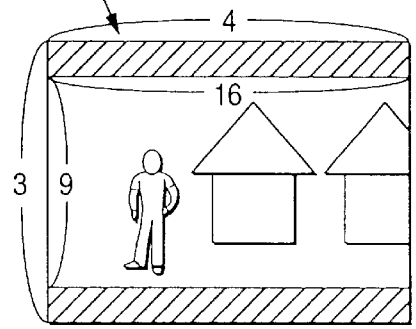

The different point from the watermark bit stream detecting apparatus of FIG. 14 described as the Related Art is such that a resolution ratio calculator 421, a unit watermark size calculator 422, and a resolution converter 423 are added. A description will be made mainly on the different point from the Related Art, that is, the resolution ratio calculator 421, the unit watermark size calculator 422, and the resolution converter 423.

The resolution ratio calculator 421 extracts vertical and horizontal sizes of an input image from a bit stream through an input terminal 8, obtains a ratio to a normal image resolution (720 horizontal pixels by 480 vertical pixels), and sends it to a folding accumulator 401 and the resolution converter 423. The unit watermark size calculator 422 extracts a size (number of horizontal and vertical pixels) of a unit watermark, and sends it to the folding accumulator 401.

In the folding accumulator 401, in each of the vertical and horizontal directions, a value obtained by multiplying the size of the unit watermark from the unit watermark size calculator 422 by the ratio of the actual image resolution to the normal image resolution from the resolution ratio calculator 421 is made a size of an accumulated folding unit region, and accumulation is performed after division into a frame DCT and a field DCT for every folding unit region and with a DCT coefficient without any change.

For example, as input image data, let us consider a bit stream obtained by reducing an image added with a watermark in the example of the foregoing first embodiment to 480 horizontal pixels by 480 vertical pixels and by encoding the image. In the case where the bit stream image data are input from the input terminal 8, the resolution ratio calculator 421 extracts the resolution of 480 horizontal pixels by 480 vertical pixels from the input bit stream. At this time, since the size of the unit watermark calculated by the unit watermark size calculator 422 is 3 horizontal blocks by 1 vertical block, the size of the folding unit region folded by the folding accumulator 401 is 2 (=3×480/720) horizontal blocks and 1 (=1×480/480) vertical block.

In this case, the size of folding accumulation is integer times as large as the encoded block, and since accumulation of DCT coefficients can be made for every encoded block, the watermark can be correctly detected.

Figure 24A:
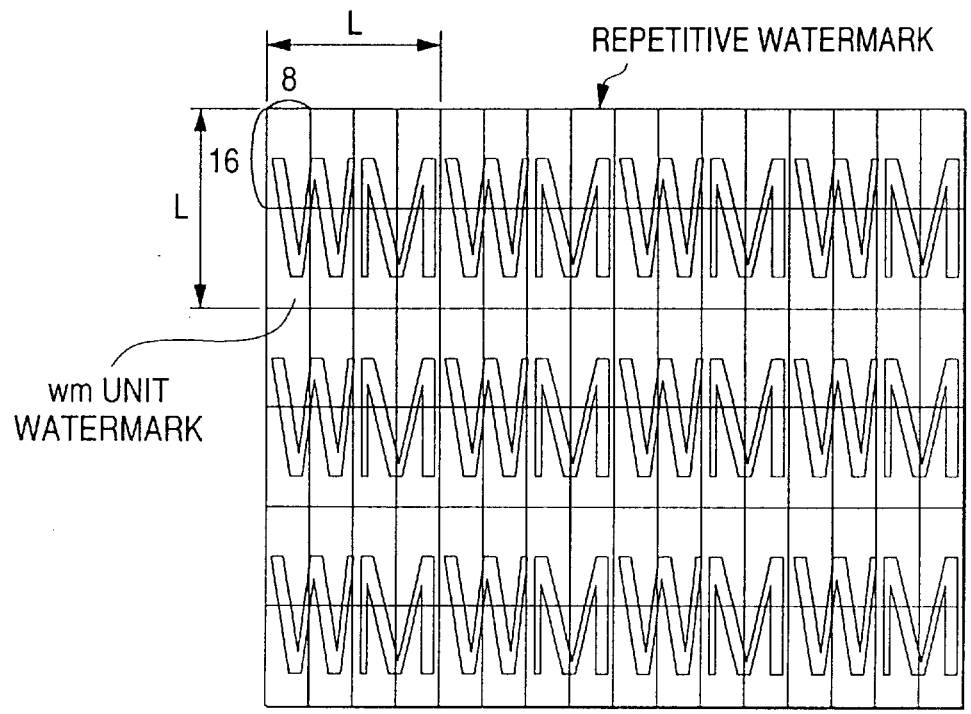
FIGS. 24A and 24B are views used for explaining the main portion of the embodiment of FIG. 23.
Figure 24B:
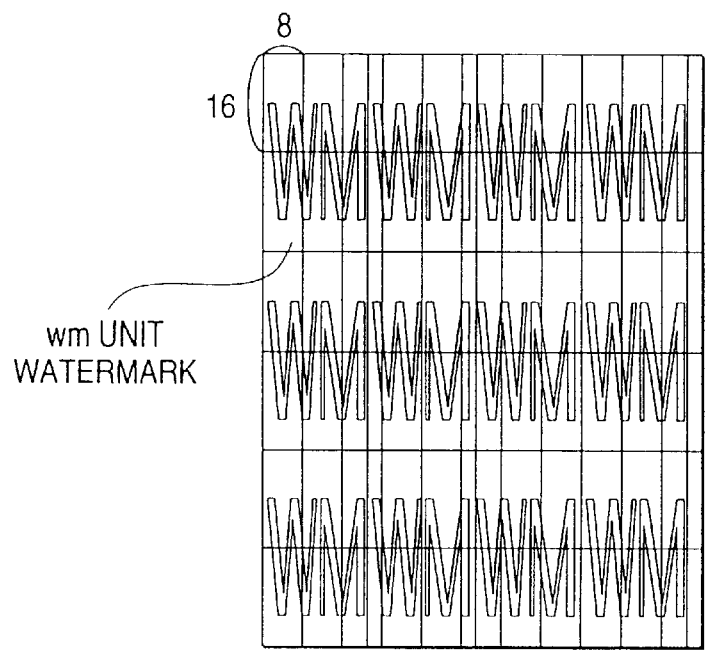

In the case where this size is not integer times as large as the encoded block, accumulation of DCT coefficients for every encoded block becomes impossible. FIG. 24A shows a case where the unit watermark is integer times as large as the encoded block, and FIG. 24B shows a case in which the unit watermark is not integer times as large as the encoded block. In FIGS. 24A and 24B, a character pattern portion of "WM" encircled with a thick line is the unit watermark wm.

In FIG. 24B, since the boundary of the unit watermark wm indicated by the thick line and the boundary of the encoded block of 16 pixels×8 pixels indicated by a thin line are sequentially shifted, it is impossible to accumulate the DCT coefficients of the respective unit watermarks wm as they are.

The DCT coefficient subjected to the folding accumulation by the folding accumulator 401 is sent to a reverse DCT unit 412, and reverse DCT is performed. The result of the reverse DCT is inputted to the resolution converter 423. The resolution converter 423 converts data of the inputted image region into the normal resolution (720 horizontal pixels by 480 vertical pixels). The conversion ratio at that time is informed from the resolution ratio calculator 421. In the case of this example, since the resolution of the input image is 480 horizontal pixels by 480 vertical pixels, it is informed that the conversion ratio is 3/2 (=720/480) times in the horizontal direction and 1 (=480/480) time in the vertical direction.

The data in the image region obtained by the resolution converter 423 and having the same number of elements as the normal resolution unit watermark are sent to an FFT unit 402, and the FFT result is supplied to a convolution arithmetic unit 403. The unit watermark through the unit watermark size calculator 422 is supplied to an FFT unit 404, and the FFT result is supplied to the convolution arithmetic unit 403. The subsequent processing is the same as the Related Art in Feg. 14.

For example, in the case where input image data are a bit stream in which an image added with a watermark in the example of the foregoing first embodiment is encoded while the resolution of 720 horizontal pixels by 480 vertical pixels is not changed, the size of folding by the folding accumulator 401 is 3 (=3×720/720) horizontal blocks by 1 (=1× 480/480) vertical block. An enlargement rate by the resolution converter 423 is 1 (=720/720) in the horizontal direction and 1 (=480/480) in the vertical direction.

This is the same as the operation of the case of FIG. 14 described as the Related Art, and the watermark can be correctly detected. Like this, according to this embodiment, in any of the resolutions, the watermark can be correctly detected without using calculation cost such as decoding the bit stream completely to return it to the baseband.

Since the size of the image is 480 horizontal pixels by 480 vertical pixels, and the size of the encoded block is 8 horizontal pixels by 16 vertical pixels, the number of the encoded block of the actual image is 1800 (=480×480/8/16). When the reverse DCT is performed to all blocks without performing the folding accumulation, since two times of reverse DCTs of 8×8 are necessary for each block, 3600 times of reverse DCTs per frame become necessary.

In this embodiment, since folding accumulation is performed in a unit of three encoded blocks for the frame DCT and field DCT, 12 times of reverse DCTs per frame are sufficient. Since the reverse DCT may first be performed after a plurality of frames are accumulated, there is also an advantage that the number of reverse DCTs can be further decreased.

The structure of a watermark baseband detecting apparatus for detecting a watermark added by the adding apparatus of the first embodiment can be realized through a block structure of FIG. 23 in which the DCT coefficient extractor 411 and the reverse DCT unit 412 are removed.

Since the foregoing embodiment relates to a case where the input image data is the bit stream, the resolution conversion is performed after folding accumulation. However, in the case where image data of the baseband is an input, folding accumulation can be made after resolution conversion is performed. In that case, since the image data come to have a specific resolution after the resolution conversion is performed, it is sufficient if a size determined for an image of the specific resolution is used as the size of the unit watermark. Thus, the resolution ratio calculator and the unit watermark size calculator become unnecessary.

Third Embodiment

Similarly to the first embodiment, the third embodiment is such a watermark adding apparatus for adding a watermark that in the case where an image added with a watermark is converted into a plurality of resolutions, the watermark can be easily detected on an encoded bit stream.

In the first embodiment, all of conceivable resolution conversions of images are taken into consideration, and the size of a unit watermark pattern is determined. On the other hand, in this third embodiment, a resolution which is not frequently used is not taken into consideration, and the size of a unit watermark pattern is determined.

Thus, a block diagram of the watermark adding apparatus is the same as the block diagram of FIG. 21 described in the first embodiment. However, there is a difference in that all conceivable resolutions are not inputted to the horizontal direction resolution input terminal 15 and the vertical direction resolution input terminal 16, but a plurality of resolutions previously selected among all the resolutions are inputted. Only this point is different, and the operation as the watermark adding apparatus is also the same as the case of the foregoing first embodiment.

In the third embodiment, the reason of adopting the structure as described above will be described below.

Figure 25:
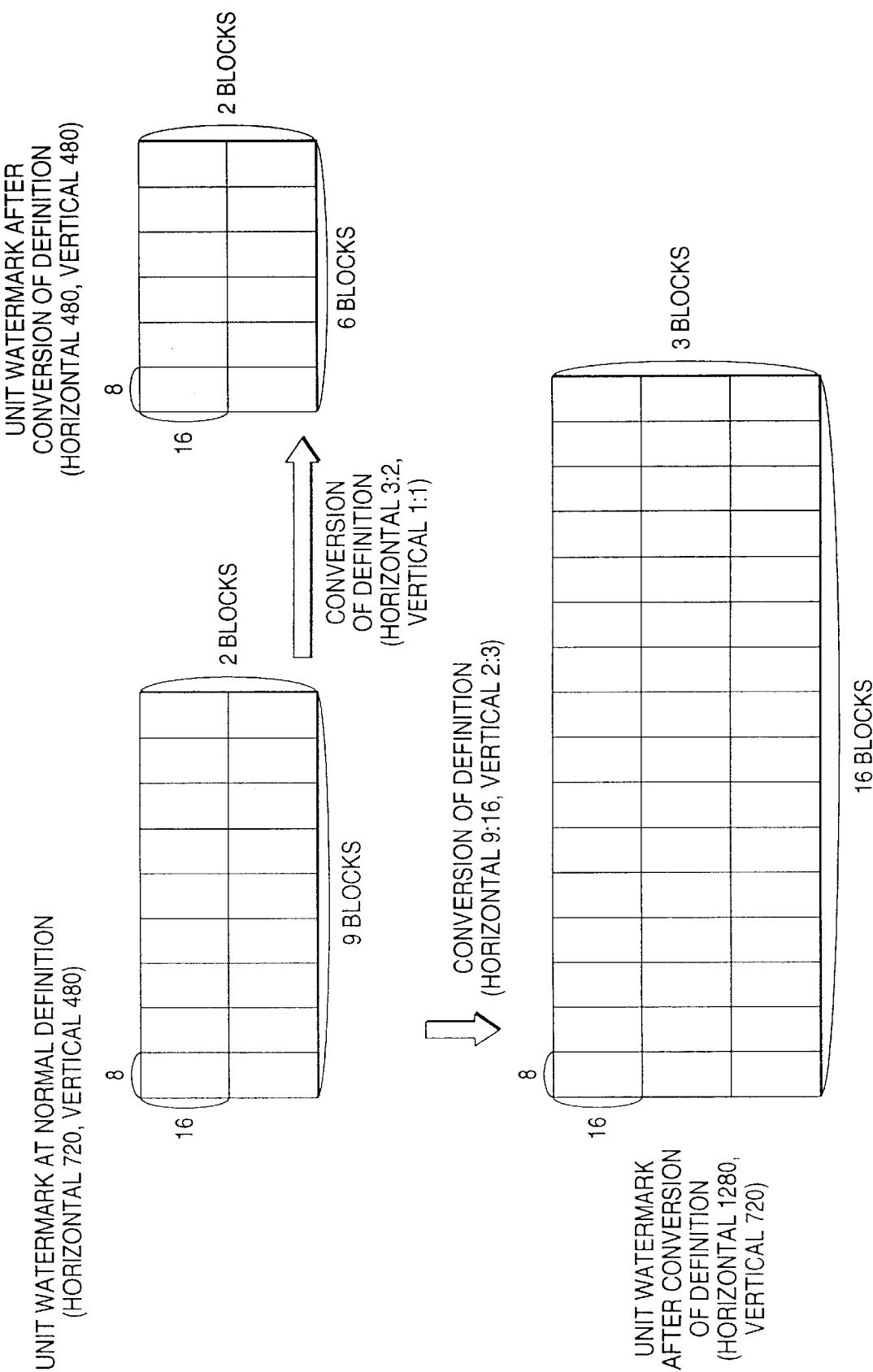
FIG. 25 is a view used for explaining the main portion of the embodiment of FIG. 23.

FIG. 25 shows unit watermarks at individual resolutions in the case where in addition to an image of a resolution of 720 horizontal pixels by 480 vertical pixels and an image of a resolution of 480 horizontal pixels by 480 vertical pixels in the first embodiment, an image of a resolution of 1280 horizontal pixels by 720 vertical pixels is also handled.

When compared with the foregoing example of FIG. 22A, in the case of the example of FIG. 25, the image of the resolution of 1280 horizontal pixels by 720 vertical pixels is added, so that in both the size of the unit watermark at 720 horizontal pixels by 480 vertical pixels and the size of the unit watermark at 480 horizontal pixels by 480 vertical pixels, the number of encoded blocks is increased by a factor of 6 times.

Like this, in the case of the first embodiment, since all conceivable resolutions are taken into consideration and the size of the unit watermark is determined, even if the encoded block is made with the least common multiple, it becomes large. As the number of encoded blocks constituting the unit watermark increases, a usage amount of a memory of a watermark repeating unit of a watermark adding apparatus and a usage amount of a memory of a folding accumulator of a watermark detecting apparatus increase. Further, in the watermark detecting apparatus, the number of times of reverse DCTs also increases. Thus, the apparatus becomes large and the cost becomes high. An object of the third embodiment is to decrease the usage amount of the memory and the number of times of reverse DCTs.

In this third embodiment, in the block diagram of the watermark adding apparatus of FIG. 21, all resolutions are not necessarily inputted to the horizontal direction resolution input terminal 15 and the vertical direction resolution input terminal 16. In this example, information of 1280 horizontal pixels in the case of the example of FIG. 25 is not inputted to the horizontal direction LCM calculator 141. On the other hand, 480 pixels, 480 pixels, and 720 pixels are inputted to the vertical direction LCM calculator 142.

Thus, since the horizontal direction resolutions in this case are 720 pixels and 480 pixels, 3 (720:480=3:2) and 1 (720:720=1:1) are obtained and the least common multiple in the horizontal direction becomes 3 similarly to the first embodiment. Since the vertical direction resolutions are 480 pixels (or lines), 480 pixels (or lines), and 720 pixels (or lines), 1 (480:480=1:1), 1 (480:480=1:1), and 2 (480:720= 2:3) are obtained and the least common multiple in the vertical direction becomes 2.

The size of the unit watermark is as follows:

when the resolution of an input image is 720 horizontal pixels by 480 vertical pixels, 3 (=3×720/720) blocks in the horizontal direction and 2 (=2×480/480) blocks in the vertical direction, when the resolution of an input image is 480 horizontal pixels by 480 vertical pixels, 2 (=3×480/720) blocks in the horizontal direction and 2 (=2×480/480) blocks in the vertical direction, and when the resolution of an input image is 1280 horizontal pixels by 720 vertical pixels, 5.333 (=3×1280/720) blocks in the horizontal direction and 3 (=2×720/480) blocks in the vertical direction. Other than the horizontal direction at 1280 horizontal pixels by 720 vertical pixels, the size of the unit watermark is integer times as large as the size of the block.

As set forth in the last portion of the description of the first embodiment, the size of the unit watermark necessary to correspond to all resolutions of Table 1 becomes as large as 576 pixels (72 encoded blocks) in the horizontal direction. If the resolution of 1280 horizontal pixels is not delivered to the horizontal direction LCM calculator like the third embodiment, the size of the unit watermark becomes 24 encoded blocks, 24 being the least common multiple of 3, 1, 2, 3, 1, 8, 4, 3 and 2, and the number of pixels becomes 192, so that it is possible to make small.

Fourth Embodiment

The fourth embodiment relates to a watermark detecting apparatus as an associated information detecting apparatus capable of detecting a watermark in a bit stream in a case where a watermark added by the watermark adding apparatus of the third embodiment is converted into a corresponding resolution.

Figure 26:
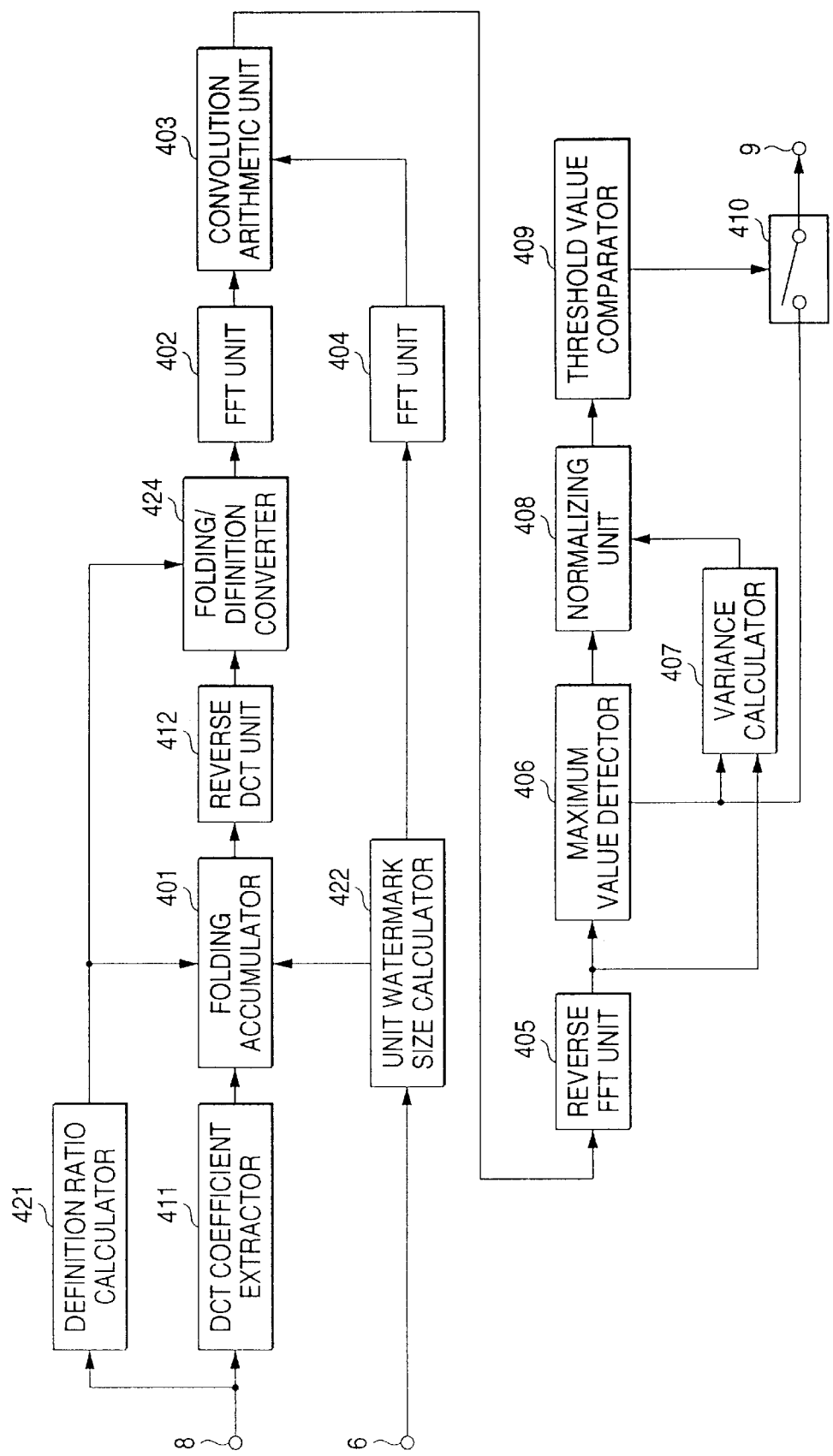
FIG. 26 is a block diagram of another embodiment of an associated information detecting apparatus of the present invention.

FIG. 26 is a block diagram of a watermark bit stream detecting apparatus as the embodiment of the associated information detecting apparatus. The different points from the block diagram of the detecting apparatus of FIG. 23 of the second embodiment are that the resolution converter 423 is replaced by a folding/resolution converter 424, and the operation of a folding accumulator 401 is slightly different. A description will be made below mainly on the different points from the Related Art.

The resolution ratio calculator 421 detects vertical and horizontal sizes of an image from a bit stream, obtains a resolution ratio to the normal resolution (720 horizontal pixels by 480 vertical pixels), and sends it to the folding accumulator 401 and the folding/resolution converter 424. The unit watermark size calculator 422 extracts the size of a unit watermark (number of vertical and horizontal pixels), and sends it to the folding accumulator 401.

In the folding accumulator 401, a value obtained by multiplying the size of the unit watermark in vertical and horizontal by a ratio of the resolution of an actual image to the resolution (720 horizontal pixels by 480 vertical pixels) of a normal image is made a size of a folding unit region to be accumulated, and accumulation is made for every folding unit region with DCT coefficients without any change.

However, in this case, in the folding accumulator 401, when a value to become the size of the folding unit region is not integer times as large as an encoded block, an arbitrary integer is multiplied so that the value becomes an integer. In this case, as a small number is used as a numerical value for multiplication, an amount of use of a memory is small and an amount of calculation is also small.

For example, as input image data, let us consider a bit stream in which an image added with a watermark in the third embodiment is enlarged to 1280 horizontal pixels by 720 vertical pixels and is encoded. In the case where the bit stream image data is an input from the input terminal 8, the resolution ratio calculator 421 extracts the resolution of 1280 horizontal pixels by 720 vertical pixels from the input bit stream.

Since the size of the unit watermark calculated by the unit watermark size calculator 422 at this time is 3 horizontal blocks by 2 vertical blocks, the size of the folding unit region folded by the folding accumulator 401 becomes 5.333 (=3×1280/720) horizontal blocks and does not become an integer. Then, in this embodiment, an integer 3 is multiplied and folding is made with 16 blocks. With respect to the vertical, since the size becomes 3 (=2×720/480) blocks and is integer times as large as the encoded block, it is used as it is.

In the case where data of 720 horizontal pixels by 480 vertical pixels and 480 horizontal pixels by 480 vertical pixels are inputted, the sizes of folding unit regions are respectively 3 (=3×720/720) horizontal blocks by 2 (=2×480/480) vertical blocks, and 2 (=3×480/720) horizontal blocks by 2 (=2×480/480) vertical blocks.

Figure 27:
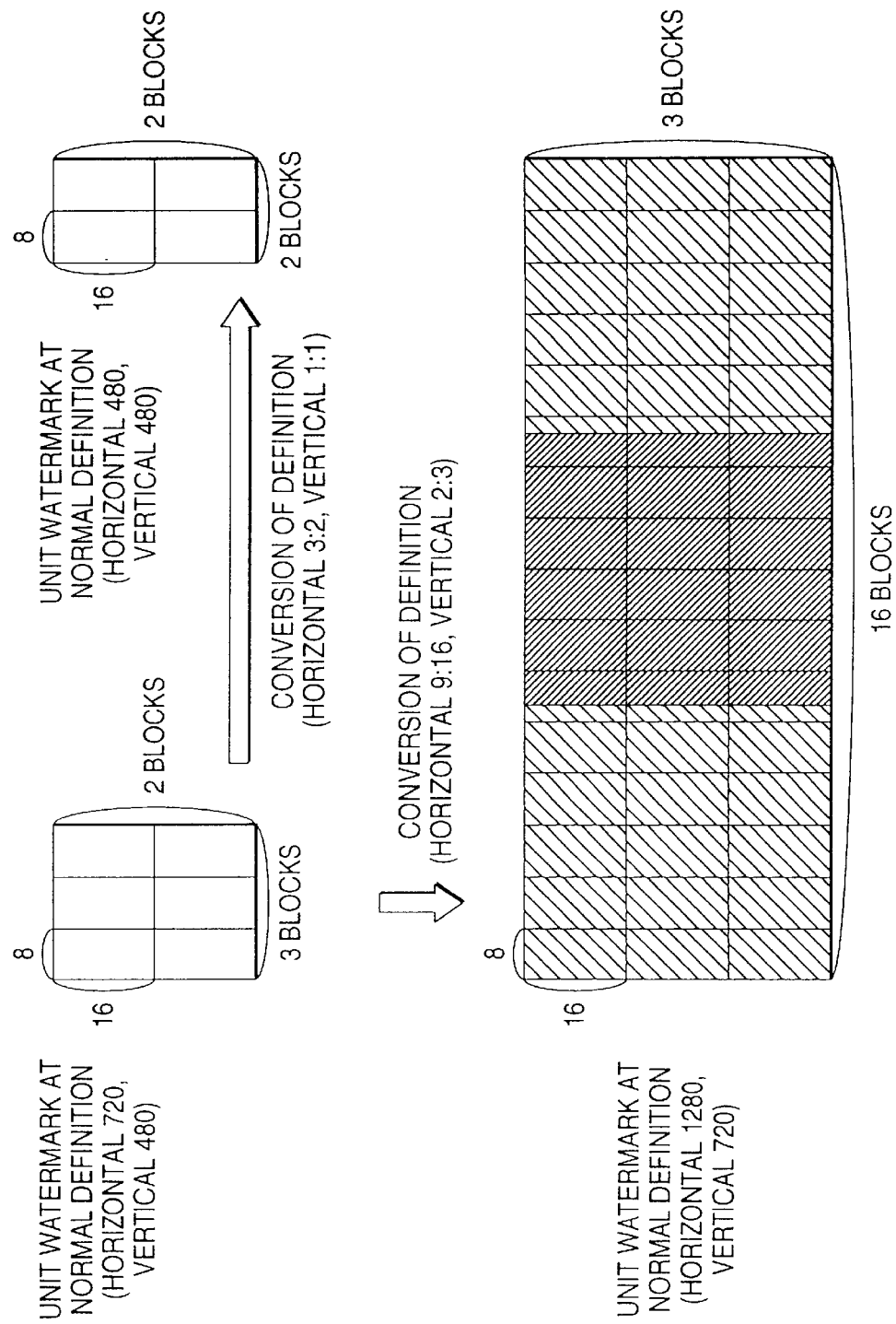
FIG. 27 is a view for explaining the associated information detecting apparatus of the embodiment of FIG. 26.

These become as shown in FIG. 27. In this example, when the resolution has 1280 horizontal pixels by 720 vertical pixels, as described above, the size in the horizontal direction becomes 5.333 blocks. Thus, the value is multiplied by 3 so that it becomes an integer, and the size is made 16 blocks. This is because although one unit watermark does not match with the encoded block in period, three unit watermarks match with the encoded block in period.

In the case of the fourth embodiment, the size of the unit watermark is the same as the second embodiment at the resolution of 1280 horizontal pixels by 720 vertical pixels. At the resolution of 720 horizontal pixels by 480 vertical pixels and 480 horizontal pixels by 480 vertical pixels, the number of blocks in the horizontal direction of the unit watermark is reduced to ⅓, so that an amount of use of a memory is reduced and an arithmetic operation of reverse DCT and the like is reduced.

At the resolution of 1280 horizontal pixels by 720 vertical pixels, the resolution in the horizontal direction becomes large to be three times as large as the normal resolution after the reverse DCT is ended. Thus, in the folding/resolution converter 424, folding to ⅓ is performed just before the resolution conversion. Subsequent steps are the same as the second embodiment shown in FIG. 23.

The structure of a watermark baseband detecting apparatus for detecting a watermark added by the adding apparatus of the third embodiment becomes a block structure of FIG. 26 in which the DCT coefficient extracting unit 411 and the reverse DCT unit 412 are removed.

The structure of the watermark baseband detecting apparatus for detecting a watermark added by the adding apparatus of the third embodiment can be realized, similarly to the second embodiment, by the block structure of FIG. 26 in which the DCT coefficient extracting unit 411 and the reverse DCT unit 412 are removed.

Since the description of the fourth embodiment relates to the case where the input image data are the bit stream, the resolution conversion is performed after folding accumulation. However, in the case where image data of the baseband is an input, folding accumulation can be made after resolution conversion is performed. In that case, since the image data come to have a specific resolution after the resolution conversion is performed, it is sufficient if a size determined for an image of the specific resolution is used as the size of the unit watermark. Thus, the resolution ratio calculator and the unit watermark size calculator become unnecessary.

Fifth Embodiment

The fifth embodiment relates to an illegal use preventing system characterized in that even in the case where resolution conversion is performed for an image added with a watermark, associated information by the watermark can be detected. This illegal use preventing system includes an illegal copying preventing system, and on the basis of the information of the watermark detected by the watermark detecting apparatus, this system makes control of reproduction of baseband image information or bit stream image information, and makes control of use for duplicate recording.

In the fifth embodiment, the watermark adding apparatus of the first embodiment or the third embodiment is used as the watermark adding apparatus, and the watermark detecting apparatus of the second embodiment or fourth embodiment is used as the watermark bit stream detecting apparatus.

As described above in the first to fourth embodiments, according to this system, even in the case where resolution conversion is performed, the associated information can be detected by the watermark.

Sixth Embodiment

Figure 28:
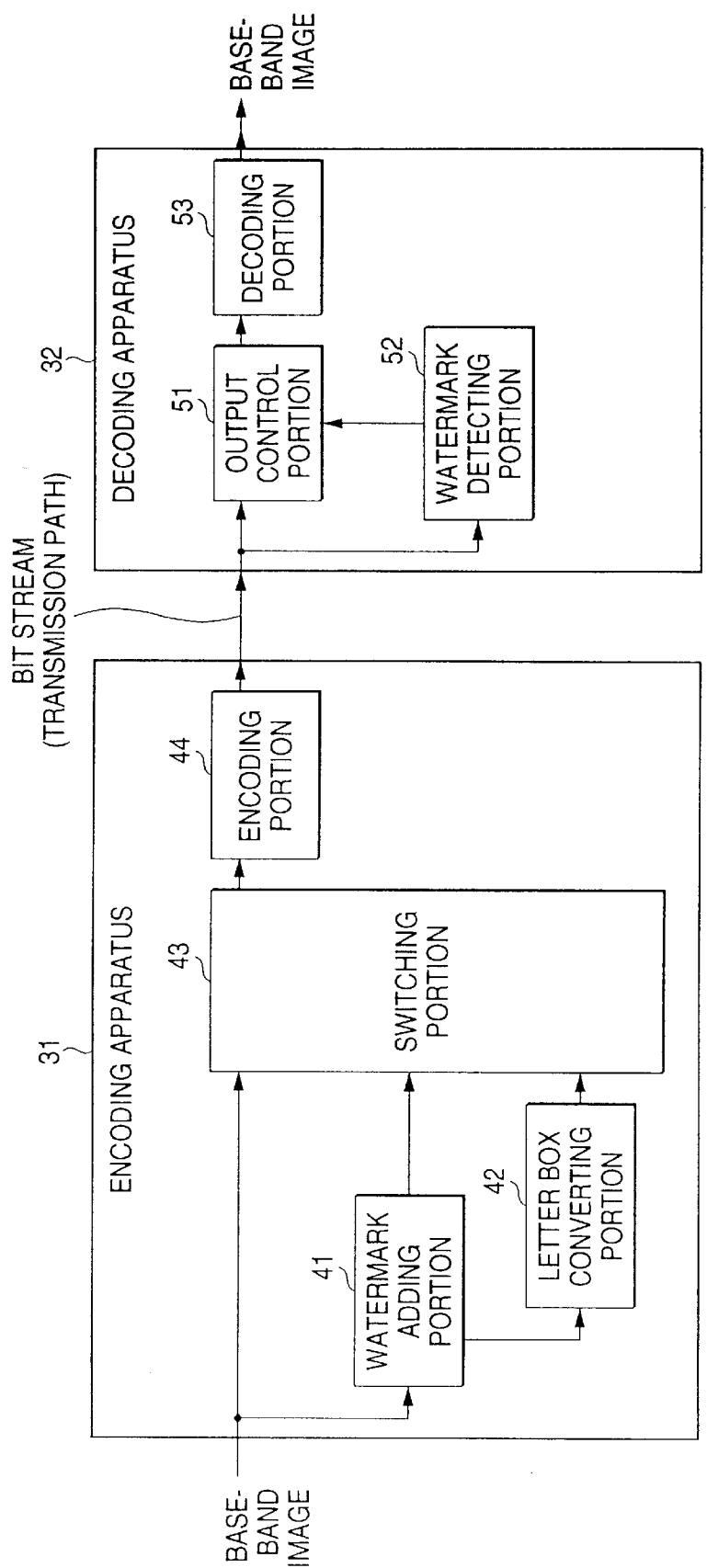
FIG. 28 is a view for explaining a structural example of an illegal use preventing system.

The structure of an illegal use preventing system of the invention is simply shown in FIG. 28.

This illegal use preventing system includes an encoding apparatus 31 and a decoding apparatus 32. A baseband image as a letter box image is inputted to the encoding apparatus 31. When it is not necessary to add a watermark, the input baseband image is supplied to an encoding portion 44 through a switching portion 43. When it is necessary to add a watermark, the baseband image is inputted to a watermark adding portion 41 and the watermark is added. When letter box conversion is not performed, the baseband image added with the watermark is sent to the encoding portion 44 through the switching portion 43 without any change. When letter box conversion is performed, the baseband image added with the watermark is subjected to the letter box conversion by a letter box conversion portion 42 as a reduction filter in the vertical direction, and is supplied to the encoding portion 44 through the switching portion 43. The encoding portion 44 encodes the inputted baseband image, and outputs an obtained bit stream. The bit stream outputted from the encoding apparatus 31 is supplied to the decoding apparatus 32 through a predetermined transmission path.

A watermark detecting portion 52 of the decoding apparatus 32 receives the bit stream outputted from the encoding apparatus 31, detects information from the watermark added to the image of the bit stream, and outputs a signal based on the detected information to an output control portion 51. On the basis of the signal from the watermark detecting portion 52, the output control portion 51 controls supply of the bit stream supplied from the encoding apparatus 31 to a decoding portion 53. The decoding portion 53 decodes the inputted bit stream and outputs a baseband image.

In a squeeze image 28 shown in FIG. 29A, addition blocks 61-1 to 61-$n$ in which a watermark is added to a DC coefficient become, as shown in FIG. 29B, regions 62-1 to 62-$n$ collapsed to ¾ in the vertical direction in a letter box image 29 after the letter box conversion. Thus, the addition blocks of the letter box image 29 shift from the addition blocks 61-1 to 61-$n$ of the squeeze image 28, and the watermark added to the DC coefficient of the addition blocks 61-1 to 61-$n$ of the squeeze image 28 is not directly reflected to the DC coefficient of the addition block of the letter box image 29.

Figure 30A:
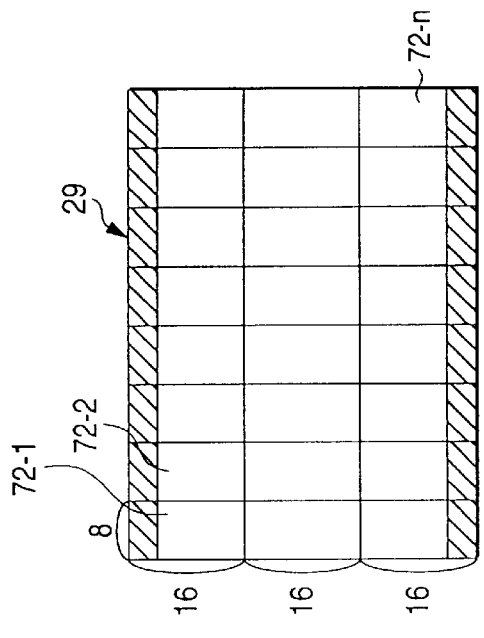
FIGS. 30A and 30B are views for explaining an addition block of a watermark pattern.
Figure 30B:
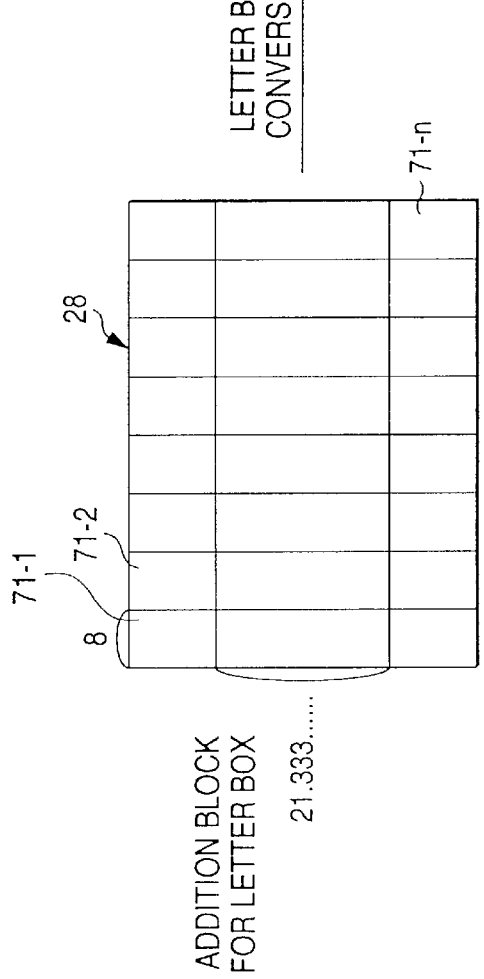

The addition blocks 61-1 to 61-$n$ of the watermark pattern of the squeeze image 28 are respectively, as shown in FIG. 29A, a region of 8×16 pixels which is the same as a normal watermark addition block. On the other hand, as shown in FIG. 30A, addition blocks 71-1 to 71-$n$ of the watermark pattern for the letter box image 29 are respectively constituted by 8×21.333 . . . (=16×⁴⁄₃) pixels. After the letter box conversion is performed, the addition blocks 71-1 to 71-$n$ become blocks 72-1 to 72-$n$ of 8×16 pixels of FIG. 30B.

The sixth embodiment has an object to provide the system which can deal with the letter box conversion as in FIGS. 29A and 29B and FIGS. 30A and 30B, and can detect a watermark without a lowering of detecting accuracy, an increase of detecting time, a deterioration of picture quality, and an increase of processing amount of detection.

FIGS. 31A to 31C are views showing the case where at letter box conversion, after a squeeze image 28 is reduced in the vertical direction, the upper portion of a screen is filled and a blank is provided only at the lower portion. FIG. 31A is a view showing an addition block 81 of 8×16 pixels (block at x-th position in horizontal direction and y-th position in vertical direction) where a watermark is added in the squeeze image 28. When the squeeze image 28 including the addition block 81 is subjected to the letter box conversion (multiplied by a factor of ¾ in the vertical direction), the addition block 81 becomes an addition block 82 of 8×12 pixels on the letter box image 29 shown in FIG. 31B. FIG. 31C is a view showing encoded blocks 83-1 to 83-3 of 8×16 pixels at the time of encoding the letter box image 29. Incidentally, the character y' in the drawing designates an integer.

FIGS. 32A to 32C are views showing a case where at letter box conversion, after a squeeze image 28 is reduced in the vertical direction, blanks are provided at the upper and lower portions of a screen. FIG. 32A is a view showing an addition block 81 of 8×16 pixels where a watermark is added in the squeeze image 28. When the squeeze image 28 including the block 81 is subjected to the letter box conversion, the addition block 81 becomes an addition block 82 of 8×12 pixels on a letter box image 29 shown in FIG. 32B. FIG. 32C is a view showing encoded blocks 83-1 to 83-3 of 8×16 pixels at the time of encoding the letter box image 29.

Figures 33A, 33B, 33C, 33D:
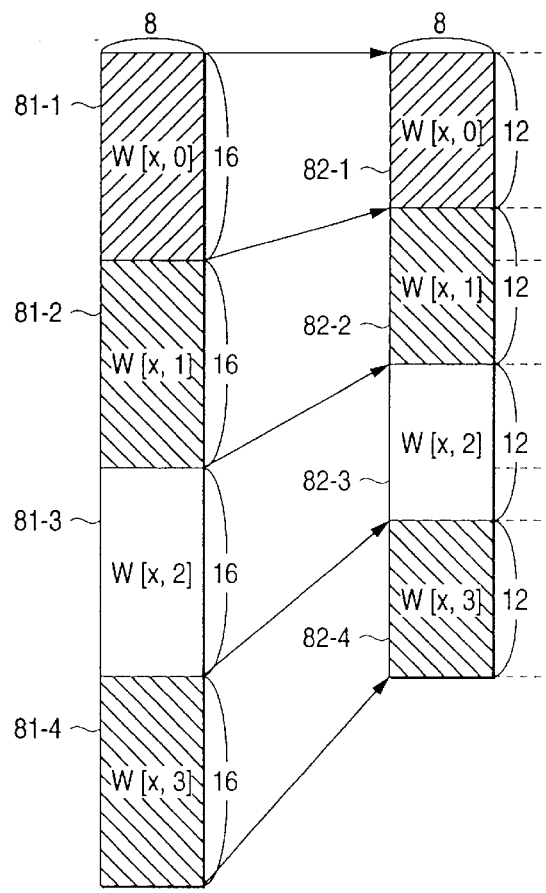
FIGS. 33A to 33D are views for explaining relation between an addition block and an encoded block.

Hereinafter, in the case of FIGS. 31A to 31C, a method of detecting a watermark will be described with reference to FIGS. 33A to 33D. FIGS. 33A to 33C are views showing a column of addition blocks 81 in the vertical direction extracted from the image shown in FIGS. 31A to 31C. FIG. 33A shows addition blocks 81-1 to 81-4 added with a watermark in the squeeze image 28. By the watermark detecting method described in FIG. 1 to FIG. 4, DC components of the addition blocks 81-1 to 81-4 respectively divided for every 8×16 pixels are checked against a watermark pattern. W[x, y] expresses a symbol (for example, +1 or −1) of a portion at a coordinate x, y of the watermark pattern (coordinate in the block, its x coordinate is expressed by an integer portion when an x coordinate in the pixel is divided by 8, and its y coordinate is expressed by an integer portion when a y coordinate in the pixel is divided by 16). The coordinate starts from 0 in both vertical and horizontal directions while the left and upper portion of the screen is made the origin. For example, a watermark pattern corresponding to a block of 8×16 pixels at the left and upper portion of the screen is W[0, 0], and a watermark pattern corresponding to a block thereunder is W[0, 1].

When the squeeze image 28 is subjected to the letter box conversion, the vertical resolution becomes ¾. Thus, the addition block 81 of the watermark in the squeeze image 28 in FIG. 31A or FIG. 32A is converted into the addition blocks 82-1 to 82-4 of the watermark of 8×12 pixels shown in FIG. 33B (a y coordinate in the block becomes an integer portion when a y coordinate in the pixel is divided by 12).

When the letter box image 29 is encoded, a DCT of a frame mode or a DCT of a field mode is performed twice for every 8×16 pixels of the letter box image 29 (since the DCT is performed for every 8×8 pixels). It is assumed that an average value of DC coefficients of two DCTs of the encoded blocks 83-1 to 83-3 shown in FIG. 33C is expressed by I[x, y]. That is, it is assumed that I[x, y] expresses a DC value of a DCT coefficient of a portion at a coordinate x, y in the block of every 8×16 blocks.

In this embodiment, a product-sum operation of mutual corresponding portions is made between the addition blocks 82-1 to 82-4 shown in FIG. 33B and the encoded blocks 83-1 to 83-3 shown in FIG. 33C and detection of the watermark is performed. That is, the component of the watermark is calculated by the following equation (1).

$$\text{sum} = \sum (I[x, 0] \times W[x, 0]) + \sum (I[x, 0] \times W[x, 1]) + \qquad (1)$$
$$\sum (I[x, 1] \times W[x, 1]) + \sum (I[x, 1] \times W[x, 2]) +$$
$$\sum (I[x, 2] \times W[x, 2]) + \sum (I[x, 2] \times W[x, 3])$$

In the above equation, Σ means a product-sum operation on all x.

It is assumed that the value I0[x, y] of the DC component of the squeeze image 28 is changed to I[x, y] as a result that pixels of 12/16 of all the pixels contained in the encoded block 83-1 are influenced by the watermark pattern W[x, 0], and pixels of 4/16 of all the pixels are influenced by the watermark pattern W[x, 1], I[x, 0] is expressed as I[x, 0]=I0[x, 0]+12/16×W[x, 0]+4/16×W[x, 1]. Thus, the first term of the equation (1) is transformed as shown by equation (2).

$$\sum (I[x, 0] \times W[x, 0]) = \sum ((I0[x, 0] + 12/16 \times W[x, 0] + \qquad (2)$$
$$4/16 \times W[x, 1]) \times W[x, 0])$$
$$= \sum ((12/16 \times W[x, 0] + 4/16 \times$$
$$W[x, 1]) \times W[x, 0])$$
$$= \sum (12/16 \times W[x, 0] \times W[x, 0])$$
$$= 3/4 \sum (W[x, 0] \times W[x, 0])$$

The transformation to Σ((12/16×W[x, 0]+4/16×W[x, 1])×W[x, 0]) is based on the fact that ΣI0[x, 0]×W[x, 0]=0 is established, that is, a DC component of an image and a watermark do not generally correlate to each other. Besides, the transformation to Σ(12/16×W[x, 0]×W[x, 0]) is based on the fact that ΣW[x, 1]×W[x, 0]=0, that is, a watermark does not correlate to a watermark in which its phase is shifted.

Similarly, when another term of the equation (1) is transformed, an equation (3) is obtained.

$$\text{sum} = \sum (I[x, 0] \cdot W[x, 0]) + \sum (I[x, 0] \cdot W[x, 1]) + \qquad (3)$$
$$\sum (I[x, 1] \cdot W[x, 1]) + \sum (I[x, 1] \cdot W[x, 2]) +$$
$$\sum (I[x, 2] \cdot W[x, 2]) + \sum (I[x, 2] \cdot W[x, 3])$$

$$= 3/4 \sum (W[x, 0] \cdot W[x, 0]) + 1/4 \sum (W[x, 1] \cdot$$
$$W[x, 1]) + 1/2 \sum (W[x, 1] \cdot W[x, 1]) +$$
$$1/2 \sum (W[x, 2] \cdot W[x, 2]) + 1/4 \sum (W[x, 2] \cdot$$
$$W[x, 2]) + 3/4 \sum (W[x, 3] \cdot W[x, 3])$$
$$= 3/4 \sum (W[x, 0] \cdot W[x, 0]) + 3/4 \sum (W[x, 1] \cdot$$
$$W[x, 1]) + 3/4 \sum (W[x, 2] \cdot W[x, 2]) +$$
$$3/4 \sum (W[x, 3] \cdot W[x, 3])$$

As described above, the evaluation value of the added watermark is obtained by taking a product of the DC component of each of the encoded blocks 83-1 to 83-3 and the watermark pattern added to at least a part of the encoded blocks 83-1 to 83-3 and taking a total sum (a product-sum operation is performed). The reason why the evaluation value of the watermark is decreased to ¾ is that the image is reduced to ¾ in the vertical direction by the letter box conversion.

Subsequently, calculation of an evaluation value of a watermark in the case of FIGS. 32A to 32C, that is, in the case where at the letter box conversion, after the image is reduced to ¾ in the vertical direction, the blanks are provided at the upper and lower portions of the screen, will be described. As shown in FIG. 32B, it is assumed that the number of pixels in the blank at the upper portion of the screen is y0. FIG. 34A shows an addition block 82 of the watermark in the letter box image 29. FIG. 34B is a view showing pixels 91 of one vertical column of this addition block 82.

The y coordinates of the pixels 91 of one vertical column contained in the addition block 82 of the letter box image 29 are within the range of y0+12y to y0+12y+11. FIG. 34C is a view showing pixels within the range of the encoded blocks 83-1 to 83-3 when encoded as the letter box image 29. Since the encoded blocks 83-1 to 83-3 are constituted by 8×16 pixels, the pixels 91 in one vertical column are contained in different encoded blocks 83-1 to 83-3 for every 16 pixels in the vertical direction. Thus, for example, a pixel with a y coordinate (pixel coordinate) of y0+12y is contained in the encoded block 83 with a y coordinate (block coordinate) of (y0+12y)//16. A pixel with a y coordinate of y0+12y+11 is contained in the encoded block 83 with a y coordinate of (y0+12y+11)//16. Here, the symbol "//" expresses division to omit the figure below the decimal point.

Although the size of the encoded block 83 has an extension of 16 pixels in the vertical direction, pixels of the addition block added with the watermark pattern W[x,y] of the same value are continuous only in 12 pixels in the vertical direction. Thus, a pixel of an addition block with a y coordinate between y0+12y to y0+12y+11 is contained in the encoded block 83 with a y coordinate of (y0+12y)//16 or the encoded block 83 with a y coordinate of (y0+12y+11)//16. Thus, if (y0+12y)//16=(y0+12y+11) //16 (one addition block corresponds to one encoded block), the DC component of the encoded block 83 to be correlated with W[x,y] is only I[x, (y0+12y)//16]. If (y0+12y)//16≠(y0+12y+11)//16 (one addition block corresponds to two encoded blocks), the DC component is two of I[x, (y0+12y)//16] and I[x, (y0+12y+11)//16].

Next, an adding process of a watermark and a detecting process thereof will be described. The present invention is simplified in that only one watermark is added, and is also simplified in that it is not necessary to judge which watermark should be added.

Figure 35:
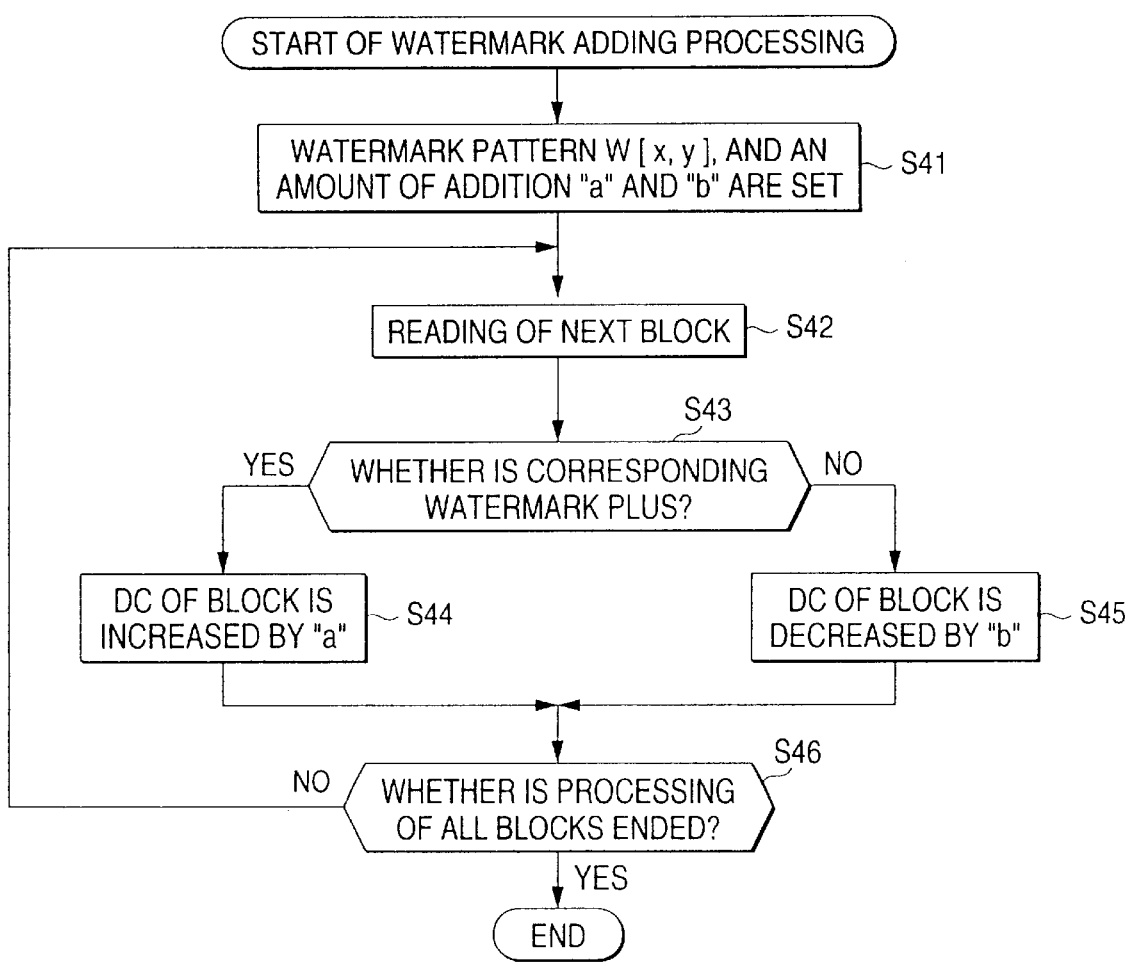
FIG. 35 is a flowchart for explaining the processing of addition of a watermark pattern.

FIG. 35 is a flowchart for explaining an adding process of a watermark. At step S41, a watermark adding portion 41 sets a watermark pattern, and sets an addition amount "a" and "b". At step S42, the watermark adding portion 41 reads one block of 8×16 pixels to which a watermark is to be added. At step S43, the watermark adding portion 41 judges whether the read block is a block to which the watermark is added. In the case where it is judged that the read block is a block to which the watermark is added, the procedure proceeds to step S44, "a" is added to a DC value of the block, and the procedure proceeds to step S46.

At step S43, in the case where it is judged that the read block is a block in which the watermark is subtracted, the procedure proceeds to step S45, the watermark adding portion 41 subtracts "b" from the DC value of the read block, and the procedure proceeds to step S46. At step S46, the watermark adding portion 41 judges whether processing of all blocks is ended. In the case where it is judged that the processing of all blocks has not been ended, the procedure returns to step S42, and the processing is continued.

At step S46, in the case where it is judged that the processing of all blocks is ended, the watermark adding portion 41 ends the processing.

Figure 36:
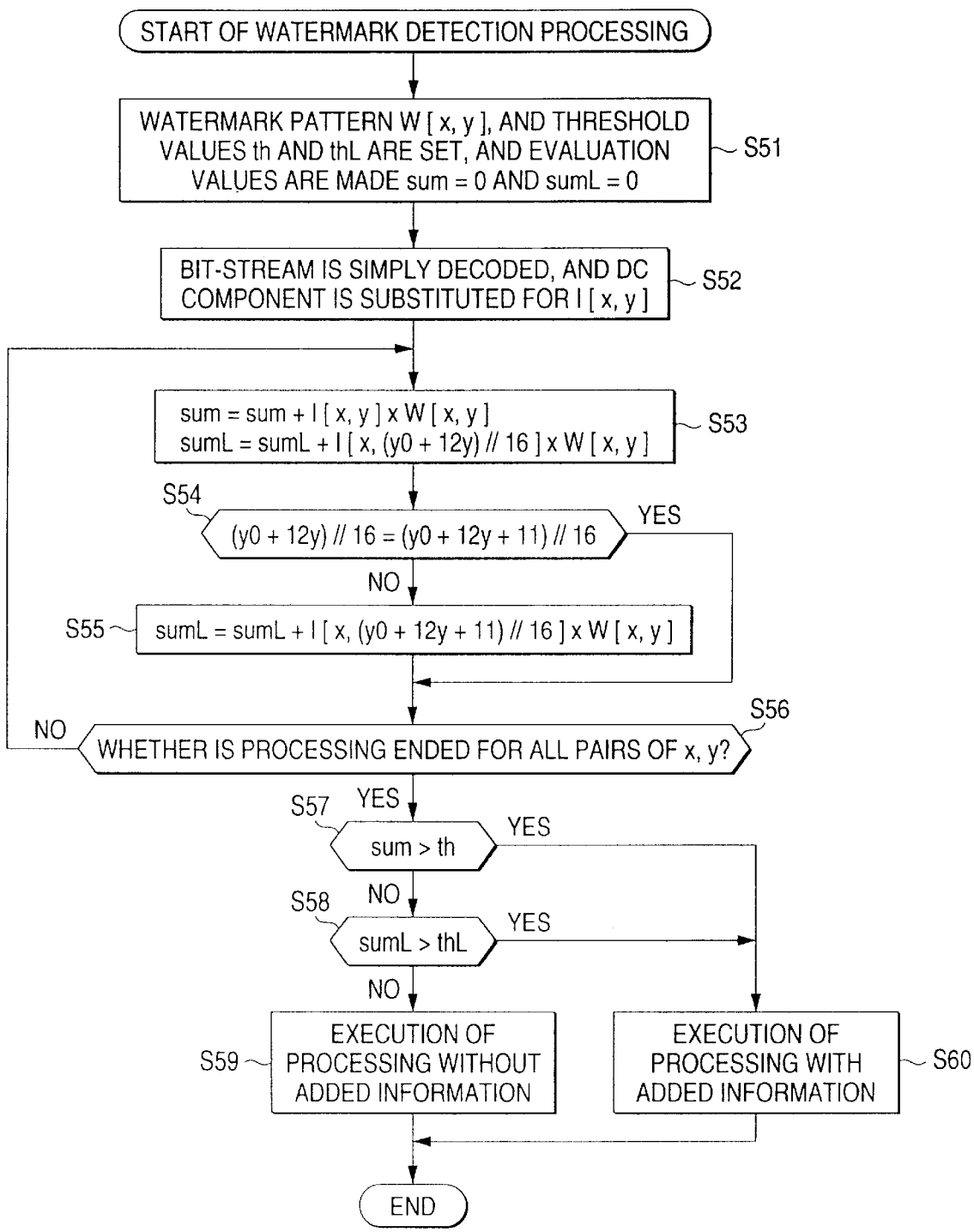
FIG. 36 is a flowchart for explaining the processing of watermark detection.

FIG. 36 is a flowchart for explaining a process of watermark detection. First, at step S51, a watermark detecting portion 52 sets a watermark pattern W[x,y], initializes an evaluation value sum for detection of a watermark of the squeeze image 28 and an evaluation value sumL for detection of a watermark of the letter box image 29 to 0, and sets a threshold value th for watermark detection of the squeeze image 28 and a threshold value thL for watermark detection of the letter box image 29. At step S52, the watermark detecting portion 52 simply decodes a bit stream, and substitutes a DC component of a block of 8×16 pixels for I[x,y]. At step S53, the watermark detecting portion 52 selects (0,0) as an initial pair of (x,y), adds I[x,y]×W[x,y] to the value sum, and adds I[x,(y0+12y)//16]×W[x,y] to the value sumL. Now, when y0=0, by this, I[x,0]×W[x,0] of FIG. 33 is calculated.

At step S54, the watermark detecting portion 52 judges whether (y0+12y)//16 is equal to (y0+12y+11)//16. In the case where it is judged that (y0+12y)//16 is not equal to (y0+12y+11)//16 (that is, in the case where one addition block 82 corresponds to two encoded blocks), the procedure proceeds to step S55, I[x,(y0+12y+11)//16]×W[x,y] is added to the value sumL, and the procedure proceeds to step S56.

At step S54, in the case where it is judged that (y0+12y)//16 is equal to (y0+12y+11)//16 (that is, in the case where one addition block 82 corresponds to one encoded block), the procedure proceeds to step S56.

At step S56, the watermark detecting portion 52 judges whether processing has been executed for all pairs. In the case where it is judged that there is a pair which has not been processed, the procedure returns to step S53, and the subsequent processing is repeated. In the case of the example of FIG. 33, since values of right and left terms of the equation are 0, at step S54, a judgement of YES is made. At step S56, y is made 1 (increment processing of x is omitted here), and at step S53, I[x,0]×W[x,1] is added to the value sumL (explanation of processing of sum is also omitted here). At step S54, since a value of the left term of the equation becomes 0 and a value of the right term becomes 1, a judgement of NO is made, and at step S55, I[x,1]×W[x,1] is added to the value sumL.

At step S56, in the case where it is judged that the processing has been executed for all pairs of (x, y), the procedure proceeds to step S57, and the watermark detecting portion 52 judges whether the value sum is larger than the value th. In the case where it is judged that the value sum is not larger than the value th, the procedure proceeds to step S58. At step S58, the watermark detecting portion 52 judges whether the value sumL is larger than the value thL. In the case where it is judged that the value sumL is not larger than the value thL, the procedure proceeds to step S59, and the watermark detecting portion 52 executes the processing at the time when the watermark is not added, and ends the processing.

In the case where it is judged at step S57 that the value sum is larger than the value th, and in the case where it is judged at step S58 that the value sumL is larger than the value thL, the watermark detecting portion 52 executes the processing at the time when the watermark is added, and ends the processing.

As described above, according to the present invention, it is possible to detect the watermark from both the squeeze image and the letter box image by only adding one watermark to the squeeze image 28. Thus, it is not necessary to add two watermarks to DC components of different encoded blocks in space or in time. Moreover, in the invention, it is not necessary to divide the encoded block 83 for extracting the DC component used for detection of the watermark into two of the encoded block 83 for detection from the letter box image 29 and the encoded block 83 for detection from the squeeze image 28, so that a lowering of detection accuracy and an increase of detecting time hardly occur. Further, since it is not necessary to add two watermarks to the same DC component, picture quality does not deteriorate.

Processing can be further simplified by adding a parameter k to the algorithm of FIG. 36. The algorithm using this parameter k will be described with reference to FIG. 37.

Figure 37:
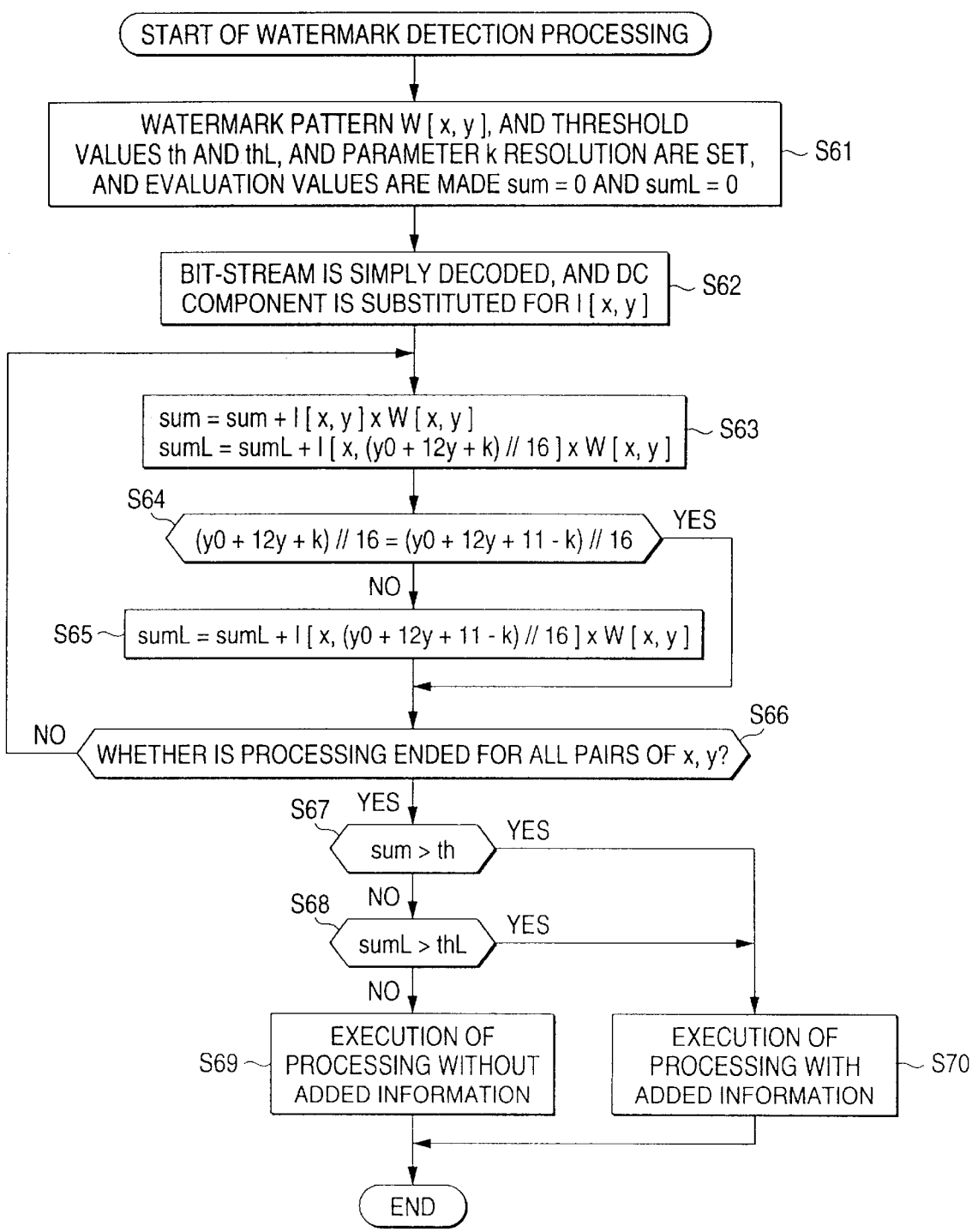
FIG. 37 is a flowchart for explaining the processing of watermark detection.

Processing contents of steps of FIG. 37 are the same as the steps with the same number at the lower one digit in the flowchart of FIG. 36 except step S61, step S63, step S64, and step S65. Thus, their explanation is omitted, and a description will be made below only on different portions from the processing of FIG. 36. At step S61, in addition to the processing of step S51, the watermark detecting portion 52 sets a k parameter. At step S63, the watermark detecting portion 52 adds I[x,y]×W[x,y] to the value sum, and adds I[x,(y0+12y+k)//16]×W[x,y] to the value sumL.

At step S64, the watermark detecting portion 52 judges whether (y0+12y+k)//16 is equal to (y0+12y+11−k)//16. In the case where it is judged that (y0+12y+k)//16 is not equal to (y0+12y+11−k)//16 (that is, in the case where one addition block 82 corresponds to two encoded blocks 83), the procedure proceeds to step S65, I[x,(y0+12y+11−k)//16]×W[x,y] is added to the value sumL, and the procedure proceeds to step S66.

At step S64, when it is judged that (y0+12y+k)//16 is equal to (y0+12y+11−k)//16 (that is, in the case where one addition block 82 corresponds to one encoded block), the procedure proceeds to step S66.

In this algorithm, for example, in the case where k=2 is set, the encoded block 83 to which a compared pixel belongs is calculated by equation (4) and equation (5).

$$(y0+12y+k)//16=(16i+15)//16=i \qquad (4)$$

$$(y0+12y+11-k)//16=16(i+1)+6)//16=i+1 \qquad (5)$$

In this case, what is used for taking correlation with the addition block with a y coordinate of y shown in FIG. 38B is DC components of the encoded block 83 with a y coordinate of i indicated by upward-sloping lines of FIG. 83C and DC components of the encoded block 83 with a y coordinate of i+1 indicated by downward-sloping lines of FIG. 38C.

In the case where k=3 is set, the encoded block 83 to which a compared pixel belongs is calculated by equation (6) and equation (7).

$$(y0+12y+k)//16=16(i+1)//16=i+1 \quad (6)$$

$$(y0+12y+11-k)//16=(16(i+1)+5)//16=i+1 \quad (7)$$

That is, in this case, what is used to take correlation with the addition block with a y coordinate of y is only DC components of the encoded block with a y coordinate of i+1 indicated by upward-sloping lines of FIG. 38C, and DC components of the encoded block come not to be used for an arithmetic operation of a correlation value.

FIGS. 39A to 39D are views for explaining a product-sum operation between the addition blocks 82-1 to 82-4 and the encoded blocks 83-1 to 83-4 when k=3 is set. In this example, the encoded blocks 83-1 to 83-4 are shifted upward by 1 pixel with respect to the addition blocks 82-1 to 82-4. The product-sum operation I[x,0]×W[x,1] on an overlap portion of the addition block 82-2 and the encoded block 83-1 is omitted. Similarly, the product-sum operation I[x,3]×W[x,3] on an overlap portion of the addition block 82-4 and the encoded block 83-4 is also omitted.

Similarly, in the case where k is another value, when k is not larger than 2, a correlation between the addition block 82 (addition block of FIG. 38B) with a y coordinate of y and DC components of the encoded block 83 (encoded block to which pixels 16i+12 to 16i+15 of FIG. 38C belong) with a y coordinate of i is obtained. In the example of FIGS. 38A to 38C, the corresponding (overlapping) pixels between the addition block 82 with a y coordinate of y and the encoded block 83 with a y coordinate of i are three pixels (16i+13, 16i+14, 16i+15). In other words, when the number of corresponding pixels between the pixels of the addition block 82 and the pixels of the encoded block 83 is not larger than the value of parameter k, the pixels are made not to be corresponding (not overlapping), and are made not to be used for obtaining the correlation.

Only a pixel in the encoded block 83 overlapping with the addition block has a component of the watermark. In the case where the k parameter is used, and in the case where only a pixel not larger than k/16 in the encoded block 83 has a component of the watermark, calculation of the correlation is made not to be executed, so that the processing of calculating the correlation can be omitted for a portion where there is little possibility to detect a component of the watermark, and a processing amount can be reduced while a correlation value to be calculated is scarcely changed.

For example, when k=6 is set, a calculation of correlation is made only when a portion of more than half of the addition block 82 corresponds to the encoded block 83.

Like this, in the processing using the k parameter, it is possible to omit a process of calculating a correlation for a portion where there is little possibility to detect a component of a watermark, so that a processing amount can be reduced while a correlation value to be calculated is scarcely changed.

Figure 40:
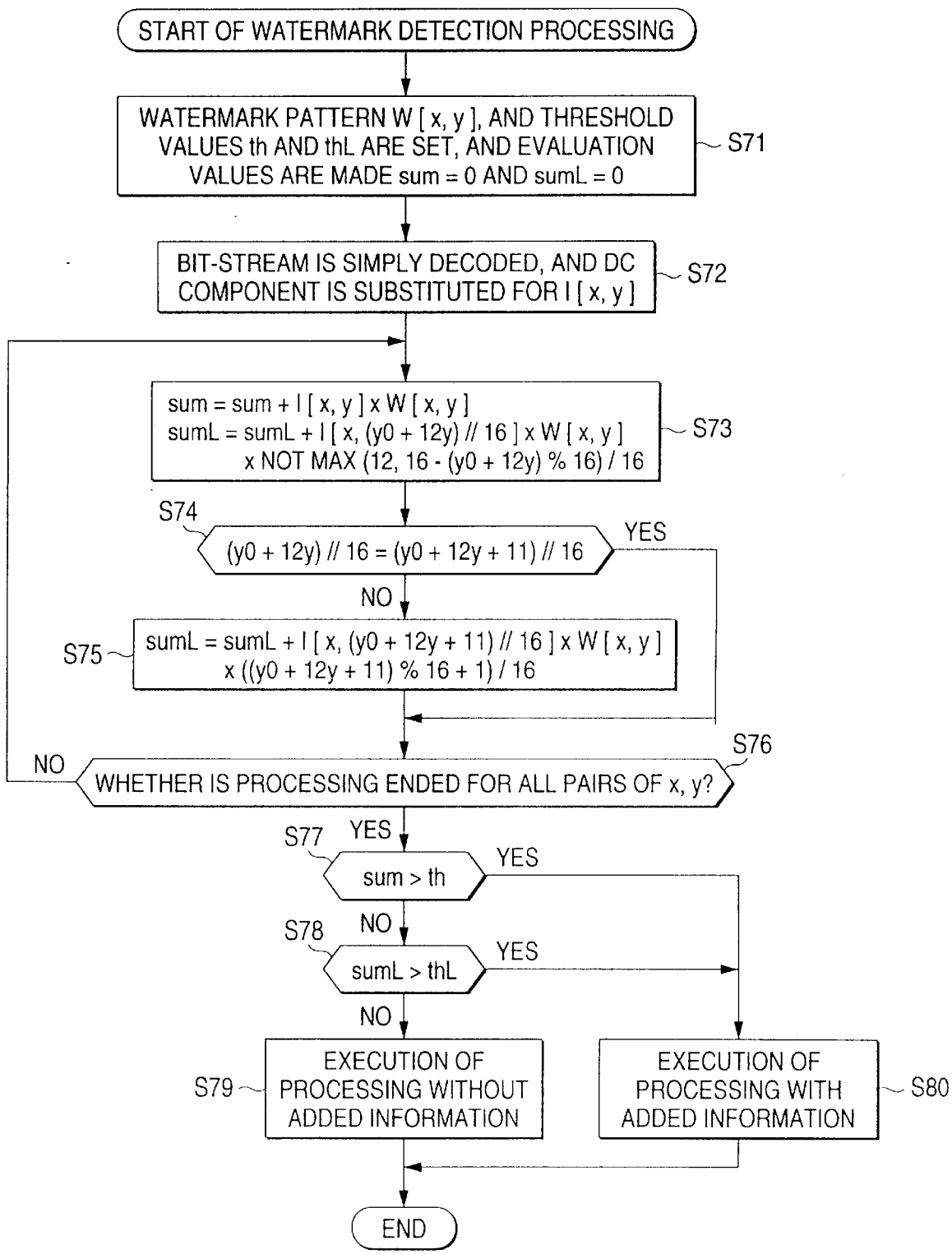
FIG. 40 is a flowchart for explaining the processing of watermark detection.

FIG. 40 is a flowchart for explaining a processing for detecting a component of a watermark in which a normalizing processing is added to the processing shown in the flowchart of FIG. 36. This processing is such that in the case where a component of a watermark is contained only in pixels of k/16 of the encoded block 83, a detected value is multiplied by k/16. Except step S73 and step S75, the processing contents of steps of FIG. 40 are the same as the steps having the same number at the lower one digit in the flowchart of FIG. 36. Thus, their description will be omitted, and a description will be made below only on portions different from the processing of FIG. 36.

At step S73, the watermark detecting portion 52 adds I[x,y]×W[x,y] to the value sum, and adds I[x,(y0+12y)//16]× W[x,y]×NOTMAX(12,16−(y0+12y)%16)/16 to the value sumL. At step S75, the watermark detecting portion 52 adds I[x,(y0+12y+11)//16]×W[x,y]×((y0+12y+11)%16+1)/16 to the value sumL. Incidentally, the symbol NOTMAX(A,B) expresses not larger one between A and B, and the symbol % expresses a residual when division is made.

As described above, the processing of FIG. 40 enables detection with higher reliability by correcting the evaluation value of the watermark obtained by calculating the correlation between the watermark and the DC component by means of the overlapping rate of the encoded block 83 to the addition block. Besides, since each value added at the time when the evaluation value sumL for the letter box image 29 is obtained is divided by 16 without fail, if the threshold value is previously set at a value increased by a factor of 16 times, the operation of division by 16 is unnecessary.

As is apparent also from FIGS. 34A to 34C, the ratio of pixels of the encoded block 83 corresponding to a certain addition block 82 is a value between 1/16 and 12/16 of the encoded block 83. Between the case where the ratio of pixels of the encoded block 83 corresponding to the addition block 82 is 1/16 of the encoded block 83 and the case where it is 12/16, there is a difference of 12 times in the amount of components of the watermark which can be extracted when correlation is taken. Thus, when the ratio of pixels of the encoded block 83 corresponding to the addition block 82 is 1/16 of the encoded block 83, an influence of noise becomes high, and judgement becomes difficult. Then, in this processing example, the value obtained by correlation with the encoded block 83 is multiplied by the ratio of pixels of the encoded block 83 corresponding to the addition block 82. By this, it is possible to correct the difference of reliability of components of the watermark by means of the ratio of pixels of the encoded block corresponding to the addition block.

In the above description, although the size of the encoded block and the size of the addition block 81 in the squeeze image are made 8×16 pixels, another pixel number may be adopted. For example, in order to make the size of the block 4×16 pixels, when the watermark is added to the image, the addition processing is performed for every region of 4×16 pixels not 8×16 pixels, and when the watermark of the image is detected, in addition to DC, a minimum degree AC (Alternating Current) coefficient (it is a right side coefficient of the DC component, and corresponds to a difference between average values of the right half and the left half of the block of 8×16 pixels) is decoded only in the horizontal direction, so that detection of the watermark can be made.

Further, in order to make the size of the block 8×8 pixels, the watermark is added for every region of 8×8 pixels. At the time of detection, with respect to the block of the DCT of the field mode, in addition to DC, a minimum AC coefficient (it is a coefficient positioned below the DC coefficient, and corresponds to a difference between averages of the upper half and lower half of the block) is decoded only in the vertical direction, and the DC value with the range of 8×8 pixels may be obtained. With respect to the DCT block of the frame mode, since there is a DC value for every region of 8×8 pixels, particular processing is not necessary.

In the system where the watermark can be detected even if letter box conversion is performed, the unit (size of an addition block) in which addition of the watermark is performed is the same as the unit in the case where the watermark for the squeeze image 28 is added. Thus, the image added with the watermark in such a system that the watermark can be detected even if the letter box conversion is performed, can be detected by the image processing apparatus and method of the invention and is compatible.

Thus, there is an advantage that it is not necessary to again add a watermark to an image which has been subjected to letter box conversion and has been added with a watermark.

Any symbol other than +1 and −1 may be used for the symbol of the watermark pattern. Besides, three or more kinds of symbols may be used instead of the two kinds of symbols. For example, three kinds of symbols of +1, 0, and −1 are used, and any meaning may be given to each symbol such that when checking with the watermark pattern is performed, a pixel with the symbol 0 does not have an influence on the evaluation value sum (the pixel value is neither added to nor subtracted from the evaluation value sum).

A region where a watermark is added on an image may have any shape and range. Besides, as long as conformity against the watermark pattern checked at the time of addition is taken, the shape and range of a region where an evaluation value is obtained at the time of detection may be arbitrary. Further, addition or detection may be performed by using information of a wide range in space and in time. That is, correlation between front and back or right and left regions in the frame may be used, or former and later frames in time may be used.

Incidentally, in the present specification, the term "system" expresses the entirety constituted by a plurality of apparatuses.

As a providing medium for providing a computer program for executing the foregoing processing to a user, in addition to a recording medium such as a magnetic disk, a CD-ROM, and a solid memory, a communication medium such as a network and a satellite may be used.

As described above, according to the watermark detecting apparatus and detecting method of the invention, the size of a unit watermark is made to be integer times as large as an encoded block at compression encoding of an image at any time before and after resolution conversion, watermark detection in a bit stream becomes possible at any time before and after the resolution conversion while suppressing a lowering of detection accuracy, an increase of detecting time, a deterioration of picture quality, and an increase of processing amount of detection.

In the case where there is a resolution which is seldom used, a value other than that integer times as large as an encoded block is allowed as a size of a unit watermark in the resolution, so that a processing amount of detection can be further decreased.

Further, in the illegal use preventing system of the invention, in both cases before and after the resolution conversion is performed, prevention of illegal use and copying can be made possible while suppressing a lowering of accuracy of prevention, an increase of time of prevention, a deterioration of picture quality, and an increase of processing amount of prevention.

Moreover, according to the image processing apparatus and method, and the providing medium of the sixth embodiment, correspondingly to resolution conversion or frame conversion, a watermark pattern is converted, checking is performed against the watermark pattern made to correspond to at least a part of an encoded block in an image which has been subjected to the resolution conversion or picture frame conversion, an evaluation value as to the image is calculated, and the evaluation value is compared with a predetermined threshold value, so that it is judged whether the watermark is added. Thus, the watermark pattern can be detected without a lowering of detection accuracy, an increase of detecting time, a deterioration of picture quality, or an increase of processing amount of detection.

What is claimed is:

1. An information detecting apparatus in which a watermark pattern and an image are checked with each other for every small region made of vertical×horizontal=M×N (M and N are respectively a positive integer) pixels of a part of the image, information is embedded as a watermark in the image on the basis of the watermark pattern, and the information is detected from the image constructed by applying resolution conversion or picture frame conversion to the image embedded with the information, the information detecting apparatus comprising:

arithmetic means for converting the watermark pattern correspondingly to the resolution conversion or picture frame conversion, performing checking against the watermark pattern made to correspond to at least a part of an encoded block in the image subjected to the resolution conversion or picture frame conversion, and calculating an evaluation value on the image; and judging means for comparing the evaluation value with a predetermined threshold value and judging whether the watermark is added;

wherein the arithmetic means omits an arithmetic operation of the evaluation value in a case where a ratio of correspondence between the converted watermark pattern and the encoded block in the image subjected to the resolution conversion or picture frame conversion is smaller than a predetermined ratio.

2. An information detecting apparatus according to claim 1, wherein the arithmetic means multiplies the evaluation value by a weight in accordance with a ratio of correspondence between the converted watermark pattern and the encoded block in the image subjected to the resolution conversion or picture frame conversion.

3. An information detecting apparatus according to claim 1, wherein the image is an image subjected to letter box conversion.

4. An information detecting method in which a watermark pattern and an image are checked with each other for every small region made of vertical×horizontal=M×N (M and N are respectively a positive integer) pixels of a part of the image, information is embedded as a watermark in the image on the basis of the watermark pattern, and the information is detected from the image constructed by applying resolution conversion or picture frame conversion to the image embedded with the information, the information detecting method comprising the steps of:

converting the watermark pattern correspondingly to the resolution conversion or picture frame conversion;

performing checking against the watermark pattern made to correspond to at least a part of an encoded block in the image subjected to the resolution conversion or picture frame conversion;

calculating an evaluation value on the image;

comparing the evaluation value with a predetermined threshold value to judge whether the watermark is added; and omitting an arithmetic operation of the evaluation value in a case where a ratio of correspondence between the converted watermark pattern and the encoded block in the image subjected to the resolution conversion or picture frame conversion is smaller than a predetermined ratio.

5. A providing medium for providing a computer-readable program to make an information detecting apparatus in which a watermark pattern and an image are checked with each other for every small region made of vertical× horizontal=M×N (M and N are respectively a positive integer) pixels of a part of the image, information is embedded as a watermark in the image on the basis of the watermark pattern, and the information is detected from the image constructed by applying resolution conversion or picture frame conversion to the image embedded with the information, to execute a process comprising the steps of:

converting the watermark pattern correspondingly to the resolution conversion or picture frame conversion;

performing checking against the watermark pattern made to correspond to at least a part of an encoded block in the image subjected to the resolution conversion or picture frame conversion;

calculating an evaluation value on the image;

comparing the evaluation value with a predetermined threshold value to judge whether the watermark is added; and omitting an arithmetic operation of the evaluation value in a case where a ratio of correspondence between the converted watermark pattern and the encoded block in the image subjected to the resolution conversion or picture frame conversion is smaller than a predetermined ratio.

6. An information adding apparatus for adding information as a watermark to an image, comprising:

unit watermark pattern generating means for generating a unit watermark pattern having a size corresponding to a small region made of vertical×horizontal=M×N (M and N are respectively a positive integer) pixels of a part of the image;

watermark repeating means for generating a repetitive watermark in which the unit watermark pattern from the unit watermark pattern generating means is repeated vertically and horizontally; and embedding means for checking the repetitive watermark and adding the watermark to the image;

wherein the unit watermark pattern generating means determines a size of the unit watermark pattern so that at all resolutions expected that resolution conversion is performed for the image, each of a vertical size and a horizontal size of the unit watermark becomes integer times as large as a size of an encoded block at image encoding.

7. An information adding method in which a repetitive watermark is added to an image, the repetitive watermark being formed by vertically and horizontally repeating a unit watermark pattern having a size corresponding to a small region made of vertical×horizontal=M×N (M and N are respectively a positive integer) pixels of a part of the image, wherein a size of the unit watermark pattern is determined so that at all resolutions expected that resolution conversion is performed for the image, each of a vertical size and a horizontal size of the unit watermark becomes integer times as large as a size of an encoded block at image encoding.

8. An information adding apparatus for adding information as a watermark to an image, comprising:

unit watermark pattern generating means for generating a unit watermark pattern having a size corresponding to a small region made of vertical×horizontal=M×N (M and N are respectively a positive integer) pixels of a part of the image; and watermark repeating means for generating a repetitive watermark in which the unit watermark pattern from the unit watermark pattern generating means is repeated vertically and horizontally;

wherein the unit watermark pattern generating means determines a size of the unit watermark pattern so that at a plurality of selected resolutions in all resolutions expected that resolution conversion is performed for the image, each of a vertical size and a horizontal size of the unit watermark becomes integer times as large as a size of an encoded block at image encoding.

9. An information adding method in which a repetitive watermark is added to an image, the repetitive watermark being formed by vertically and horizontally repeating a unit watermark pattern having a size corresponding to a small region made of vertical×horizontal=M×N (M and N are respectively a positive integer) pixels of a part of the image, wherein a size of the unit watermark pattern is determined so that at a plurality of selected resolutions in all resolutions expected that resolution conversion is performed for the image, each of a vertical size and a horizontal size of the unit watermark becomes integer times as large as a size of an encoded block at image encoding.

10. An information detecting apparatus for detecting information from an image added with a repetitive watermark formed by vertically and horizontally repeating a unit watermark pattern having a size corresponding to a small region made of vertical×horizontal=M×N (M and N are respectively a positive integer) pixels of a part of the image, where in at all resolutions expected that resolution conversion is performed for the image, each of a vertical size and a horizontal size of the unit watermark pattern is made to be integer times as large as a size of an encoded block at image encoding, the information detecting apparatus comprising:

resolution converting means for converting a resolution of the image into a specific resolution;

correlation detecting means for checking a correlation between the image in which its resolution is converted by the resolution converting means and the unit watermark pattern; and judgement means for judging whether the information is added, based on detection output of the correlation detecting means.

11. An information detecting apparatus according to claim 10, further comprising resolution ratio calculating means for calculating a ratio of resolution conversion in the resolution converting means based on information of a resolution contained in input image information;

wherein the resolution converting means executes the resolution conversion based on the resolution ratio calculated by the resolution ratio calculating means.

12. An information detecting apparatus according to claim 11, further comprising folding accumulation means for executing folding accumulation, before the resolution conversion and with respect to the image added with the repetitive watermark, in a unit of a small region corresponding to a size of the unit watermark pattern before the resolution conversion, the size being determined based on the resolution ratio from the resolution ratio calculating means and information of the size of the unit watermark pattern after the resolution conversion;

wherein the correlation detecting means checks a correlation between what is obtained by subjecting an accumulation result of the folding accumulation means to the resolution conversion by the resolution converting means and the unit watermark pattern after the resolution conversion.

13. An information detecting apparatus according to claim 12, wherein:

the input image information is compressed data using DCT (Discrete Cosine Transform);

the folding accumulation means executes the folding accumulation at a stage of a DCT coefficient of the compressed data;

a reverse DCT processing portion for executing reverse DCT processing of the accumulation result of the folding accumulation means is provided; and output of the reverse DCT processing portion is supplied to the resolution converting means.

14. An information detecting method for detecting associated information by detecting a unit watermark pattern from an image added with a repetitive watermark in which the unit watermark pattern having a size corresponding to a small region made of vertical×horizontal=M×N (M and N are respectively a positive integer) pixels of a part of an image is repeated horizontally and vertically, wherein:

each of a vertical size and a horizontal size of the unit watermark pattern is made, at all resolutions expected that resolution conversion is performed for the image, to be integer times as large as a size of an encoded block at image encoding;

after the resolution of the image is converted to a specific resolution, a correlation between the image in which its resolution is converted to the specific resolution and the unit watermark pattern is checked; and based on a result of correlation detection, it is judged whether the information is added.

15. An information detecting method according to claim 14, wherein:

a ratio of the resolution conversion is calculated based on resolution information contained in input image information; and the resolution conversion is executed based on the calculated resolution ratio.

16. An information detecting method according to claim 15, wherein:

folding accumulation is executed, before the resolution conversion and with respect to the image added with the repetitive watermark, in a unit of a small region corresponding to a size of the unit watermark pattern before the resolution conversion, the size being determined based on the calculated resolution ratio and information of the size of the unit watermark pattern after the resolution conversion; and a correlation between what is obtained by subjecting a folding accumulation result to the resolution conversion and the unit watermark pattern after the resolution conversion is checked.

17. An information detecting method according to claim 16, wherein:

the input image information is compression data using DCT (Discrete Cosine Transform);

the folding accumulation is executed at a stage of a DCT coefficient of the compressed data; and what is obtained by subjecting the folding accumulation result to reverse DCT processing is subjected to the resolution conversion.

18. An information detecting apparatus for detecting associated information by detecting a unit watermark pattern from an image added with a repetitive watermark formed by vertically and horizontally repeating the unit watermark pattern having a size corresponding to a small region made of vertical×horizontal=M×N (M and N are respectively a positive integer) pixels of a part of the image, wherein at a plurality of selected resolutions in all resolutions expected that resolution conversion is performed for the image, each of a vertical size and a horizontal size of the unit watermark pattern is made to be integer times as large as a size of an encoded block at image encoding, the information detecting apparatus comprising:

resolution converting means for converting a resolution of the image into a specific resolution;

correlation detecting means for checking a correlation between the image in which its resolution is converted by the resolution converting means and the unit watermark pattern; and judgment means for judging whether the information is added, based on detection output of the correlation detecting means.

19. An information detecting method for detecting associated information by detecting a unit watermark pattern from an image added with a repetitive watermark in which the unit watermark pattern having a size corresponding to a small region made of vertical×horizontal=M×N (M and N are respectively a positive integer) pixels of a part of an image is repeated horizontally and vertically, wherein:

each of a vertical size and a horizontal size of the unit watermark pattern is made, at a plurality of selected resolutions in all resolutions expected that resolution conversion is performed for the image, to be integer times as large as a size of an encoded block at image encoding;

after the resolution of the image is converted to a specific resolution, a correlation between the image in which its resolution is converted to the specific resolution and the unit watermark pattern is checked; and based on a result of correlation detection, it is judged whether the information is added.

* * * * *